(12) United States Patent
Kumagai et al.

(10) Patent No.: US 11,694,585 B2
(45) Date of Patent: Jul. 4, 2023

(54) DISPLAY APPARATUS, DISPLAY SYSTEM, DISPLAY CONTROL METHOD, AND NON-TRANSITORY RECORDING MEDIUM

(71) Applicants: Masaru Kumagai, Kanagawa (JP); Takehisa Kitakawa, Tokyo (JP); Ryosuke Kasahara, Kanagawa (JP); Kohei Watanabe, Tokyo (JP); Tomokazu Namiki, Kanagawa (JP)

(72) Inventors: Masaru Kumagai, Kanagawa (JP); Takehisa Kitakawa, Tokyo (JP); Ryosuke Kasahara, Kanagawa (JP); Kohei Watanabe, Tokyo (JP); Tomokazu Namiki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/552,365

(22) Filed: Dec. 16, 2021

(65) Prior Publication Data

US 2022/0208040 A1   Jun. 30, 2022

(30) Foreign Application Priority Data

Dec. 28, 2020 (JP) .................................. 2020-218828
Jan. 15, 2021 (JP) .................................. 2021-005348
Mar. 22, 2021 (JP) .................................. 2021-047933

(51) Int. Cl.
*G02B 30/54* (2020.01)
*G09G 3/00* (2006.01)

(52) U.S. Cl.
CPC ............. *G09G 3/003* (2013.01); *G02B 30/54* (2020.01); *G09G 2360/14* (2013.01)

(58) Field of Classification Search
CPC .... G02B 30/54; G02B 30/56; G09G 2360/14; G09G 3/003; G09G 3/001; G09G 3/2003; G09G 5/003; G09G 5/06

See application file for complete search history.

(56) References Cited

U.S. PATENT DOCUMENTS

| | | | | |
|---|---|---|---|---|
| 5,815,314 A | * | 9/1998 | Sudo | ..................... H04N 13/349 348/E13.043 |
| 5,854,613 A | * | 12/1998 | Soltan | ..................... G09G 3/025 348/E13.058 |
| 6,064,423 A | * | 5/2000 | Geng | ..................... G02B 30/54 348/E13.058 |
| 2002/0140631 A1 | | 10/2002 | Blundell | |

(Continued)

FOREIGN PATENT DOCUMENTS

JP         9-091468       4/1997
WO   WO2016/092464 A1    6/2016

*Primary Examiner* — Vijay Shankar
*Assistant Examiner* — Cory A Almeida
(74) *Attorney, Agent, or Firm* — Xsensus LLP

(57) ABSTRACT

A display apparatus includes: an irradiation section to be irradiated with image light while being driven to cause a three-dimensional image be displayed based on reflected image light in a manner visible to a user using an afterimage effect; a driver that drives the irradiated section; circuitry that acquires two-dimensional image data generated according to at least one of an angle or a position of the irradiation section being driven; and an irradiation device that irradiates the irradiated section with the image light based on the two-dimensional image data that is acquired.

20 Claims, 42 Drawing Sheets

(56) References Cited

U.S. PATENT DOCUMENTS

| | | |
|---|---|---|
| 2009/0231416 A1 | 9/2009 | Kasahara |
| 2013/0202319 A1 | 8/2013 | Komatsu et al. |
| 2016/0171310 A1 | 6/2016 | Kasahara |
| 2016/0349687 A1 | 12/2016 | Mori et al. |
| 2017/0147921 A1 | 5/2017 | Kasahara |
| 2017/0154234 A1 | 6/2017 | Tanaka et al. |
| 2020/0293907 A1 | 9/2020 | Kasahara et al. |
| 2021/0012240 A1 | 1/2021 | Tanaka et al. |

\* cited by examiner

FIG. 21

| x\y | 0 | 1 | 2 | 3 | ... | 124 | 125 | 126 | ... | 247 | 248 | 249 | 250 |
|---|---|---|---|---|---|---|---|---|---|---|---|---|---|
| 250 | 156 | 157 | 158 | 159 | ... | 187 | 188 | 189 | ... | 216 | 217 | 218 | 219 |
| 249 | 155 | 156 | 157 | 158 | ... | 186 | 188 | 190 | ... | 217 | 218 | 219 | 220 |
| 248 | 154 | 155 | 156 | 157 | ... | 185 | 188 | 191 | ... | 218 | 219 | 220 | 221 |
| 247 | 153 | 154 | 155 | 156 | ... | 184 | 188 | 192 | ... | 219 | 220 | 221 | 222 |
| ... | ... | ... | ... | ... | ... | ... | ... | ... | ... | ... | ... | ... | ... |
| 126 | 126 | 127 | 128 | 129 | ... | 156 | 188 | 219 | ... | 247 | 248 | 249 | 250 |
| 125 | 125 | 125 | 125 | 125 | ... | 125 | 0 | 0 | ... | 0 | 0 | 0 | 0 |
| 124 | 124 | 123 | 122 | 121 | ... | 94 | 62 | 31 | ... | 4 | 3 | 2 | 1 |
| ... | ... | ... | ... | ... | ... | ... | ... | ... | ... | ... | ... | ... | ... |
| 3 | 97 | 96 | 95 | 94 | ... | 66 | 62 | 58 | ... | 31 | 30 | 29 | 28 |
| 2 | 96 | 95 | 94 | 93 | ... | 65 | 62 | 59 | ... | 32 | 31 | 30 | 29 |
| 1 | 95 | 94 | 93 | 92 | ... | 64 | 62 | 60 | ... | 33 | 32 | 31 | 30 |
| 0 | 94 | 93 | 92 | 91 | ... | 63 | 62 | 61 | ... | 34 | 33 | 32 | 31 |

| x \ y | 0 | 1 | 2 | 3 | ... | 124 | 125 | 126 | ... | 247 | 248 | 249 | 250 |
|---|---|---|---|---|---|---|---|---|---|---|---|---|---|
| 250 | 62 | 64 | 66 | 68 | ... | 122 | 124 | 126 | ... | 182 | 184 | 186 | 188 |
| 249 | 60 | 62 | 64 | 66 | ... | 120 | 124 | 128 | ... | 184 | 186 | 188 | 190 |
| 248 | 58 | 60 | 62 | 64 | ... | 118 | 124 | 130 | ... | 186 | 188 | 190 | 192 |
| 247 | 56 | 58 | 60 | 62 | ... | 116 | 124 | 132 | ... | 188 | 190 | 192 | 194 |
| ... | ⋮ | ⋮ | ⋮ | ⋮ | ⋱ | ⋮ | ⋮ | ⋮ | ⋰ | ⋮ | ⋮ | ⋮ | ⋮ |
| 126 | 8 | 6 | 4 | 2 | ... | 62 | 124 | 188 | ... | 242 | 244 | 246 | 248 |
| 125 | 250 | 250 | 250 | 250 | ... | 125 | 0 | 0 | ... | 0 | 0 | 0 | 0 |
| 124 | 248 | 246 | 244 | 242 | ... | 188 | 124 | 62 | ... | 8 | 6 | 4 | 2 |
| ... | ⋮ | ⋮ | ⋮ | ⋮ | ⋰ | ⋮ | ⋮ | ⋮ | ⋱ | ⋮ | ⋮ | ⋮ | ⋮ |
| 3 | 194 | 192 | 190 | 188 | ... | 132 | 124 | 116 | ... | 62 | 60 | 58 | 56 |
| 2 | 192 | 190 | 188 | 186 | ... | 130 | 124 | 118 | ... | 64 | 62 | 60 | 58 |
| 1 | 190 | 188 | 186 | 184 | ... | 128 | 124 | 120 | ... | 66 | 64 | 62 | 60 |
| 0 | 188 | 186 | 184 | 182 | ... | 126 | 124 | 122 | ... | 68 | 66 | 64 | 62 |

| x \ y | 0 | 1 | 2 | 3 | ... | 124 | 125 | 126 | ... | 247 | 248 | 249 | 250 |
|---|---|---|---|---|---|---|---|---|---|---|---|---|---|
| 250 | 219 | 222 | 225 | 228 | ... | | 59 | 62 | 65 | ... | 147 | 150 | 153 | 156 |
| 249 | 216 | 219 | 222 | 225 | ... | | 56 | 62 | 68 | ... | 150 | 153 | 156 | 159 |
| 248 | 213 | 216 | 219 | 222 | ... | | 53 | 62 | 71 | ... | 153 | 156 | 159 | 162 |
| 247 | 210 | 213 | 216 | 219 | ... | | 50 | 62 | 74 | ... | 156 | 159 | 162 | 165 |
| ⋮ | ⋮ | ⋮ | ⋮ | ⋮ | ⋱ | ⋮ | ⋮ | ⋮ | ⋰ | ⋮ | ⋮ | ⋮ | ⋮ |
| 126 | 128 | 131 | 134 | 137 | ... | 219 | 62 | 156 | ... | 241 | 244 | 247 | 250 |
| 125 | 125 | 125 | 125 | 125 | ... | 125 | 0 | 0 | ... | 0 | 0 | 0 | 0 |
| 124 | 122 | 119 | 116 | 113 | ... | 31 | 187 | 94 | ... | 12 | 9 | 6 | 3 |
| ⋮ | ⋮ | ⋮ | ⋮ | ⋮ | ⋰ | ⋮ | ⋮ | ⋮ | ⋱ | ⋮ | ⋮ | ⋮ | ⋮ |
| 3 | 40 | 37 | 34 | 31 | ... | 199 | 187 | 174 | ... | 94 | 90 | 87 | 84 |
| 2 | 37 | 34 | 31 | 28 | ... | 196 | 187 | 177 | ... | 96 | 94 | 90 | 87 |
| 1 | 34 | 31 | 28 | 25 | ... | 193 | 187 | 180 | ... | 99 | 96 | 94 | 90 |
| 0 | 31 | 28 | 25 | 22 | ... | 190 | 187 | 183 | ... | 108 | 99 | 96 | 94 |

902

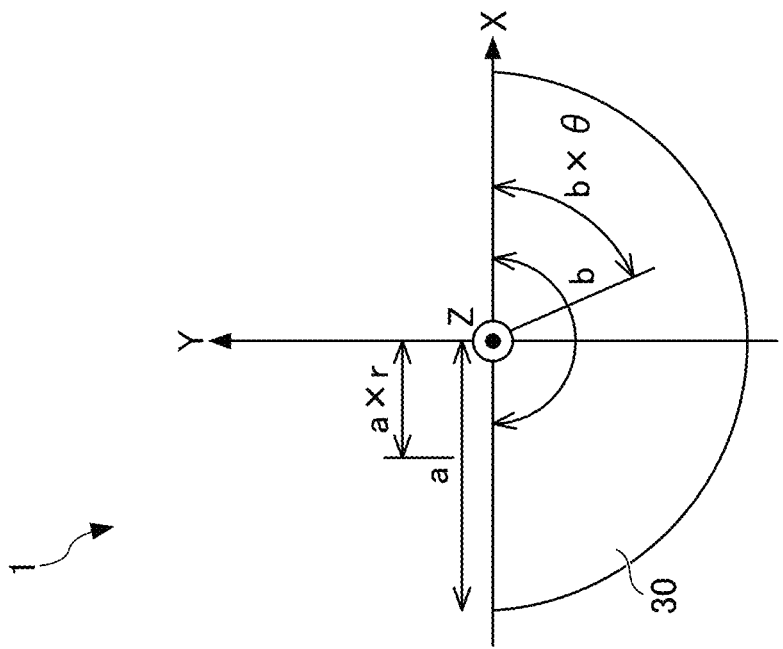
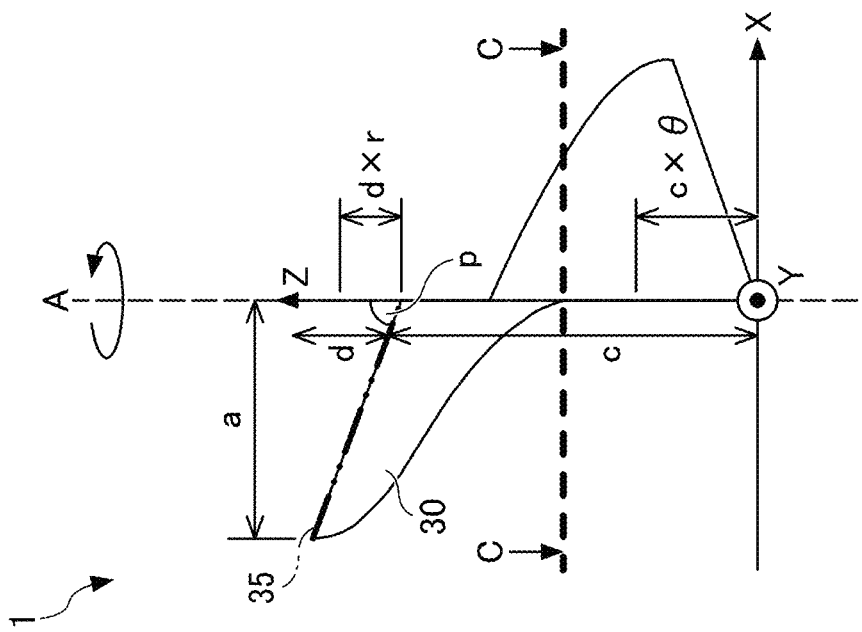
FIG. 37B
FIG. 37A

DISPLAY APPARATUS, DISPLAY SYSTEM, DISPLAY CONTROL METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application Nos. 2020-218828, filed on Dec. 28, 2020, 2021-005348, filed on Jan. 15, 2021, and 2021-047933, filed on Mar. 22, 2021, in the Japan Patent Office, the entire disclosure of which is hereby incorporated by reference herein.

BACKGROUND

Technical Field

The present application relates to a display apparatus, a display system, a display control method, and a recording medium.

Related Art

The background display apparatus irradiates a body that rotates with image light based on image data. For example, the display apparatus irradiates image light based on a two-dimensional image onto a section to be irradiated ("irradiated section") such as a projection screen, while driving the irradiated section, to display a three-dimensional image using an afterimage effect.

SUMMARY

Example embodiments include a display apparatus including: an irradiation section to be irradiated with image light while being driven to cause a three-dimensional image be displayed based on reflected image light in a manner visible to a user using an afterimage effect; a driver that drives the irradiated section; circuitry that acquires two-dimensional image data generated according to at least one of an angle or a position of the irradiation section being driven; an irradiation device that irradiates the irradiated section with the image light based on the two-dimensional image data that is acquired; and a sensor that outputs a light reception signal in response to reception of a partial image light that is a part of the image light from the irradiation device. The circuitry selects the two-dimensional image data to be acquired based on driving cycle information indicating a driving cycle of the driver and the light reception signal.

Example embodiments include an information processing device including: circuitry that acquires image data generated based on a reference value corresponding to a rotation angle and a shape of a rotatable body, and outputs the image data to cause image light based on the image data be emitted to the rotatable body.

Example embodiments include a display apparatus including: an irradiated section to be irradiated, having a spiral shape with a curved cross-section cut along a plane orthogonal to a predetermined axis; a driver that rotates the irradiated section around the predetermined axis; an irradiation device that irradiates the irradiated section that is rotating with image light, so as to display an image with reflected light of the image light having been reflected on the irradiated section.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 21 is a diagram illustrating an example of reference data, processed by the display apparatus, according to the first example of the second embodiment;

FIG. 29 is a diagram illustrating an example of the reference data, processed by the display apparatus, according to the second example of the second embodiment;

FIG. 34 is a diagram illustrating an example of the reference data, processed by the display apparatus, according to the third example of the second embodiment;

FIG. 37A is a diagram illustrating a spiral screen, viewed from a direction intersecting the rotation axis, according to a first example of the third embodiment;

FIG. 37B is a diagram illustrating a spiral screen, viewed from a direction along the rotation axis, according to the first example of the third embodiment;

Figure 1:
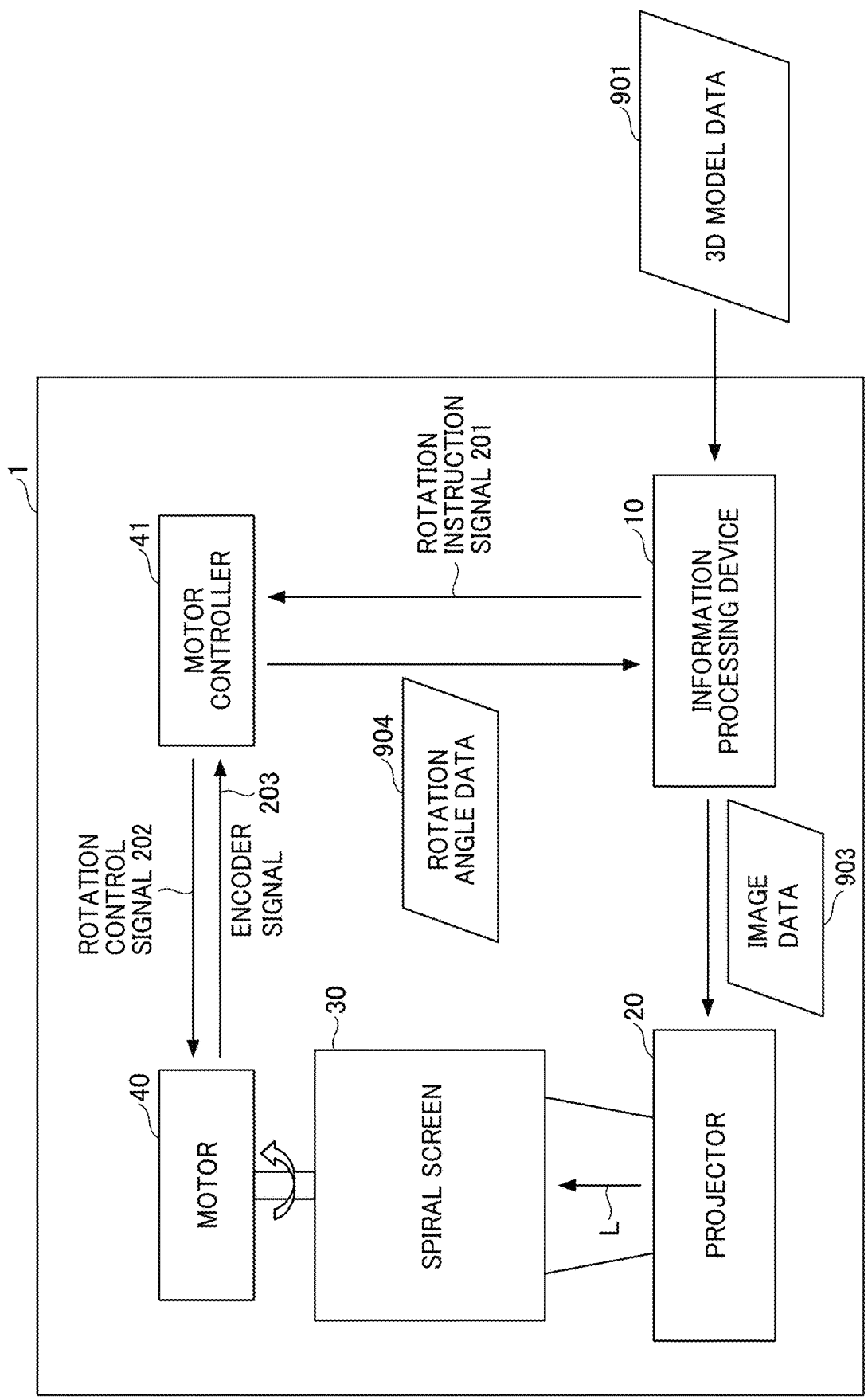
FIG. 1 is a block diagram illustrating an example configuration of a display apparatus according to embodiments.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, embodiments of the present invention will be described with reference to the drawings. Like reference numerals designate identical or corresponding components throughout the several views and a description of same is omitted.

The embodiments described below illustrate examples of a display apparatus that embody technical idea of the present invention, such that the present invention is not limited to the embodiments described below. The dimensions, materials, shapes, relative arrangements, and the like of components described below are not intended to limit the scope of the present invention, but are intended to exemplify the present invention unless otherwise specified. The sizes, positional relationships, and the like of some components illustrated in the drawings may be exaggerated for clarity.

The display apparatus according to the embodiments displays a three-dimensional image using an afterimage effect.

In one embodiment, as described below according to a first embodiment, the display apparatus includes an irradiation section to be irradiated with image light while being driven, a driver that drives the irradiated section, circuitry, an irradiation device that irradiates the irradiated section with the image light based on the two-dimensional image data, and a sensor that outputs a light reception signal in response to reception of a partial image light that is a part of the image light from the irradiation device. The circuitry acquires two-dimensional image data generated according to at least one of an angle or a position of the irradiation section being driven, which is used by the irradiation device to generate image light. The circuitry selects two-dimensional image data to be acquired based on driving cycle information indicating a driving cycle of the driver and the light reception signal.

With this structure, fluctuations in display positions of the three-dimensional image can be prevented.

In another embodiment, as described below according to a second embodiment, the display apparatus includes a body to be rotated, a driver that rotates the body, circuitry that acquires information indicating a rotation angle of the body that is rotating, and irradiation device that irradiates the body that is rotating with image light based on image data output from an information processing device. The information processing device acquires the image data to be output, which is generated based on a reference value corresponding to the rotation angle and a shape of the body.

With this structure, the processing load in generating the image data can be reduced.

In another embodiment, as described below according to a third embodiment, the display apparatus according to the embodiments includes an irradiated section (section to be irradiated) having a spiral shape, a driver that rotates the irradiated section around a predetermined axis, and an irradiation device that irradiates the irradiated section that is rotating with image light. The display apparatus displays an image with a part of image light reflected by the irradiated section. The image being displayed is, for example, a three-dimensional image.

Particularly, in this embodiment, the irradiated section has a spiral shape in which a cross section cut along a plane orthogonal to the predetermined axis is curved. With this structure, even when the irradiated section is irradiated with image light from a direction along the predetermined axis and an image visible from a direction intersecting the predetermined axis is displayed, the displayed image does not have a portion parallel to the viewpoint. Accordingly, there is no portion parallel to the viewpoint that may be invisible, and the entire displayed image is made visible. The predetermined axis is, for example, a spiral axis of the irradiated section having a spiral shape, but may be an axis other than the spiral axis.

The three-dimensional image in this disclosure refers to a stereoscopic image having a volume, which is displayed on a three-dimensional space in a manner visible to the human eye.

A spiral is a type of three-dimensional curve that moves in a direction perpendicular to the plane of rotation while rotating.

The spiral axis refers to a central axis of rotation when a three-dimensional curve rotates in spiral.

The spiral shape refers to a shape in which an outer shape is formed to draw a spiral and includes a spiral face.

The light reflected by the irradiated section includes, among rays of image light, light rays that are incident on one surface of the irradiated section, and reflected by another surface of the irradiated section after passing through the irradiated section.

In the following drawings, directions may be indicated by an X axis, a Y axis, and a Z axis. An X direction along the X axis indicates a predetermined direction in a plane substantially orthogonal to a rotation axis of a spiral screen (example of irradiated section) included in the display apparatus according to the embodiments. A Y direction along the Y axis indicates a direction orthogonal to the predetermined direction in the plane, that is, a direction substantially parallel to the rotation axis of the spiral screen. A Z direction along the Z axis refers to the direction along (that is, in parallel to) the rotation axis of the spiral screen.

A direction indicated by an arrow in the X direction is referred to as a +X direction. A direction opposite to the +X direction is referred to as a −X direction. A direction indicated by an arrow in the Y direction is referred to as a +Y direction. A direction opposite to the +Y direction is referred to as a −Y direction. A direction indicated by an arrow in the Z direction is referred to as a +Z direction. A direction opposite to the +Z direction is referred to as a −Z direction. In this disclosure, the display apparatus emits image light in the +Z direction. The orientation of the display apparatus is not limited to the one described in this disclosure, such that the display apparatus can be arranged in any orientation.

Configuration of Display Apparatus

Referring to FIGS. 1 and 2, a configuration of the display apparatus 1 is described according to the embodiments. FIG. 1 is a block diagram illustrating an example of a configuration of the display apparatus 1, according to the embodiments.

As illustrated in FIG. 1, the display apparatus 1 includes an information processing device 10, a projector 20, a spiral screen (spiral body) 30, a motor 40, and a motor controller 41.

The display apparatus 1 receives three-dimensional model data 901, and allows a user of the display apparatus 1 to visually recognize a three-dimensional image based on the three-dimensional model data 901. The three-dimensional model data 901 is data of a three-dimensional model to cause a user to visually recognize a three-dimensional image. The three-dimensional model data 901 is, for example, data indicating a pixel value of each three-dimensional voxel. The three-dimensional model data 901 is input to the information processing device 10.

The information processing device 10 generates image data 903 (two-dimensional image data) based on the three-dimensional model data 901 that is input. Specifically, the information processing device 10 transmits a rotation instruction signal 201 to the motor controller 41 to instruct the motor controller 41 to start rotating the motor 40. In response to the rotation instruction signal 201, the motor controller 41 transmits a rotation control signal 202 to drive the motor 40 so as to rotate the spiral screen 30 substantially at a constant speed that is previously set.

The spiral screen 30 is an example of an irradiated section that displays a three-dimensional image based on a reflected light of the irradiated image light L. The spiral screen 30 is any rotatable body including one or more spiral-shaped members rotated by the motor 40, and functions as a screen irradiated with image light L. When there is more than one spiral-shaped member, the spiral-shaped members of the spiral screen 30 respectively have colors different from each other. In this disclosure, the spiral refers to a type of three-dimensional curve, such as a helix, that moves in a direction perpendicular to a rotational plane while rotating.

The spiral screen 30 is an example of an irradiated section having a spiral shape. The spiral screen 30 may be implemented in various ways. In one example, as described below referring to the third embodiment, the spiral screen 30 has a curved cross-section cut along a plane orthogonal to the spiral axis. Further, the spiral screen 30 may include one or more spiral members, or blade members, that may vary in number or shape, for example, as described in the following examples.

The motor 40 is an example of a driver that rotates the spiral screen 30 around a predetermined axis, for example, the spiral axis. The motor 40 may be implemented by, for example, a stepping motor, a direct current (DC) motor, or an alternating current (AC) motor.

Figure 6:
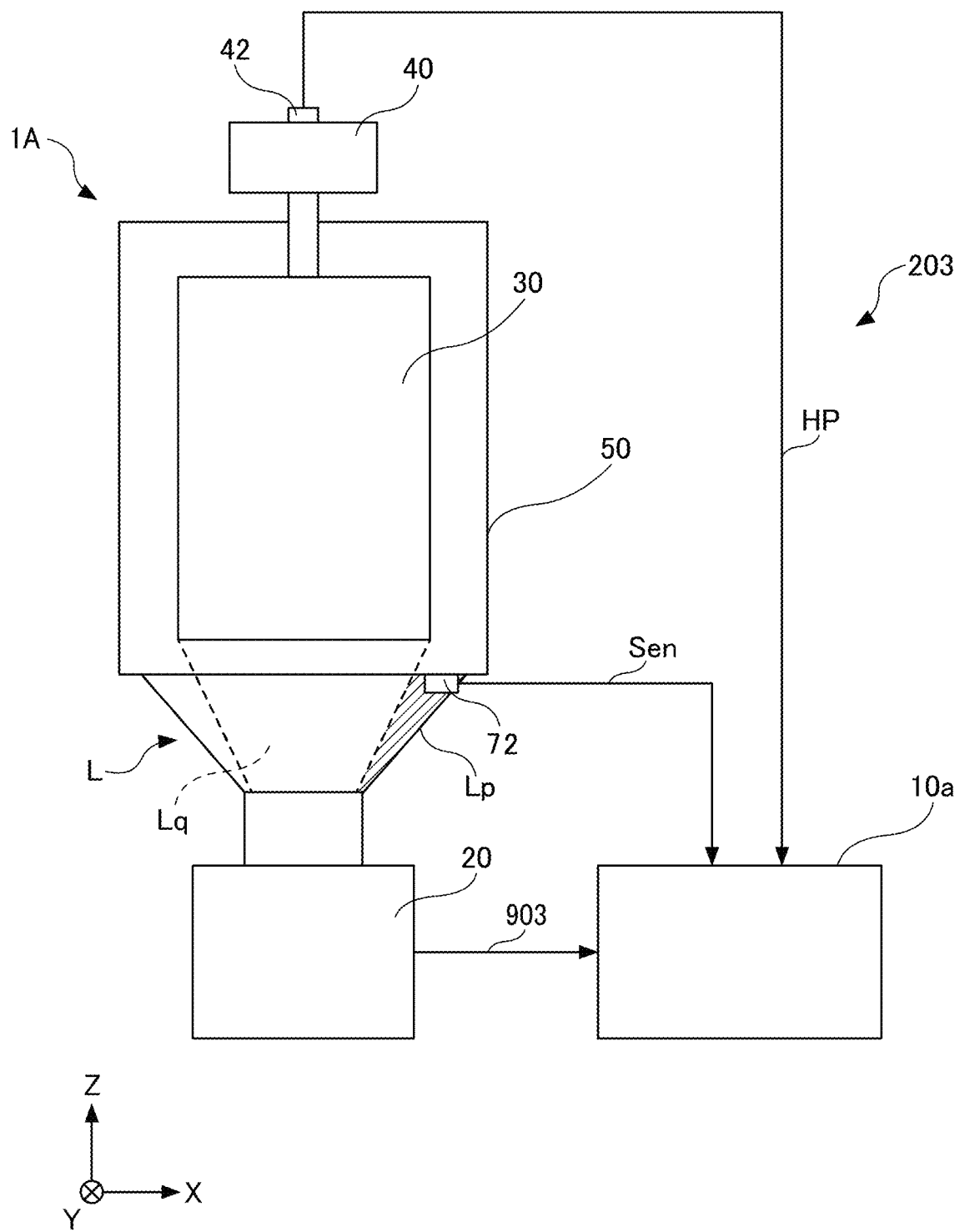
FIG. 6 is a diagram illustrating an example configuration of the display apparatus according to a first example of the first embodiment.

The motor 40 is attached with a rotary encoder 42 (for example, FIG. 6). The rotary encoder 42 transmits an encoder signal 203 indicating the rotation angle of the rotating shaft of the motor 40 to the motor controller 41. The motor controller 41 generates rotation angle data 904 indicating a rotation angle of the spiral screen 30 based on the received encoder signal 203, and transmits the rotation angle data 904 to the information processing device 10.

The information processing device 10 generates image data 903 (two-dimensional image data) corresponding to the rotation angle of the spiral screen 30 based on the received rotation angle data 904, and transmits the image data to the projector 20. The image data 903 is, for example, data of a two-dimensional image corresponding to any one of the angle and the position of the spiral screen 30 that is rotating.

The projector 20 is an example of an irradiation device that irradiates the spiral screen 30 with image light L. The projector 20 irradiates the spiral screen 30 with image light L based on the image data 903 output from the information processing device 10. At this time, since the spiral screen 30 rotating at high speed is irradiated with image light L at various positions, a three-dimensional image is made visible due to an afterimage effect. In this way, the display apparatus 1 allows a user to visually recognize a three-dimensional image using the afterimage effect.

The display apparatus 1 causes a user to visually recognize a three-dimensional color image by using an afterimage effect with light reflected from the spiral screen 30, which is a part of image light L emitted to the spiral screen 30 rotated at a high speed. In other words, the projector 20 emits image light L, which is generated according to a particular position of the spiral screen 30 that is rotating.

In the display apparatus 1, image light L emitted to the spiral screen 30 that is rotating is reflected at various positions on the spiral-shaped members of the spiral screen 30. With this configuration, a three-dimensional color image is made visible to the user using an afterimage effect. The light reflected by the spiral screen 30 includes, among rays of image light, light rays that are incident on one surface of the spiral screen 30, and reflected by another surface of the spiral screen 30 after passing through the spiral screen 30.

Figure 2A:
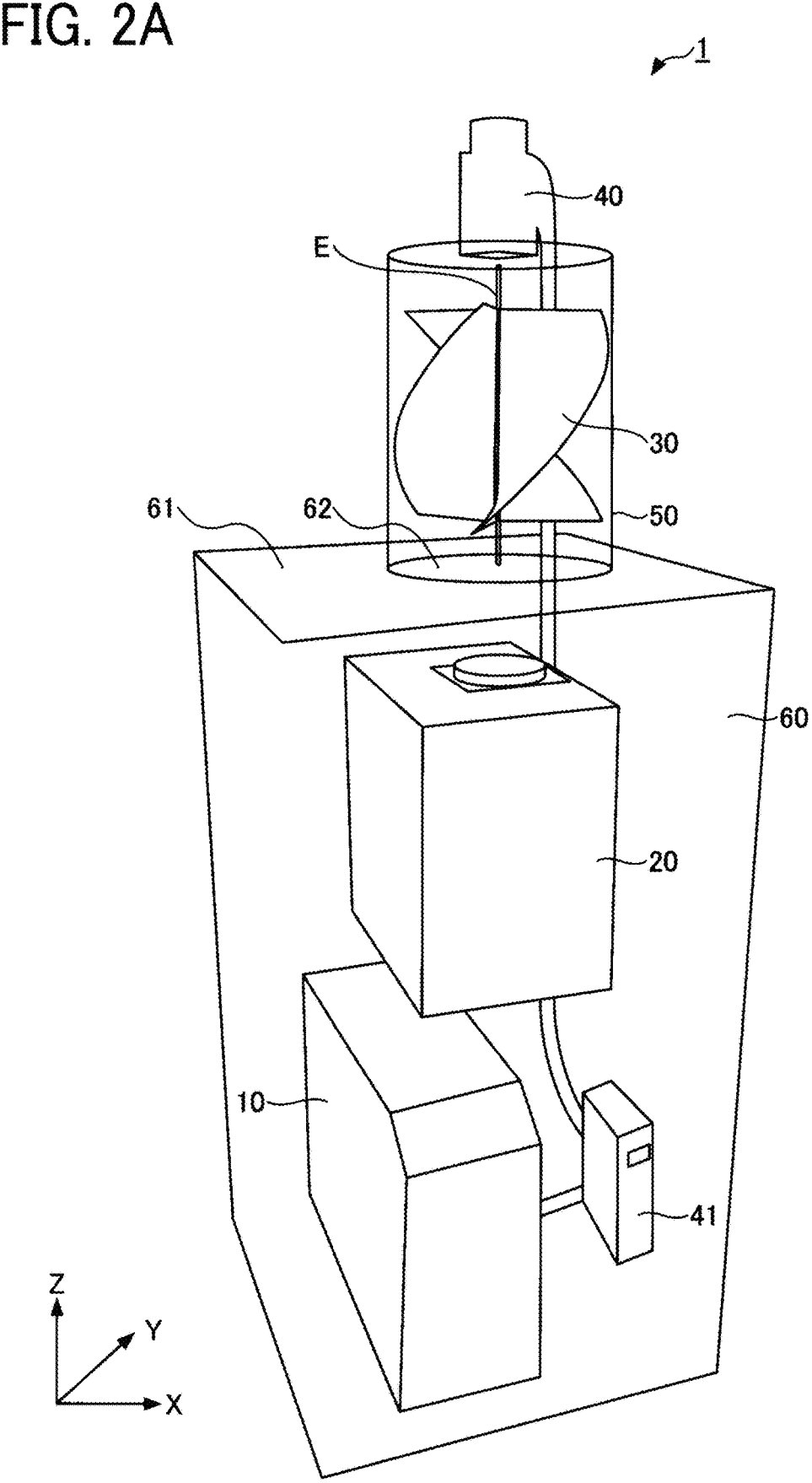
FIG. 2A is a perspective view illustrating an example of the display apparatus according to the embodiments.
Figure 2B:
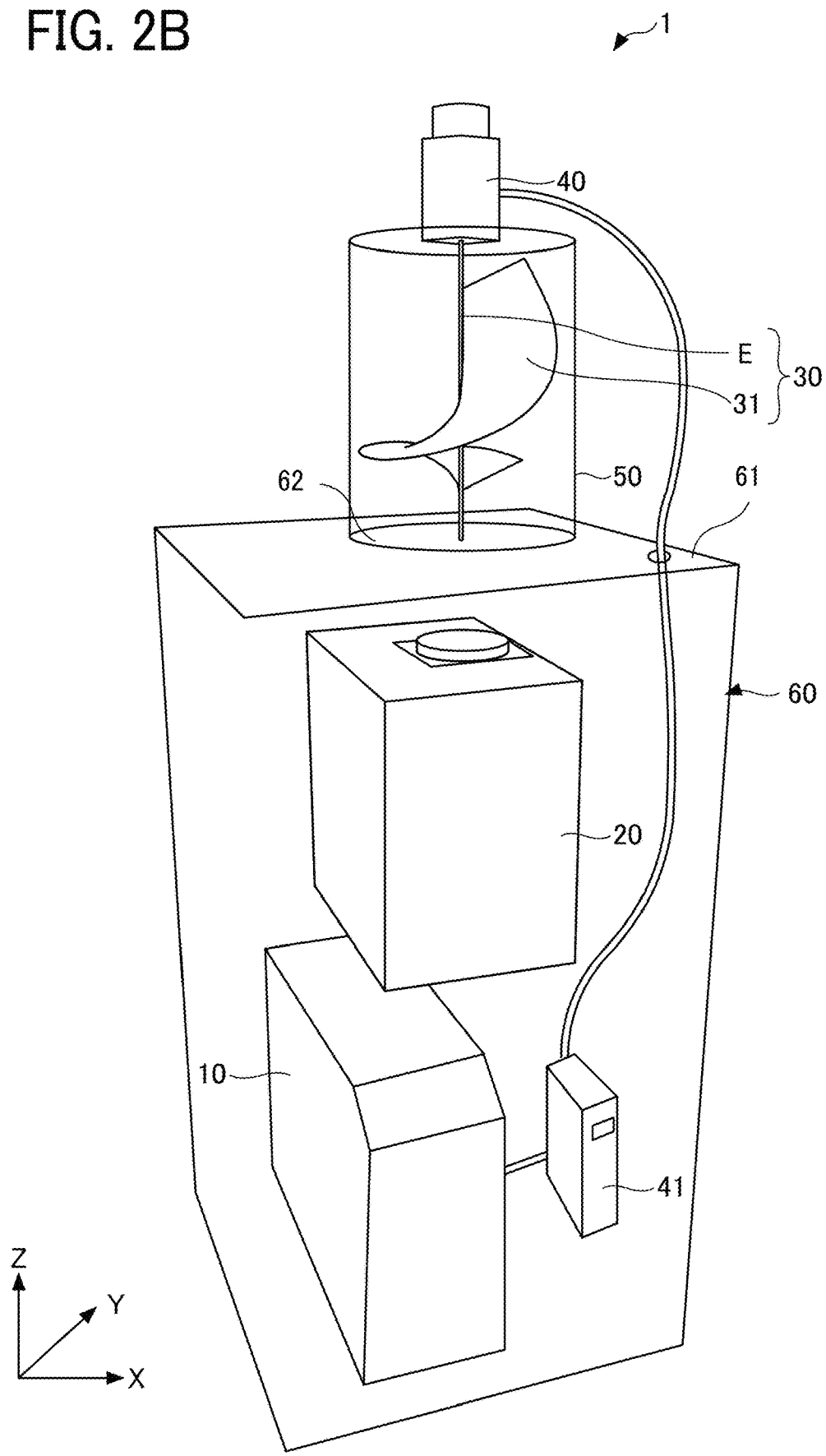
FIG. 2B is a perspective view illustrating another example of the display apparatus according to the embodiments.

FIGS. 2A and 2B are each a perspective view illustrating an example of the display apparatus 1. The display apparatus 1 of FIG. 2A and the display apparatus 1 of FIG. 2B are the same in structure, except for a structure (shape) of the spiral screen 30. For the descriptive purposes, FIG. 2A and FIG. 2B may be collectively referred to as FIG. 2, unless they need to be distinguished from each other. As illustrated in FIG. 2, the display apparatus 1 includes the information processing device 10, projector 20, and motor controller 41 inside a housing 60. The display apparatus 1 further includes a screen case 50 in the +Z direction of the housing 60, that is, above the projector 20. The screen case 50 includes the spiral screen 30 in its inside.

The housing 60 is a box-shaped member, configured by combining a plurality of panel plates, with the panel plate being such as a metal sheet. The housing 60 includes a through hole 62 on its upper face panel 61, which communicates with the inside of the housing 60. The housing 60 functions as a base, located at a lower portion, when the display apparatus 1 is installed.

The screen case 50 is a cylindrical member including the spiral screen 30 in its inside. The screen case 50 contains a material such as a transparent resin or glass. The spiral screen 30 supported inside the screen case 50 is made visible from the outside of the screen case 50.

The screen case 50 is not limited to a cylindrical member. For example, the screen case 50 may have an end portion having a hemispherical shape, or the screen case 50 may be formed in a quadrangular prism. In another example, the screen case 50 may be formed in a tubular member having an elliptical cross-section or a polygonal cross-section. In such case, the screen case 50, which is formed in tube, has a side on which image light L is incident in a direction along the central axis of the tube, and another side opposite of such side. An end portion of the opposite side may be open, or may be closed by such as a flat plate or a hollow hemispherical member.

The display apparatus 1 further includes the motor 40 above the spiral screen 30. An axial member serving as a rotation axis of the motor 40 is connected to a spiral shaft E of the spiral screen 30. The spiral axis refers to a central axis of rotation when a three-dimensional curve rotates in spiral. In this example, the spiral shaft E corresponds to the spiral axis of the spiral screen 30. The spiral screen 30 is rotatable around the spiral shaft E, which is the spiral axis, with rotation of the motor 40. The spiral axis is an example of the predetermined axis.

The motor 40 is communicably connected to the motor controller 41. The spiral screen 30 includes one or more spiral members 31 (an example of spiral-shaped member) and the spiral shaft E. The spiral shaft E corresponds to the rotation axis of the spiral screen 30. The rotation axis of the motor 40 is substantially parallel to the traveling direction of image light L emitted from the projector 20 and coincides with the rotation axis (that is, the spiral shaft E) of the spiral screen 30. When image light is diffused light, the traveling direction of image light L includes a direction along the central axis of image light L. The following describes a process of specifying the position of the spiral screen 30 in the three-dimensional coordinate system including the Z-axis. The positive direction of the Z-axis is the traveling direction of image light L.

Specifically, the information processing device 10 calculates the height z (x, y) of the spiral screen 30 in the positive direction of the Z-axis at each x and y coordinates (x, y). The calculated height z (x, y) is a height along the rotation axis of the spiral screen 30, and corresponds to a position of the surface of the spiral screen 30 that is irradiated with image light L. The information processing device 10 calculates, in real time, the height z (x, y) that changes time by time, and generates the image data 903 for each time.

As a reference of the height, an XY plane of the spiral screen 30, which includes a point at which the distance from the projector 20 is shortest, is set as an XY plane with z=0.

This XY plane is a plane orthogonal to the rotation axis of the spiral screen 30, and the xy coordinates are coordinates on the XY plane.

Figure 36:
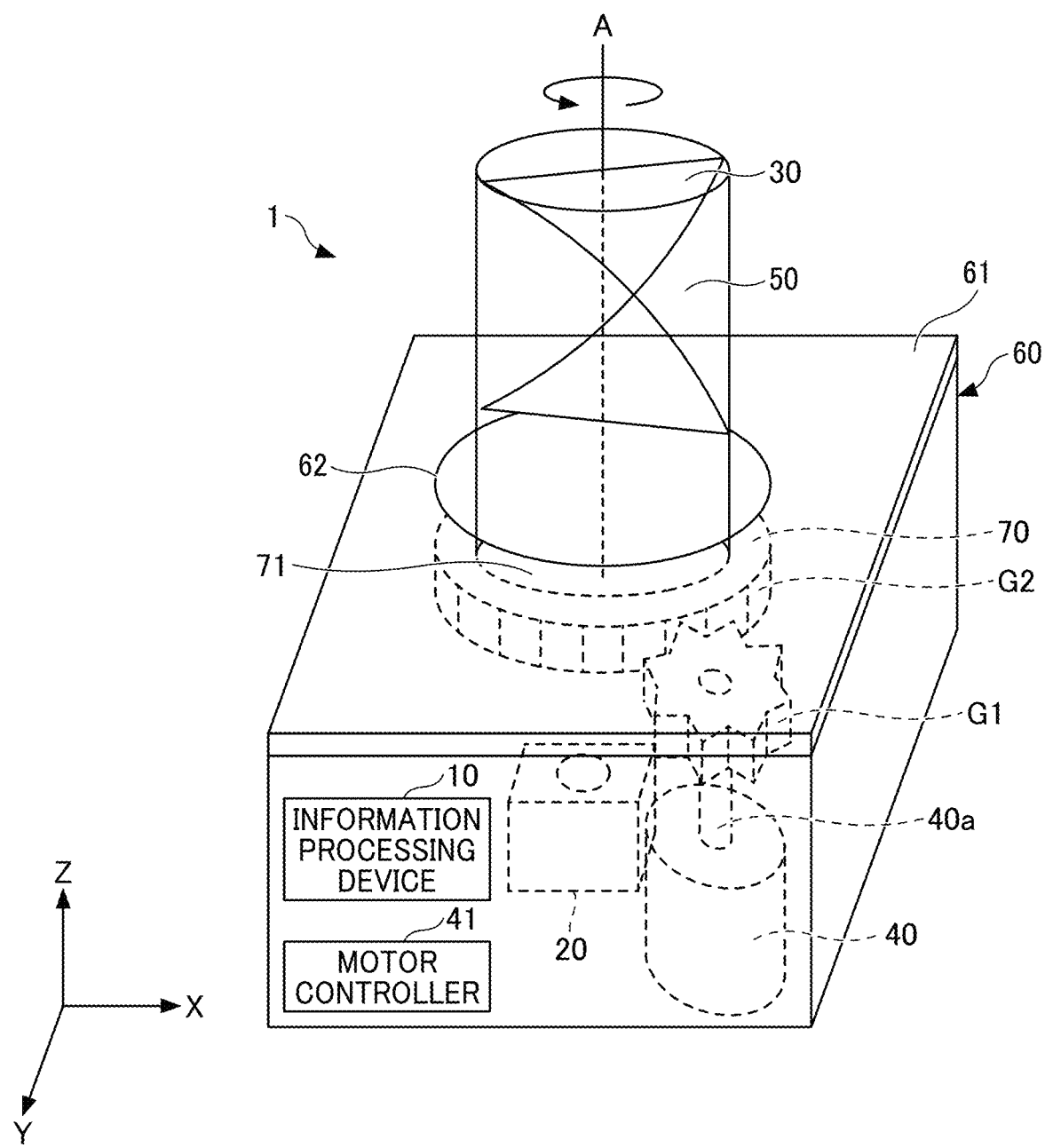
FIG. 36 is a perspective view illustrating an example of the display apparatus according to the embodiments.

In the present embodiment, a configuration in which the information processing device 10, the projector 20, and the motor controller 41 are provided inside the housing 60 is described as an example. Alternatively, the housing 60 may additionally contain the motor 40, for example, as illustrated in FIG. 36. Further, any of the above-described components in the housing 60 may be provided outside the housing 60. For example, the image processing device 10 may be provided at a server external to the display apparatus 2, which is communicable with the display apparatus 2.

Although an example in which the housing 60 is disposed below the spiral screen 30 has been described, the housing 60 may be disposed beside or above the spiral screen 30. In such case, the projector 20 emits image light L laterally or downward. The rotation axis, i.e. the spiral axis, of the spiral screen 30 is parallel to the traveling direction of image light L. In this case, the xyz coordinates are expressed in a three-dimensional coordinate system including the Z axis, with the positive direction of the Z axis being a traveling direction of image light L.

The display apparatus 1 may additionally include a driving power supply, a control board, an external IF capable of transmitting and receiving data, or the like inside the housing 60. The display apparatus 1 may additionally include an operation device that receives a user operation. The operation device allows the user to operate each of the motor controller 41 and the projector 20. The operation device receives operation with respect to the motor controller 41, such as setting of a number of rotations of the motor 40, and setting related to the shape of the spiral screen 30. The information on various settings is transmitted to the information processing device 10 via the external IF.

Example Hardware Configuration of Information Processing Device

Figure 3:
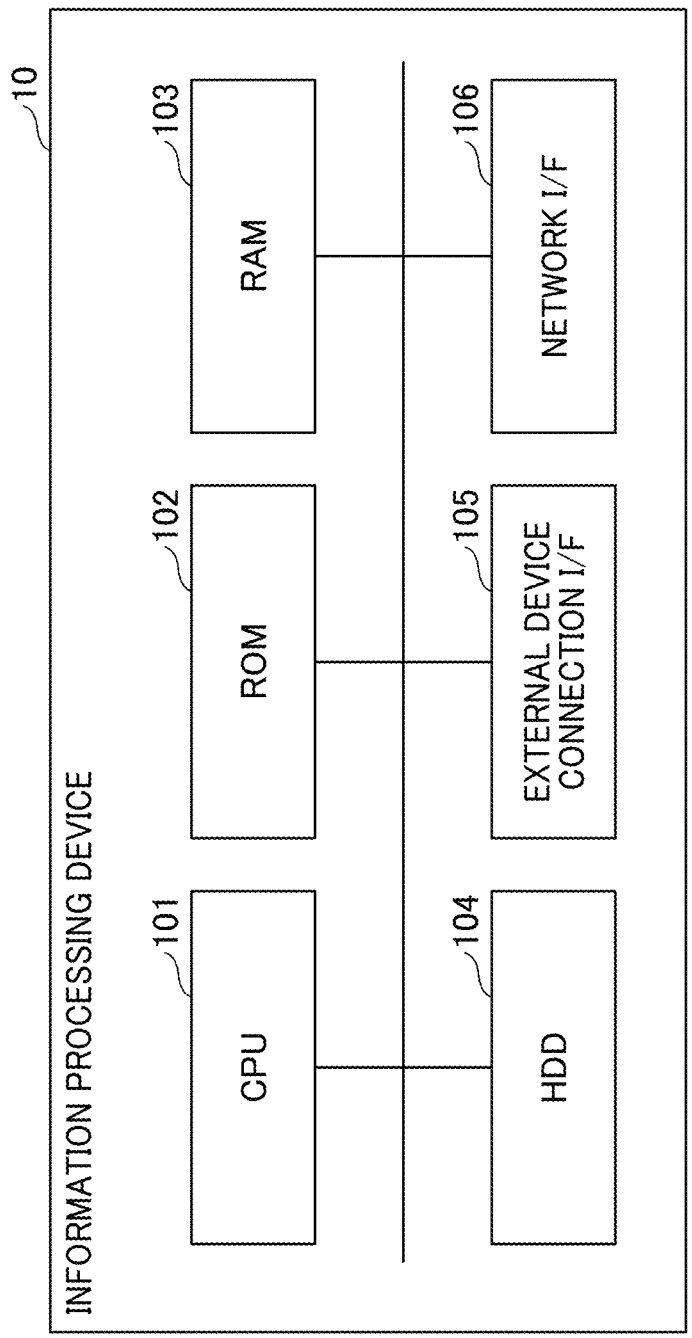
FIG. 3 is a diagram illustrating an example hardware configuration of an information processing device of the display apparatus according to the embodiments.

Next, a hardware configuration of the information processing device 10 will be described with reference to FIG. 3. FIG. 3 is a diagram illustrating an example of a hardware configuration of the information processing device 10 according to the embodiments.

The information processing device 10, which is implemented by a computer, includes a central processing unit (CPU) 101, a read only memory (ROM) 102, a random access memory (RAM) 103, a hard disk drive (HDD) 104, an external device connection interface (I/F) 105, and a network I/F 106.

The CPU 101 executes processing, including various types of arithmetic processing, to control the display apparatus 2. The ROM 102 stores a program for executing the CPU 101 such as an Initial Program Loader (IPL). The RAM 103 is used as a work area for the CPU 101. The HDD 104 stores various data such as a control program.

The external device connection I/F 105 is an interface for connecting various external devices. The external device in this case is, for example, a device such as the projector 20 and the motor controller 41.

The network I/F 106 is an interface for communicating data with other devices via such as a communication network. For example, the information processing device 10 receives the three-dimensional model data 901 via the network I/F 106.

First Embodiment

Now, the display apparatus 1 according to a first embodiment will be described below with reference to FIGS. 4 to 14.

Example Functional Configuration of Information Processing Device

Figure 4:
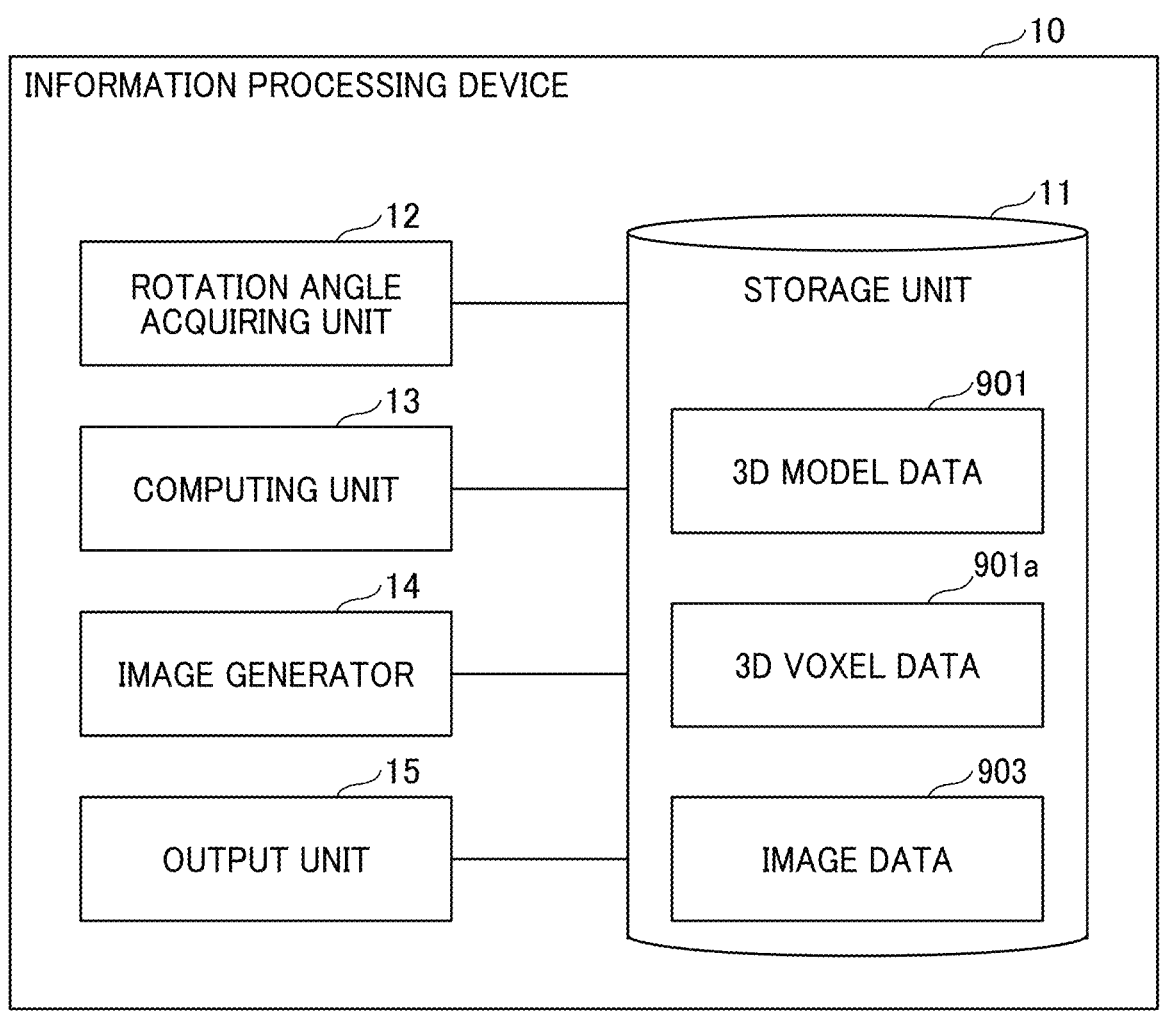
FIG. 4 is a diagram illustrating an example functional configuration of the information processing device of the display apparatus according to a first embodiment.

Next, a functional configuration of the information processing device 10 according to the first embodiment will be described with reference to FIG. 4. FIG. 4 is a diagram illustrating an example of a functional configuration of the information processing device 10. As illustrated in FIG. 4, the information processing device 10 includes a storage unit 11, a rotation angle acquiring unit 12, a computing unit 13, an image generator 14, and an output unit 15.

The storage unit 11 stores various types of data. Specifically, the storage unit 11 stores three-dimensional model data 901, three-dimensional voxel data 901a, and image data 903 (two-dimensional image data). Among these data, the three-dimensional model data 901 is data input from outside. In this example, the three-dimensional model data 901 is point cloud data. The three-dimensional voxel data 901a is image data, converted from the three-dimensional model data 901, so as to have a luminance value for each voxel. The image data 903 is generated by the image generator 14.

The storage unit 11 is implemented by the CPU 101 that controls the RAM 103 or the HDD 104, for example, according to a program stored in such as the ROM 102.

The rotation angle acquiring unit 12 acquires information indicating a rotation angle of the spiral screen 30. Specifically, the rotation angle acquiring unit 12 receives the rotation angle data 904 from the motor controller 41 periodically, for example, every second. Alternatively, the rotation angle acquiring unit 12 may acquire information indicating the rotation angle of the spiral screen 30, by calculating the rotation angle based on the time elapsed from the start of the rotation of the spiral screen 30, based on assumption that the rotation speed of the spiral screen 30 is substantially constant.

Alternatively, the rotation angle acquiring unit 12 may acquire information indicating the rotation angle of the spiral screen 30, by combining the rotation angle data 904 received from the motor controller 41 and the rotation angle calculated based on the elapsed time. For example, the rotation angle acquiring unit 12 corrects the rotation angle calculated based on the time elapsed from the start of rotation of the spiral screen 30, with the rotation angle data 904 that is periodically received. Thus, even if the actual rotation speed of the motor 40 differs from the preset rotation speed, the rotation angle acquiring unit 12 is able to correct the actual rotation angle based on the rotation angle data 904 that is periodically received.

The rotation angle data 904 indicates a rotation angle of the spiral screen 30.

The rotation angle acquiring unit 12 is implemented by the CPU 101 that controls the external device connection IF 105, for example, according to a program stored in such as the ROM 102.

The computing unit 13 calculates the height in the Z direction at each xy coordinates, for each rotation angle of the spiral screen 30, based on the rotation angle of the spiral screen 30.

The image generator 14 outputs two-dimensional image data generated according to at least one of an angle and a position of the spiral screen 30 that is rotating. Specifically, the image generator 14 converts the three-dimensional model data 901 into the three-dimensional voxel data 901a. For example, the computing unit 13 copies a luminance value of each coordinate for each point of point cloud data to a voxel for each corresponding coordinate. The image generator 14 reduces the colors of the three-dimensional voxel data 901a by dithering.

Based on the three-dimensional model data 901, the image generator 14 generates the image data 903 having luminance corresponding to the height calculated by the computing unit 13. Specifically, the image generator 14 determines a luminance corresponding to each xy coordinates to generate two-dimensional image data in two dimensions, thus resulting in generation of the three-dimensional image based on the three-dimensional model data 901, which is displayed in a manner visually recognizable by the user.

The computing unit 13 and the image generator 14 are implemented by the CPU 101 that executes processing according to a program stored in such as the ROM 102.

The output unit 15 outputs the image data 903 generated by the image generator 14. Specifically, the output unit 15 transmits the image data 903 to the projector 20.

The output unit 15 is implemented by the CPU 101 that controls the external device connection IF 105, for example, according to a program stored in such as the ROM 102.

Example Processing by Information Processing Device

Next, processing performed by the information processing device 10 will be described according to the embodiment.

The information processing device 10 receives the three-dimensional model data 901, and starts control processing in response to an operation by the user.

Figure 5:
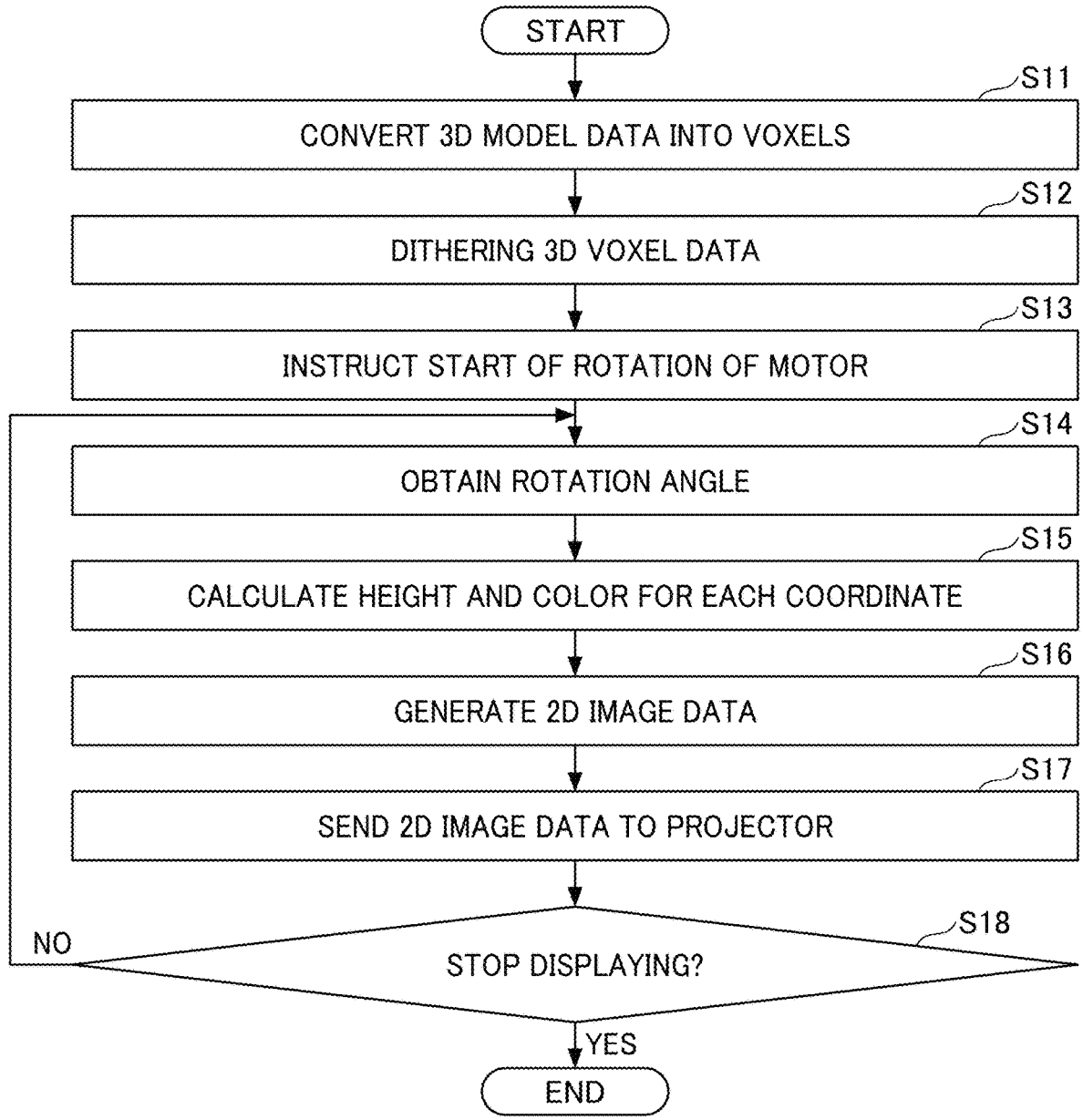
FIG. 5 is a flowchart illustrating example processing performed by the information processing device of the display apparatus, according to the first embodiment.

FIG. 5 is a flowchart illustrating an example processing performed by the information processing device 10.

At step S11, the image generator 14 converts the three-dimensional model data 901 into voxels. The three-dimensional model data 901 includes point cloud data (point cloud) and mesh data, for example. In this example, the point cloud data (point cloud) is a set of data points in xyz coordinates with a RGB luminance value. The mesh data indicates xyz coordinates of each vertice of a solid triangle or a solid quadrangle, and a color or a texture of each face of the solid triangle or the solid quadrangle.

The image generator 14 generates three-dimensional voxel data 901a by copying a luminance value of each coordinate for each point of point cloud data to a voxel of each corresponding coordinate.

Subsequently, at step S12, the image generator 14 applies dithering to the three-dimensional voxel data 901a. Specifically, the image generator 14 converts a voxel having a color depth of 8 bits per each of RGB channels into a voxel having a color depth of 1 bit per each of RGB channels. For example, the image generator 14 performs dithering by error diffusion to the voxel data for each of RGB channels. It is desirable that the image generator 14 performs three-dimensional error diffusion that is higher in accuracy, instead of general two-dimensional error diffusion.

The error diffusion is one of dithering techniques for creating the illusion of color depth to express an intermediate color, with reduced number of colors or gradations in image. The error, obtained as a difference from an original color, of a particular point is added to color information of a neighboring point of the particular point. In a two-dimensional image, the image generator 14 adds an error to a neighboring pixel on a plane in the two-dimensional direction of a xy coordinate system. In a three-dimensional image, the image generator 14 adds an error to a voxel in the three-dimensional direction of a xyz coordinate system. In order to reduce the computation load, the image generator 14 may independently perform the two-dimensional error diffusion for each XY plane in the Z-axis direction, instead of performing the three-dimensional error diffusion.

Subsequently, at step S13, the information processing device 10 instructs the motor controller 41 to start rotating the motor 40. The motor controller 41 controls the motor 40 so as to rotate the spiral screen 30 at a substantially constant speed that is previously set.

After that, the information processing device 10 repeatedly executes processing from step S14 to step S18 until displaying ends. In the case of displaying a video image, content of the two-dimensional image data that is displayed changes time by time. Accordingly, the two-dimensional image data to be displayed at each time t is generated and transmitted, through performing S14 to S18. The time t is a time at which the projector 20 emits image light L based on the generated two-dimensional image data.

At step S14, the rotation angle acquiring unit 12 acquires the rotation angle data 904 at time t. Specifically, the rotation angle acquiring unit 12 acquires information indicating the rotation angle of the spiral screen 30 from the motor controller 41. Alternatively, the rotation angle acquiring unit 12 may calculate the rotation angle based on a speed that is previously set to acquire information indicating the rotation angle. Further, when there is a difference between a measurement time at which the rotation angle is calculated and the current time t, the rotation angle acquiring unit 12 predicts and calculates the rotation angle of the spiral screen 30 at the current time t based on the difference between the measurement time and the current time t.

Subsequently, at step S15, the computing unit 13 calculates a height z (x, y) at each xy coordinates. Specifically, the computing unit 13 calculates the height z (x, y) using the rotation angle of the spiral screen 30 that is acquired.

At step S16, the image generator 14 generates two-dimensional image data, which is an example of the image data 903. Specifically, the image generator 14 generates two-dimensional image data having luminance corresponding to the calculated height z (x, y, t), as the two-dimensional image data to be displayed at the time t.

For example, when the three-dimensional voxel data 901a is a still image, the image generator 14 converts voxel (x, y, z) into pixel (x, y, t). The voxel (x, y, z) is a value indicating such as luminance, color, or transmittance of a particular voxel. The pixel (x, y, t) is a pixel value included in the two-dimensional image data, from which image light L emitted at the time t is generated.

When the three-dimensional voxel data 901a is a video image, the image generator 14 converts voxel (x, y, z, t), which is a value indicating luminance, color, or transmittance of a particular voxel including time t, into pixel (x, y, t).

Regardless of whether the three-dimensional voxel data 901a is a still image or a video image, the image generator 14 calculates a value of the pixel (x, y, t) at the time t based on the height z (x, y, t) and the color (x, y, t) of the spiral screen 30 at each xy coordinates at the time t. The image generator 14 stores the generated two-dimensional image data in the storage unit 11.

At step S17, the output unit 15 transmits the two-dimensional image data generated by the image generator 14 to the projector 20.

At step S18, the information processing device 10 determines whether or not to end displaying the image. When the information processing device 10 receives a user operation indicating the end of display, or when transmission of two-dimensional image data based on all video images is completed in a case where the three-dimensional model data 901 is a video image, the information processing device 10 determines to end displaying the image at S18 (Yes at S18).

When it is determined not to end displaying at step S18 (No at S18), the information processing device 10 returns the processing to step S14, and performs the processing from S14 to S18 in relation to the two-dimensional image to be displayed at the next time t. For example, the next time t may be a time after one second of the current time t.

On the other hand, when it is determined to end displaying at step S18 (Yes at S18), the information processing device 10 ends processing of FIG. 5.

Through the above-described processing by the information processing device 10, the display apparatus 1 displays a three-dimensional image.

First Example of First Embodiment

Next, a display apparatus 1A will be described according to a first example of the first embodiment. The same elements as those of the above-described embodiments are denoted by the same reference numerals, and redundant description thereof will be omitted as appropriate. The same applies to the examples and variations described below in the following embodiments.

The display apparatus 1A according to the present example acquires two-dimensional image data 903, which is generated based on the three-dimensional model data 901 according to at least one of an angle and a position of the spiral screen 30 rotated by the motor 40. For example, the display apparatus 1A reads and acquires two-dimensional image data 903 that is previously generated and stored in such as the storage unit 11.

Since a part of the spiral screen 30 at which image light L reaches changes along the Z direction with rotation of the spiral screen 30, the display apparatus 1A acquires two-dimensional image data 903 so as to match the irradiated spot of the spiral screen 30 with image light L, and outputs the acquired two-dimensional image data to the projector 20.

The projector 20 irradiates the spiral screen 30 with image light L based on the two-dimensional image data 903. The spiral screen 30 reflects some of image light L, to display a three-dimensional image by an afterimage effect.

In such case, if rotation of the spiral screen 30 and irradiation of image light L by the projector 20 are not synchronized with each other, the irradiated spot on the spiral screen 30 with image light L may deviate from an intended position, and the display position of the three-dimensional image may change.

In view of the above, in the present example, the two-dimensional image data to be acquired is changed (that is, the two-dimensional image data to be acquired is selected) based on driving cycle information indicating a driving cycle of the motor 40 and a light reception signal output in response to reception of a partial image light, which is a part of the image light. For example, the display apparatus 1A changes an order of reading and acquiring the two-dimensional image data stored in the storage unit 11, to change the two-dimensional image data to be processed. Accordingly, the irradiated spot on the spiral screen 30 with image light L is kept at the intended position, thus reducing variations in the display position of the three-dimensional image.

Example Configuration of Display Apparatus

FIG. 6 is a diagram illustrating an example configuration of the display apparatus 1A according to the present example. As illustrated in FIG. 6, the display apparatus 1A includes a sensor 72. The information processing device 10 is replaced by an information processing device 10a. In this specific example of FIG. 6, the information processing device 10a may be provided inside or outside the housing 60.

The sensor 72 is an example of a detection unit that outputs a light reception signal Sen, in response to reception of a partial image light Lp that is a part of image light L. The sensor 72 is, for example, an optical sensor including a photoelectric conversion element, and outputs a voltage signal corresponding to the light intensity of the received light.

The sensor 72 is disposed at a lower face of the screen case 50, such that its light receiving surface faces the projector 20 in the −Z direction. Accordingly, the sensor 72 receives the partial image light Lp other than a screen light Lq of the image light L emitted by the projector 20 to the spiral screen 30. The installed location of the sensor 72 is not limited to the location illustrated in FIG. 6, and may be any location as long as it can receive the partial image light Lp. The sensor 72 is electrically connected to the information processing device 10a and outputs the light reception signal Sen to the information processing device 10a.

The motor 40 is attached with the rotary encoder 42, which transmits the encoder signal 203 including a home position signal HP to the information processing device 10a. The home position signal HP of the encoder signal 203 is a signal indicating an origin of the rotation, and is an example of driving cycle information indicating the driving cycle RT of the spiral screen 30 by the motor 40. Alternatively, the driving cycle information may be a signal output from a home position sensor provided in the motor 40 separately from the rotary encoder 42.

Example Functional Configuration of Information Processing Device

Figure 7:
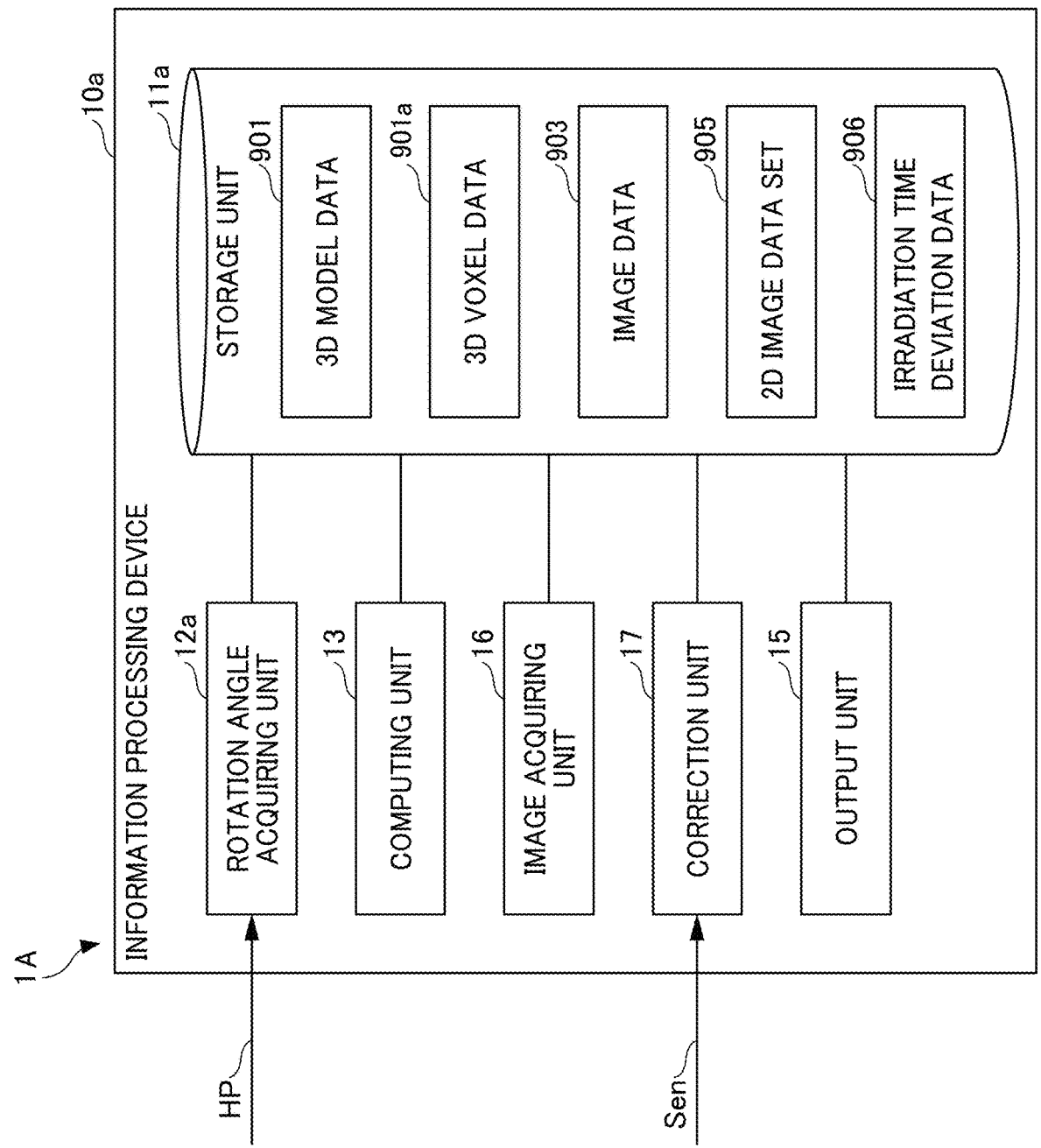
FIG. 7 is a diagram illustrating an example functional configuration of an information processing device of the display apparatus according to the first example of the first embodiment.

Next, FIG. 7 is a block diagram illustrating an example functional configuration of the information processing device 10a in the display apparatus 1A. As illustrated in FIG. 7, the information processing device 10a includes a rotation angle acquiring unit 12a, a storage unit 11a, the computing unit 13, the image acquiring unit 16, a correction unit 17, and the output unit 15. The storage unit 11a stores two-dimensional image data set 905 and irradiation time deviation data 906, in addition to various data described above referring to FIG. 4.

The rotation angle acquiring unit 12a acquires driving cycle information indicating the driving cycle RT of the spiral screen 30.

The two-dimensional image data set 905 is a set of a plurality of two-dimensional images, each of which is previously generated according to at least one of the angle and the position of the spiral screen 30 rotated by the motor 40 based on the three-dimensional model data 901 and is stored in the storage unit 11a.

The storage unit 11a stores two-dimensional image data associated with at least one of the angle and the position of the spiral screen 30, in an order in which the angle or the position of the spiral screen 30 that is rotating changes, as the two-dimensional image data set 905.

The image acquiring unit 16 reads and acquires a desired two-dimensional image data, from among the two-dimensional image data set 905 in the storage unit 11a.

Since the spiral screen 30 rotates at a substantially constant speed as driven by the motor 40, the image acquiring unit 16 sequentially reads out two-dimensional image data, in the order indicated by a value of an image counter that is incremented. That is, the image acquiring unit 16 sequentially acquires two-dimensional image data associated with at least one of the angle and the position of the spiral screen 30, and outputs the acquired two-dimensional image data to the projector 20 via the output unit 15. Compared to the above-described example case of FIGS. 4 and 5 in which the two-dimensional image data according to at least one of the angle and the position of the spiral screen 30 is generated in realtime, the display apparatus 1A is able to acquire desired two-dimensional image data with higher processing speeds and with relatively simple operation.

The irradiation time deviation data 906 indicates a deviation in irradiation time at which image light L is irradiated to the spiral screen 30, based on a positional relationship between the motor 40 and the spiral screen 30. For example, when the spiral screen 30 is attached in a state in which the angle is shifted around the rotation axis of the motor 40, the position of the spiral screen 30 in the Z direction according to the rotation of the motor 40 may be shifted from a desired position.

The irradiation time deviation data 906 indicates that the irradiation time at which image light L is irradiated to a desired position of the spiral screen 30 in the Z direction, deviates from the desired time, due to the above-described shift in positional relationship. The irradiation time may deviate from the desired irradiation time in either way, such that the irradiation time may be delayed or accelerated.

The deviation time $\Delta T0$, which indicates deviation in irradiation time, may be previously measured at the time of manufacturing the display apparatus 1. To obtain the irradiation time deviation data expressed by the number of frames of the image light L, the measured deviation time $\Delta T0$ is divided by the irradiation cycle (frame rate) FT of irradiation to the projector 20 with image light L. The calculated irradiation time deviation data 906 may be previously stored in the storage unit 11a.

The information processing device 10a reads and acquires the two-dimensional image data from the two-dimensional image data set 905. In some cases, acquisition of the two-dimensional image data may be gradually delayed with respect to rotation of the motor due to a processing load or the like. Due to this delay, the time at which a desired position in the Z direction on the spiral screen 30 is irradiated with the image light L may be shifted. This may cause the position at which the three-dimensional image data is displayed to gradually shift, for example, in the +Z direction.

In view of this, the correction unit 17 changes the two-dimensional image data to be acquired by the image acquiring unit 16 based on the home position signal HP, the light reception signal Sen, and the irradiation time deviation data 906, thus compensating influence caused by deviation in irradiation time or delay due to the processing load. For example, the correction unit 17 performs the above-described correction by changing an order of the two-dimensional image data to be read from the two-dimensional image data set 905 by the image acquiring unit 16.

Specifically, the correction unit 17 acquires a number of frames ("a number of irradiation deviation frames") corresponding to the irradiation time deviation data 906 from the storage unit 11a. Further, since the sensor 72 outputs the light reception signal Sen indicating a switching cycle DT at which the three-dimensional image is switched, the correction unit 17 detects a difference time $\Delta T1$ between the switching cycle DT and the driving cycle RT. The correction unit 17 divides the difference time $\Delta T1$ by the irradiation cycle FT at which the image light L is irradiated by the projector 20, to acquire difference in number of frames ("number of difference frames") corresponding to the delay due to, for example, computation. The driving cycle RT corresponds to a rotation cycle of the spiral screen 30 by the motor 40.

The correction unit 17 counts up a value of the image counter by a number of correction frames, which is obtained by adding a number of irradiation deviation frames corresponding to the irradiation time deviation data 906 and a number of difference frames corresponding to the delay due to, for example, the processing load. Accordingly, the order of the two-dimensional image data 903 acquired by the image acquiring unit 16 is changed while skipping one or more frames to be acquired, to compensate influence caused by deviation in irradiation time or delay due to the processing load.

Further, when the spiral screen 30 rotates for the first time, the correction unit 17 is able to correct deviation in irradiation time for the first rotation of the spiral screen 30, by changing a frame number of the frame to be acquired, corresponding to the irradiation time deviation data 906 to the initial value of the image counter.

Figure 10:
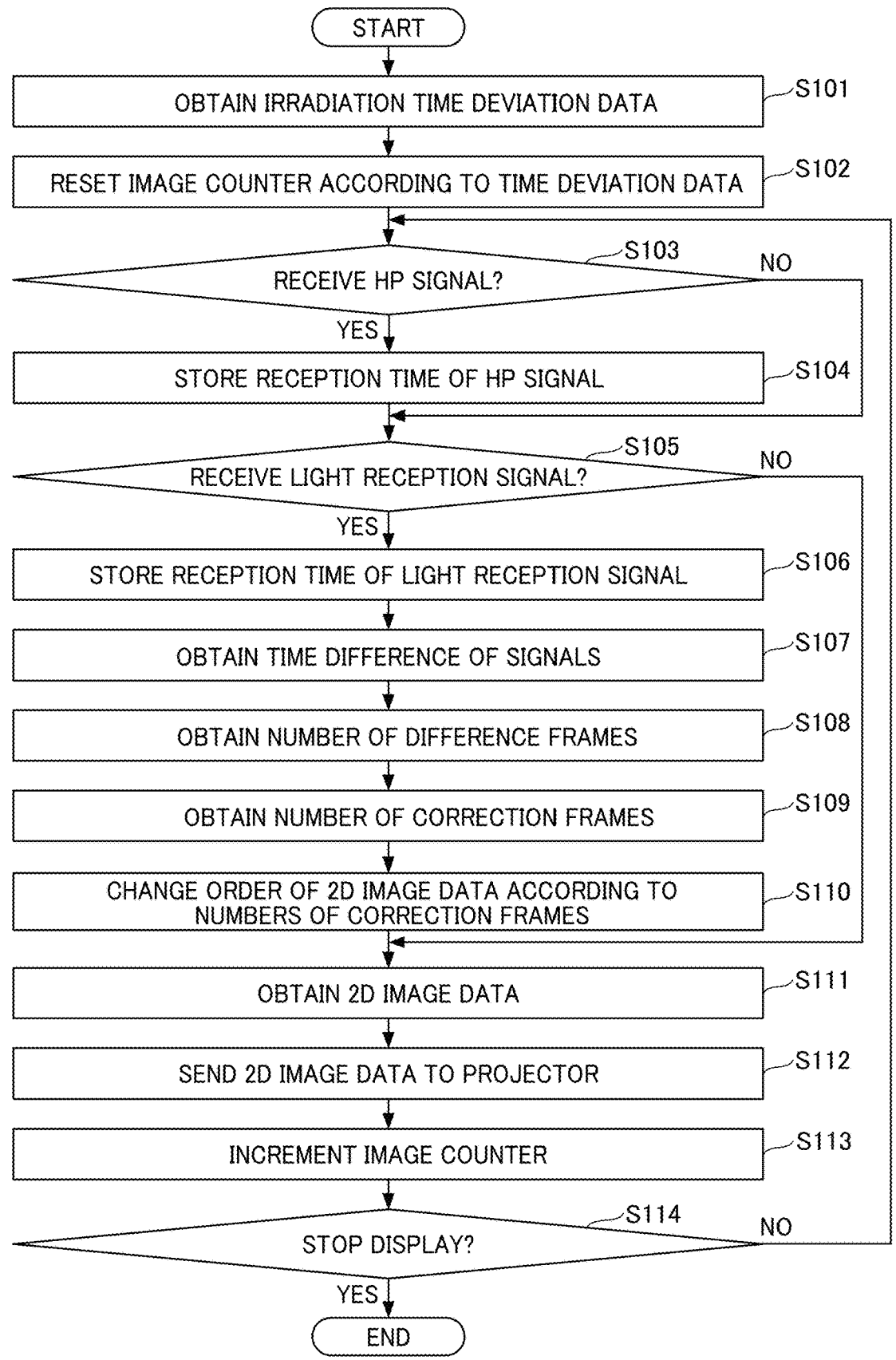
FIG. 10 is a flowchart illustrating example processing performed by the information processing device of the display apparatus, according to the first example of the first embodiment.

The processing performed by the correction unit 17 will be described in more detail with reference to FIG. 10.

Figure 8:
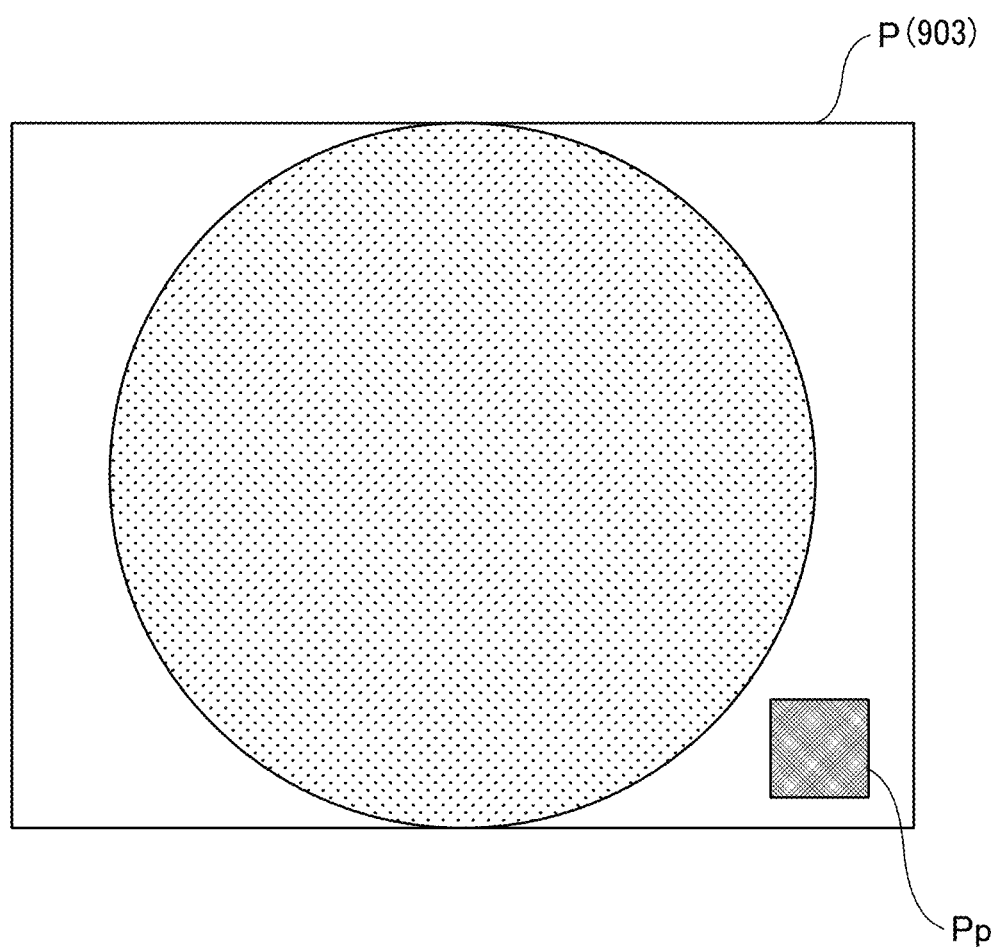
FIG. 8 is a diagram illustrating an example of two-dimensional image data.

FIG. 8 is a diagram illustrating two-dimensional image data P, as an example of image data 903 to be processed by the display apparatus 1A. As illustrated in FIG. 8, the two-dimensional image data P includes a graphical image Pp. The graphical image Pp is a rectangular image near a corner of the two-dimensional image data P, and is an example of a predetermined graphical image at a predetermined location in the two-dimensional image data. The graphic image Pp is not limited to a rectangular image, and may be an image having any shape.

Figure 9:
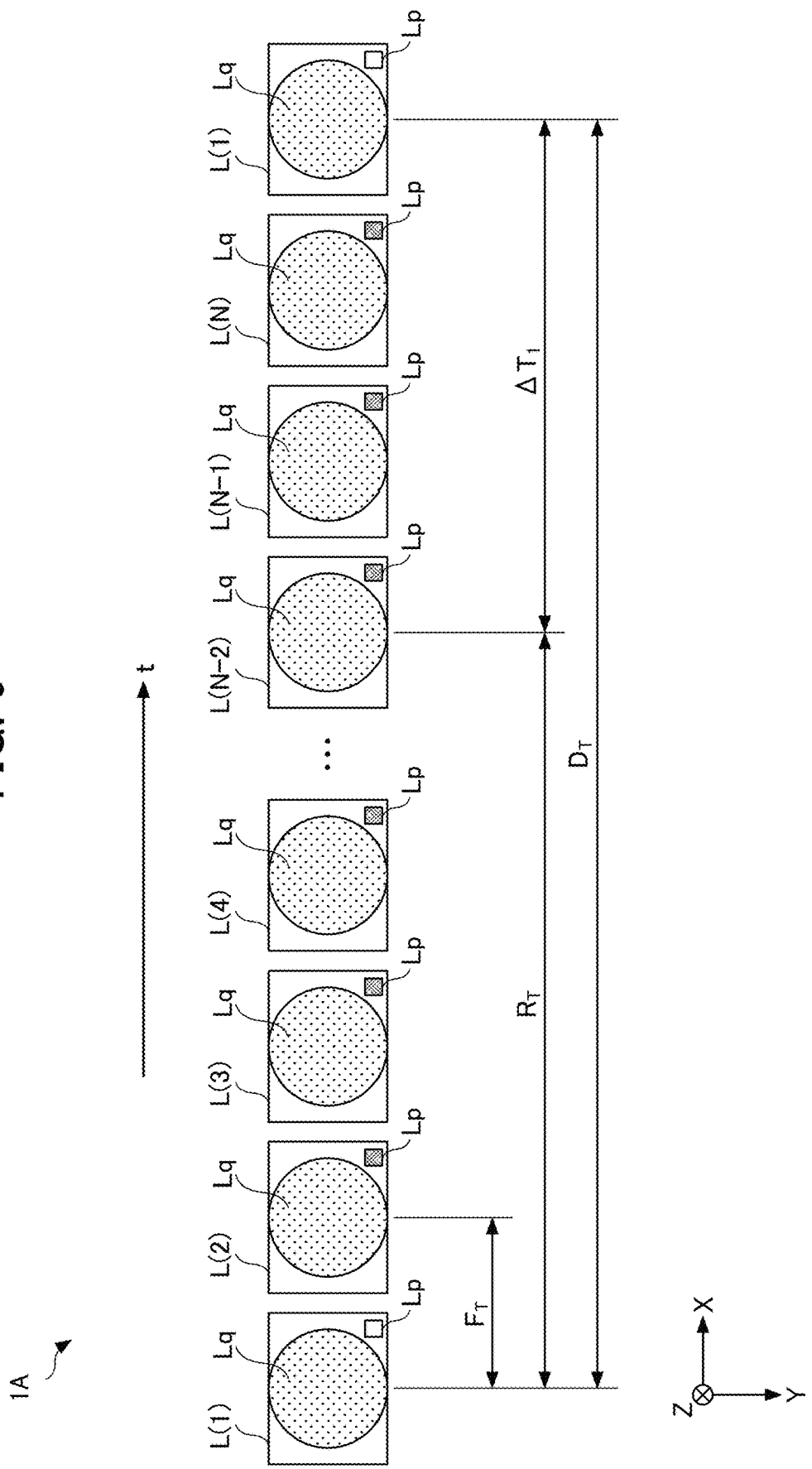
FIG. 9 is a diagram illustrating an example of image light, processed by the display apparatus, according to the first example of the first embodiment.

FIG. 9 is a diagram illustrating an example of image light L. FIG. 9 illustrates image light L emitted from the projector 20 to the spiral screen 30 when viewed from the projector 20, and illustrates how image light L is switched according to time along a time axis t indicated by an arrow.

In FIG. 9, image light L is switched as time passes along the time axis t, as expressed by image light $L(1), L(2), \ldots L(N-1)$, and $L(N)$. The subscript of the image light L represents the numerical value of the image counter. N is a natural number and represents the total number of frames of the two-dimensional image data P, which is output to the projector 20 within a period of the switching cycle DT for determining timing when the three-dimensional image to be processed is switched.

The image light L is switched every irradiation cycle FT as the two-dimensional image data P is switched every irradiation cycle FT according to the rotation of the spiral screen 30. The spiral screen 30 rotates once every driving cycle RT. The three-dimensional image displayed by the display apparatus 1A is switched and updated every switching cycle DT.

As an example, the irradiation cycle FT is 1/60 [seconds] and the switching cycle DT is 400/60 [seconds]. That is, the projector 20 emits image light L based on 60 frames of the two-dimensional image data P per second, and emits image light L corresponding to 400 frames of the two-dimensional image data P within a period of the switching cycle DT.

As illustrated in FIG. 9, image light L includes partial image light Lp based on the graphical image Pp included in the two-dimensional image data P, and screen light Lq to be irradiated to the spiral screen 30.

In the present embodiment, the projector 20 emits image light L, such that the color of the partial image light Lp changes from white to black or from black to white, according to the switching cycle DT at which the three-dimensional image is switched. Further, the color of the partial image light Lp is black outside the period of one irradiation cycle FT within the switching cycle DT. The color of the partial image light Lp changes to white only during the period of one irradiation cycle FT within the switching cycle DT. The period of one irradiation cycle FT is an example of a predetermined time period.

The sensor 72 installed to receive the partial image light Lp outputs a low-level light reception signal Sen having a low signal level, to receive a black partial image light Lp outside a period of one irradiation cycle FT within the switching cycle DT.

The sensor 72 outputs a high-level light reception signal Sen having a high signal level, to receive a white partial image light Lp in the period of one irradiation cycle FT within the switching cycle DT. Therefore, the display apparatus 1A is able to detect the switching cycle DT based on the light reception signal Sen, at the time when the light reception signal Sen output from the sensor 72 becomes a high-level.

Although the present example describes a case in which the color of the partial image light Lp is black or white, the color is not limited to black or white and any other color may be used. Alternatively, the same color may be used for the partial image light Lp, but luminance of the color may be changed between a time period of one irradiation cycle FT and a time period outside such time period within the switching cycle DT. In another example, both the luminance and the color of the partial image light Lp may be changed between different time periods.

In the example illustrated in FIG. 9, the switching cycle DT is longer than the driving cycle RT by the time difference ΔT1. The time difference ΔT1 corresponds to the delay due to the processing load.

Example Processing by Information Processing Device

Next, processing performed by the information processing device 10a will be described according to this example. FIG. 10 is a flowchart illustrating example processing performed by the information processing device 10a, according to the first example of the first embodiment. The information processing device 10a starts processing to control displaying in response to an operation by a user.

First, at step S101, the correction unit 17 acquires the irradiation time deviation data 906 from the storage unit 11a.

Subsequently, at step S102, the correction unit 17 initializes a value of the image counter according to the irradiation time deviation data 906. For example, if the irradiation time deviation data 906 indicates a deviation of two frames, the correction unit 17 sets the initial value of the image counter to 3 (=1+2).

At step S103, the information processing device 10a determines whether or not the home position signal HP is received by the rotation angle acquiring unit 12.

When it is determined that the home position signal HP is not received at step S103 (No at S103), the information processing device 10a proceeds the processing to step S105. When it is determined that the home position signals HP is received at step S103 (Yes at S103), at step S104, the information processing device 10a stores the time tHP at which the home position signal HP is received, and the processing proceeds to step S105.

Subsequently, at step S105, the information processing device 10a determines whether or not the light reception signal Sen is received by the correction unit 17.

When it is determined that the light reception signal Sen is not received at step S105 (No at S105), the information processing device 10a proceeds the processing to step S111.

When it is determined that the light reception signal Sen is received at step S105 (Yes at S105), at step S106, the information processing device 10a stores the time tSen at which the light reception signal Sen is received, and the processing proceeds to step S107.

Subsequently, at step S107, the correction unit 17 acquires a time difference ΔT1 by calculating a difference between the time tHP and the time tSen.

At step S108, the correction unit 17 divides the time difference ΔT1 by the irradiation cycle FT to acquire the number of difference frames ΔT1/FT.

At step S109, the correction unit 17 acquires the number of correction frames by adding a number of irradiation deviation frames corresponding to the irradiation time deviation and the number of difference frames corresponding to the delay due to compensation.

Subsequently, at step S110, the correction unit 17 counts up the image counter by the acquired number of correction frames, so as to change the order of the two-dimensional image data P to be acquired by the image acquiring unit 16. For example, when the number of correction frames is six, the information processing device 10a outputs the first frame of the two-dimensional image data P to the projector 20, and then changes the order so that the information processing device 10a does not output the second frame of the two-dimensional image data P but outputs the seventh frame of the two-dimensional image data P, which has been originally set to be read six frames later.

At step S111, the image acquiring unit 16 reads and acquires the two-dimensional image data P corresponding to the image counter, which is updated, from the two-dimensional image data set 905.

At step S112, the image acquiring unit 16 transmits the two-dimensional image data P to the projector 20 via the output unit 15.

At step S113, the correction unit 17 increments the value of the image counter by one.

At step S114, the information processing device 10a determines whether or not to end displaying the image. This determination is made, for example, based on a user operation on the display apparatus 1A.

When it is determined that the processing is to end at step S114 (Yes at S114), the information processing device 10a ends the processing. When it is determined that the processing is not to end (No at S114), the information processing device 10a repeats the processing after step S103.

Through the above-described processing performed by the information processing device 10a, the display apparatus 1A displays a three-dimensional image.

Timing Example of Signals

Figure 11:
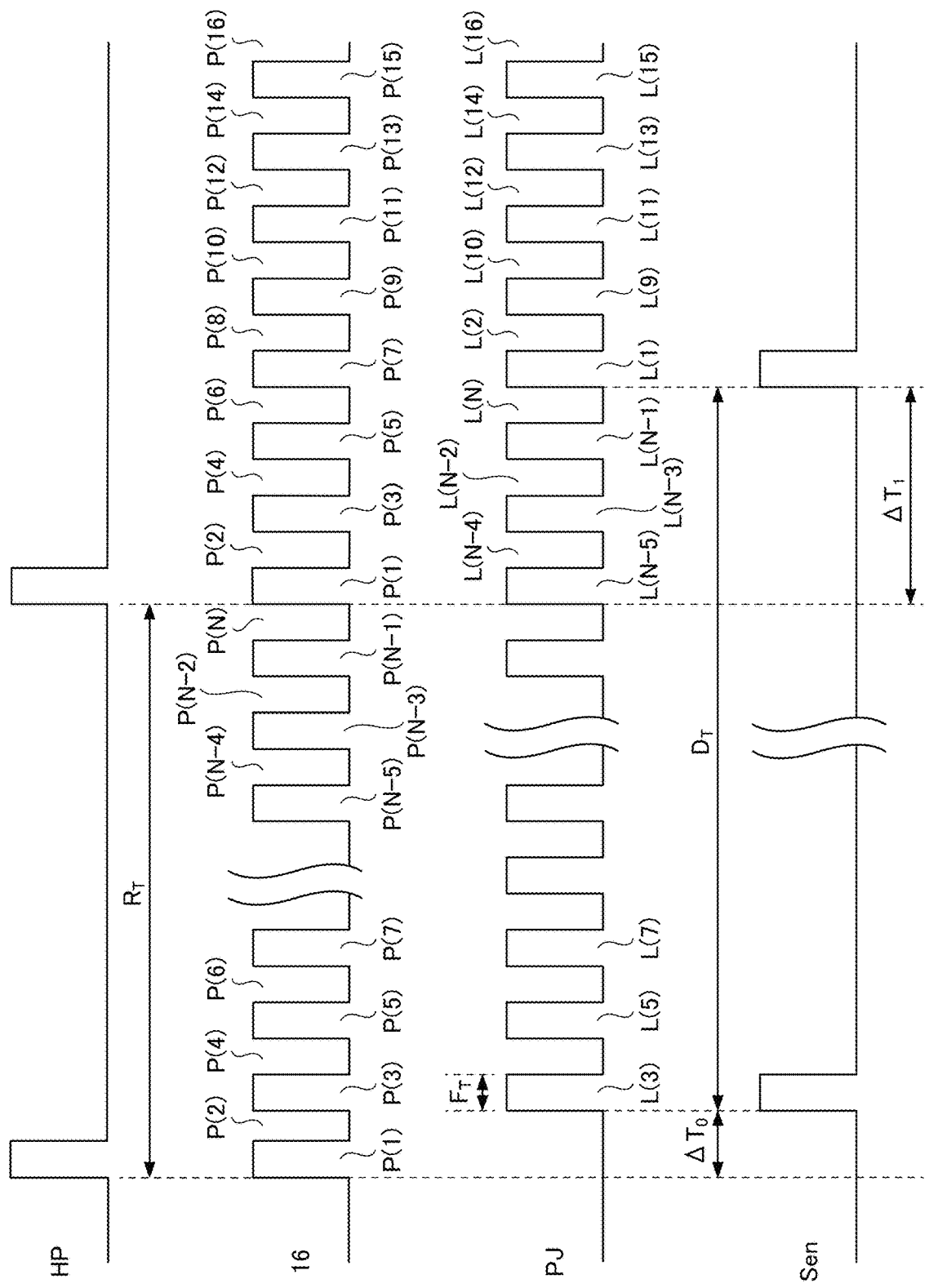
FIG. 11 is a timing chart illustrating output of signals, processed by the display apparatus, according to the first example of the first embodiment.

Next, with reference to FIG. 11, timings of various signals in the display apparatus 1A, such as the home position signal HP and the light-receiving signal Sen, will be described. FIG. 11 is a timing chart illustrating timings of signals according to the present example. FIG. 11 illustrates the home position signal HP, the two-dimensional image data P acquired by the image acquiring unit 16, the image light L emitted by the projector 20, and the light reception signal Sen from the sensor 72, respectively, in this order from top to bottom.

In FIG. 11, switching of the two-dimensional image data P is represented as two-dimensional image data P(1), P(2), . . . , P(N−1), and P(N), and switching of the image light L is represented as image light L(1), L(2), . . . , L(N−1), and L(N). Subscripts of the two-dimensional image data P and the image light L each represent a numerical value of the image counter. N is a natural number and represents the total number of frames of the two-dimensional image data P, which is output to the projector 20 within a period of the switching cycle DT for determining timing when the three-dimensional image to be processed is switched.

As illustrated in FIG. 11, the image acquiring unit 16 acquires the two-dimensional image data P(1) according to the output of the home position signal HP, and then sequentially acquires the two-dimensional image data P in the order from the two-dimensional image data P (1), P (2), . . . at a substantially constant period according to the rotation speed of the spiral screen 30.

In the example of FIG. 11, a deviation time ΔT0 of irradiation time by the projector occurs according to the positional relationship between the motor 40 and the spiral screen 30. The deviation time ΔT0 of this example is a deviation of two frames, which is equal to the irradiation cycle FT.

The correction unit 17 initializes a value of the image counter according to the irradiation time deviation data 906. Since the number of irradiation deviation frames is one frame, the correction unit 17 corrects the irradiation time deviation for the first rotation of the spiral screen 30 by setting the initial value of the image counter to 3.

Thereafter, when the spiral screen 30 makes one rotation, the home position signal HP is output, and the image acquiring unit 16 acquires the two-dimensional image data P(1).

In the example of FIG. 11, the acquisition of the two-dimensional image P is gradually delayed with respect to the rotation of the motor 40 due to a processing load or the like, and a time difference ΔT1 occurs at the time when the spiral screen 30 makes one rotation. As the sensor 72 receives a partial image light Lp of the image light L(1) emitted with a delay of the time difference ΔT1, the sensor 72 outputs the light reception signal Sen, which is delayed from the home position signal HP by the time difference ΔT1.

Accordingly, the correction unit 17 acquires the time difference ΔT1 between the home position signal HP and the light reception signal Sen, and divides the time difference ΔT1 by the irradiation cycle FT to obtain the number of difference frames of 6 frames. The correction unit 17 adds the number of irradiation deviation frames of 2 and the number of difference frames of 6, to obtain the number of correction frames of 8. The correction unit 17 then counts up the image counter by 8 to change the order of the two-dimensional image data to be acquired, so that the image light L(9) is irradiated next to the image light L(1).

In this way, the correction unit 17 compensates influence caused by deviation in irradiation time or delay due to the processing load.

As described above, the display apparatus 1A includes the spiral screen 30 (irradiated section) that displays a three-dimensional image with reflected light of the irradiated image light L, the motor 40 (driver) that drives the spiral screen 30, and the image acquiring unit 16 that acquires the two-dimensional image data generated according to at least one of the angle and the position of the spiral screen 30 to be driven.

The display apparatus 1A includes the projector 20 (irradiation device) that irradiates the spiral screen 30 with image light L based on the two-dimensional image data P, the rotation angle acquiring unit 12a (driving cycle acquiring unit) that acquires driving cycle information indicating a driving cycle RT of the spiral screen 30, and the sensor 72 (detection unit) that outputs a light reception signal Sen in response to reception of partial image light Lp that is a part of the image light L.

In the present example, the display apparatus 1A changes (that is, selects) the two-dimensional image data P to be acquired based on the driving cycle information indicating the driving cycle of the spiral screen 30 and the light reception signal Sen generated in response to the partial image light Lp which is a part of the image light L. For example, the display apparatus 1A changes an order of reading and acquiring the two-dimensional image data P stored in the storage unit 11a, to change the two-dimensional image data to be processed. Accordingly, the irradiated spot on the spiral screen 30 with image light L is kept at the intended position, thus reducing variations in the display position of the three-dimensional image.

For example, since the time difference ΔT1 between the switching cycle DT and the driving cycle RT varies depending on the processing load of the information processing device 10a, a delay corresponding to the processing load of the information processing device 10a may not be accurately corrected by resetting the image counter based on only the home position signal HP. In view of this, in this example, since correction is performed based on the light reception signal Sen output in response to reception of the partial image light Lp, the display apparatus 1 is able to accurately correct the delay according to the processing load of the information processing device 10a.

Further, in the present example, the sensor 72 is disposed at a location so as to receive the partial image light Lp, other than the screen light Lq, of the image light L emitted to the spiral screen 30. Thus, the sensor 72 is able to receive the partial image light Lp, without blocking the screen light Lq, to acquire information indicating the time difference ΔT1.

In this example, the two-dimensional image data P includes the graphical image Pp (predetermined graphical image) at a predetermined area of the two-dimensional image data P. The sensor 72 outputs a light reception signal Sen in response to reception of the partial image light Lp corresponding to the graphical image Pp. Thus, the sensor 72 is able to receive the partial image light Lp, without blocking the screen light Lq, to acquire information indicating the time difference ΔT1, with a simple structure.

In the present example, the sensor 72 outputs the light reception signal Sen indicating the switching cycle DT at which the three-dimensional image is switched. The correction unit 17 changes the order of the two-dimensional image data P based on the irradiation cycle FT of the image light L emitted from the projector 20 and the time difference ΔT1 between the switching cycle DT and the driving cycle RT. Accordingly, the irradiated spot on the spiral screen 30 with image light L is kept at the intended position, thus reducing variations in the display position of the three-dimensional image.

Further, in this example, the storage unit 11a stores the irradiation time deviation data 906 indicating a deviation in irradiation time at which image light L is irradiated to the spiral screen 30, based on a positional relationship between the motor 40 and the spiral screen 30. The correction unit 17 changes the order of two-dimensional image data P to be read, based on the irradiation cycle FT, the time difference ΔT1, and the irradiation time deviation data 906.

Accordingly, the display apparatus 1A is able to accurately correct, not only the delay due to the processing load of the information processing device 10a, but also the irradiation time deviation due to the installation error of the spiral screen 30 with respect to the motor 40.

In this example, at least one of luminance and color of the partial image light Lp changes according to the switching cycle DT. For example, at least one of luminance and color of the partial image light Lp changes only during a period (predetermined period) of one irradiation cycle FT in the switching cycle DT. Thus, the sensor 72 is able to receive the partial image light Lp, without blocking the screen light Lq, to acquire information indicating the time difference ΔT1, with a simple structure.

Figure 12:
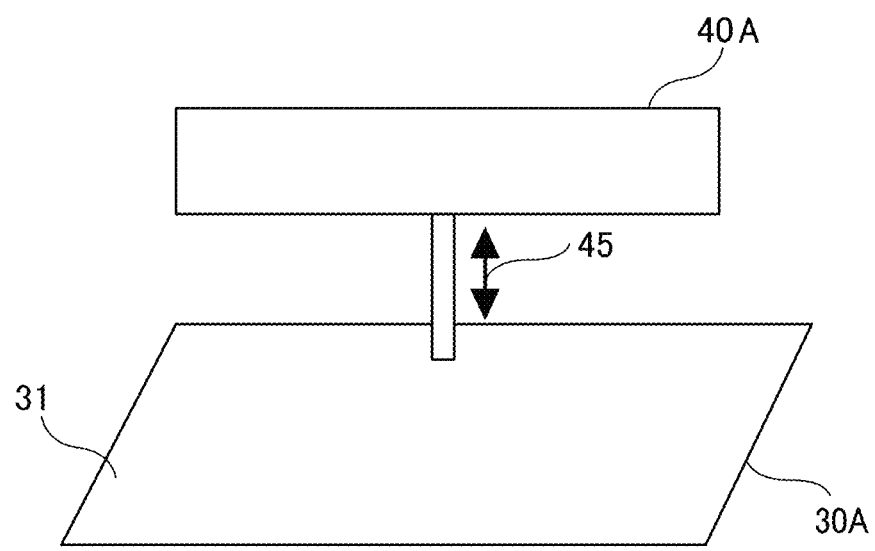
FIG. 12 is a diagram illustrating an irradiated section according to a variation of the first example of the first embodiment.

In the present example, the spiral screen 30 is illustrated as an example of the irradiated section, but the irradiated section is not limited thereto. FIG. 12 is a diagram illustrating an irradiated section according to a variation of the first example.

FIG. 12 illustrates a flat screen 30A, formed in a plate. The flat screen 30A is an example of planar member having a flat surface, as an example of an irradiated section. The flat screen 30A moves in a reciprocal manner along a direction of an arrow 45 by a stage 40A, which is an example of a driving unit. Any one of the above-described examples is applicable to the display apparatus that displays a three-dimensional image by an afterimage effect by irradiating image light L to the flat screen 30A as described above.

Second Example of First Embodiment

Next, a display apparatus 1B according to a second example of the second embodiment will be described. In the first example, the partial image light Lp of the image light L emitted by the projector 20 changes in at least one of luminance and color, only during a period of one irradiation cycle FT within the switching cycle DT. In the second example, at least one of luminance and color of the partial image light Lpb of the image light Lb emitted by the projector 20 alternately changes in each switching cycle DT.

Figure 13:
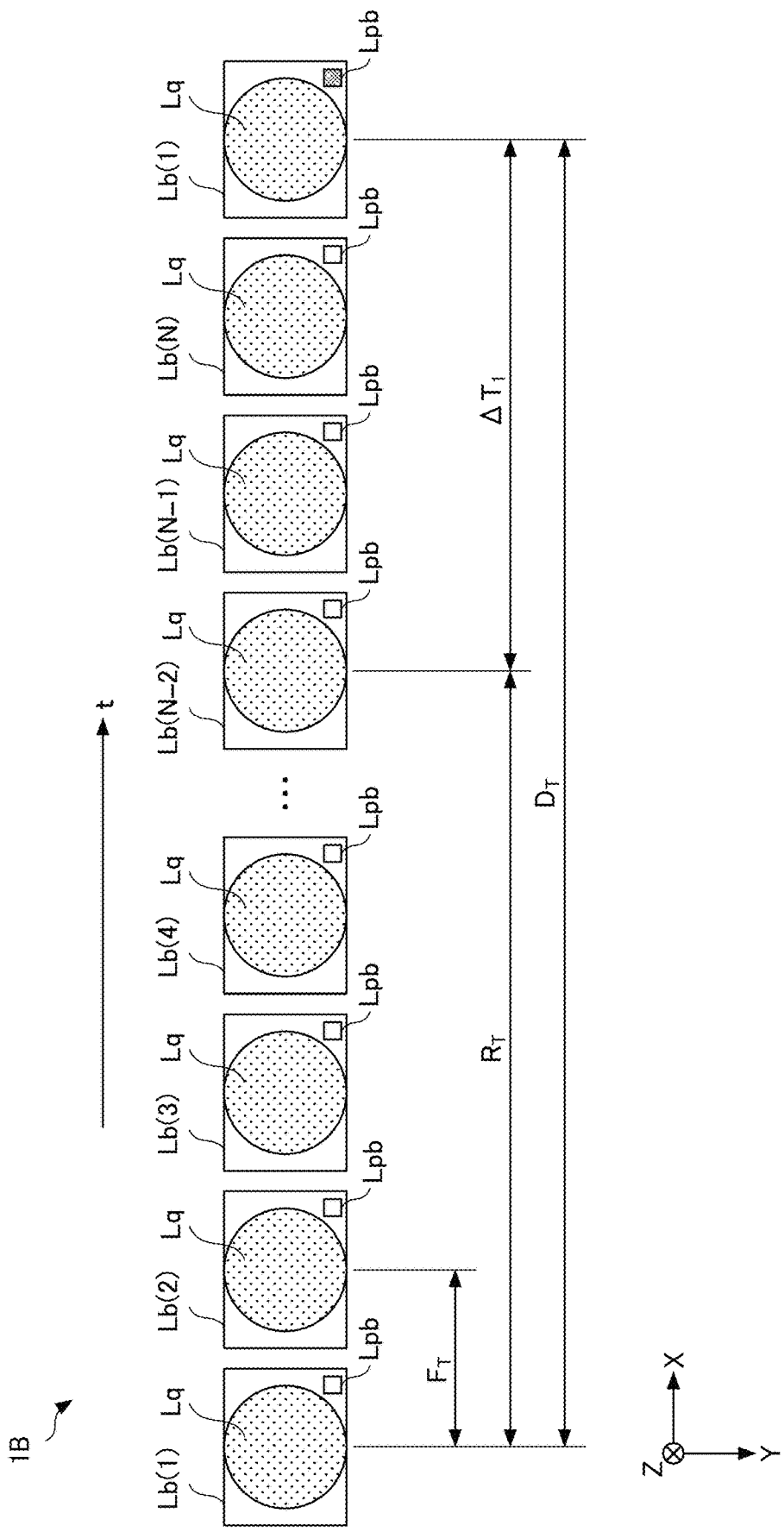
FIG. 13 is a diagram illustrating an example of image light, processed by the display apparatus, according to a second example of the first embodiment.

FIG. 13 is a diagram illustrating an example of image light Lb according to the present example. FIG. 13 illustrates image lights in a similar manner as described above referring to FIG. 9.

As illustrated in FIG. 13, in this example, the color of the partial image light Lpb changes from white to black or from black to white, according to the switching cycle DT at which the three-dimensional image is switched. Further, the color of the partial image light Lpb alternately changes from white to black or from black to white in each switching cycle DT.

In the example of FIG. 13, the color of the partial image light Lpb is all white in the first period of the switching cycle DT, and the color of the partial image light Lpb is all black in the second period of the switching cycle DT.

Figure 14:
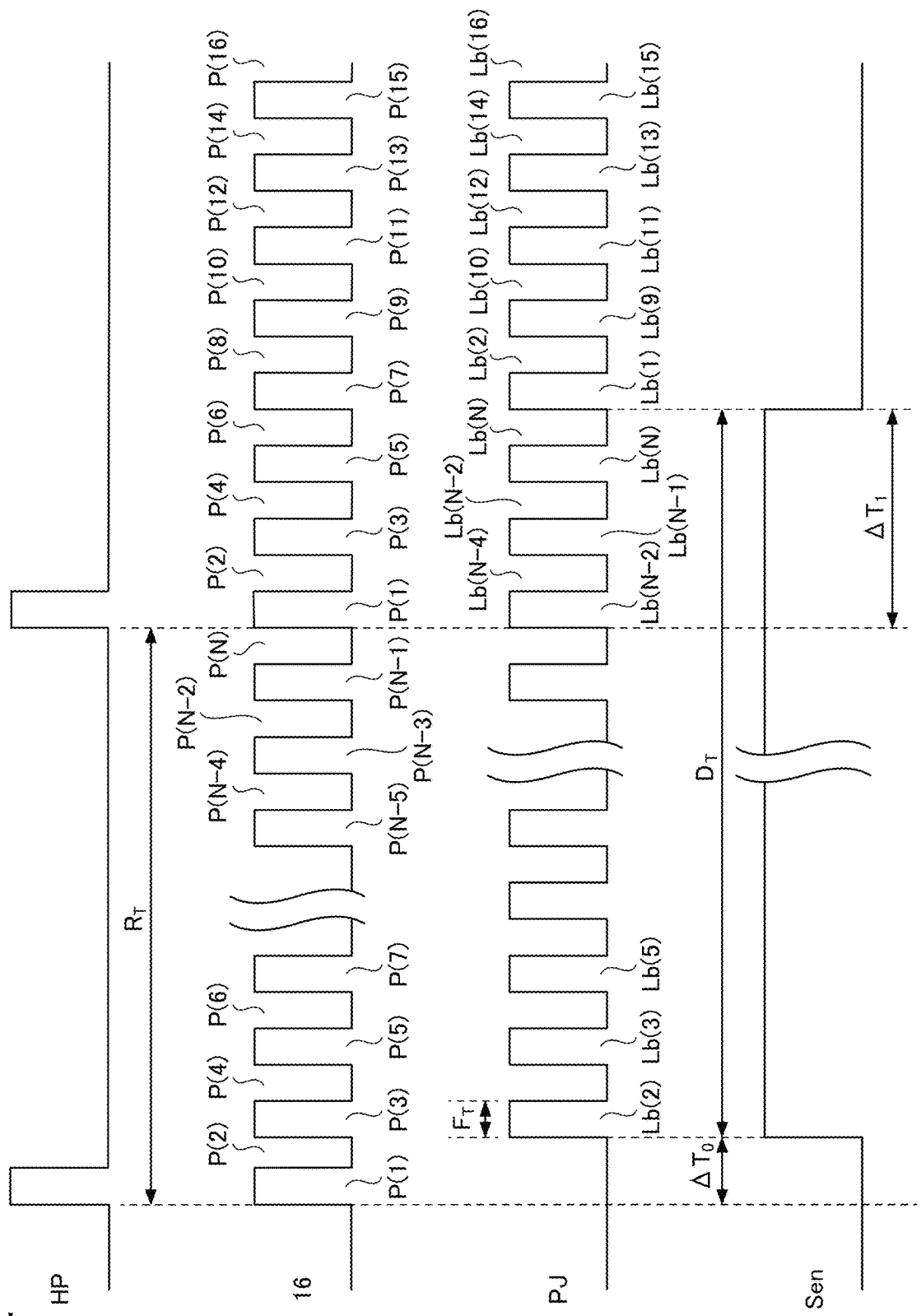
FIG. 14 is a timing chart illustrating output of signals, processed by the display apparatus, according to the second example of the first embodiment.

FIG. 14 is a timing chart illustrating timings of signals according to the present example. FIG. 14 illustrates various signals in a similar manner as described above referring to FIG. 11.

As illustrated in FIG. 14, the light reception signal Sen output from the sensor 72 constantly indicates High in the first period of the switching cycle DT and constantly indicates Low in the second period of the switching cycle DT. Therefore, the switching cycle DT can be detected at the time when the light receiving signal Sen is switched from High to Low or from Low to High.

As described above, the switching cycle DT can also be detected by using the partial image light Lpb whose color alternately changes from white to black or from black to white for each switching cycle DT.

Although the present example describes a case in which the color of the partial image light Lp is black or white, the color is not limited to black or white and any other color may be used. Alternatively, the same color may be used for the partial image light Lp, but the luminance may be alternately changed for each switching cycle DT. In another example, both the luminance and the color may be alternately changed for each switching cycle DT.

Although the embodiments have been described above, the present invention is not limited to the embodiments specifically disclosed above, and various modifications and variations can be made without departing from the scope of the claims.

For example, the information processing device 10a may be provided outside any one of the display apparatuses 1A and 1B. In such case, the storage unit 11a may be provided at the information processing device 10a. In such case, the display apparatus and the information processing device are communicably connected via a network such as the internet to implement a display system. The information processing device is, for example, an external server such as a cloud server.

The information processing device stores, in the storage unit 11a, a two-dimensional image data set 905 including a plurality of items of two-dimensional image data P generated according to at least one of an angle and a position of the spiral screen 30 to be driven. The image acquiring unit 16 of the display apparatus 1A or 1B acquires two-dimensional image data P from the two-dimensional image data set 905 stored in the information processing device 10a via the network.

In the first embodiment, a display control method, performed by the display apparatus that displays a three-dimensional image using an afterimage effect, is provided. The display control method includes driving, with a driver, an irradiated section to be irradiated with image light, causing a three-dimensional image be displayed based on reflected image light in a manner visible to a user using an afterimage effect. The display control method further includes acquiring two-dimensional image data generated according to at least one of an angle or a position of the irradiation section being driven. The display control method further includes irradiating the irradiated section with the image light based on the two-dimensional image data that is acquired; outputting a light reception signal in response to reception of a partial image light that is a part of the image light from the irradiation device; and selecting the two-dimensional image data to be acquired based on driving cycle information indicating a driving cycle of the driver and the light reception signal.

According to such display control method, the same effects as those of the above-described display apparatus can be obtained.

In the first embodiment, a control program for causing a computer to execute the above-described display control method is provided.

Second Embodiment

Next, a second embodiment will be described with reference to FIGS. 15 to 35.

Figure 15:
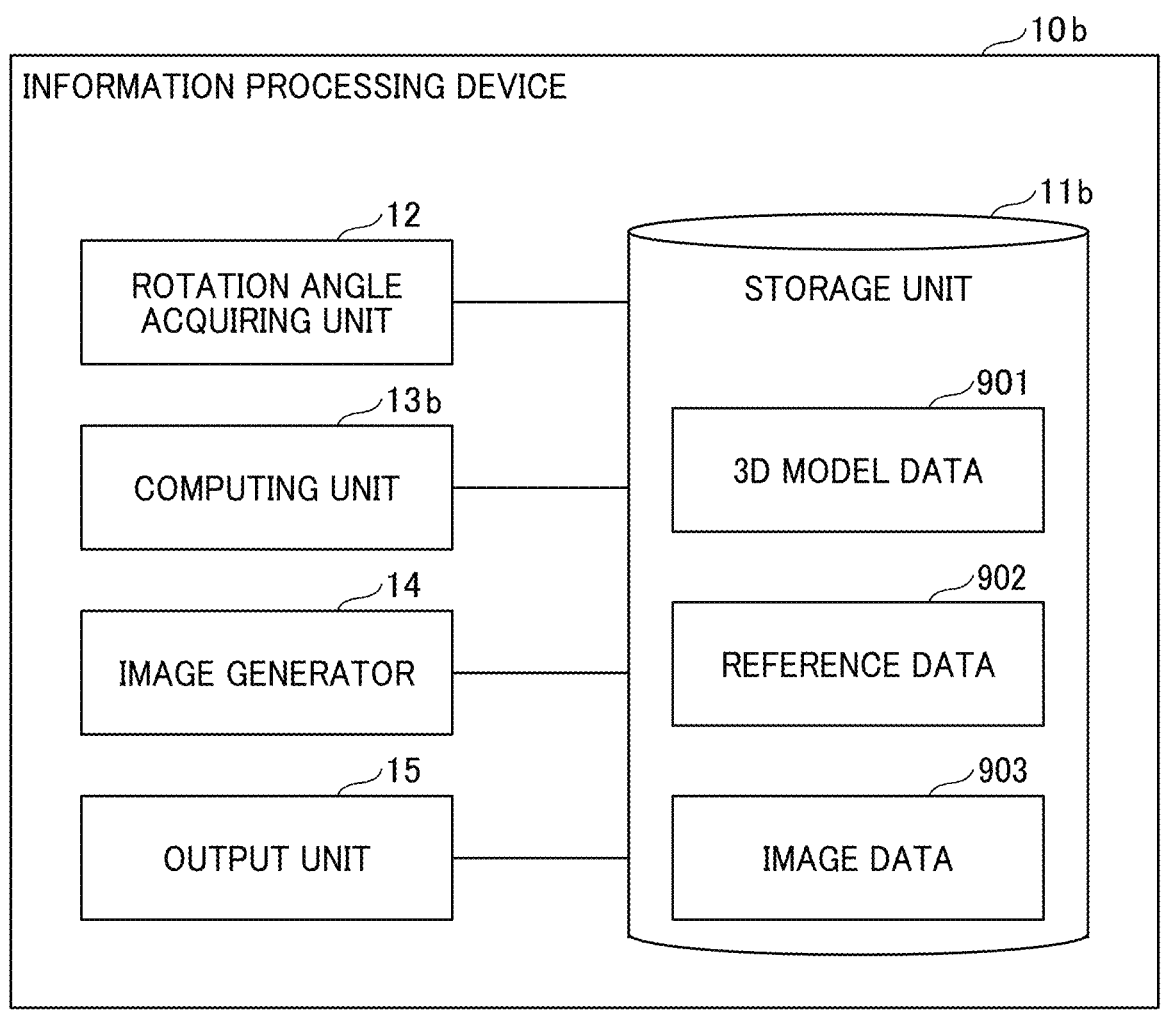
FIG. 15 is a diagram illustrating an example functional configuration of the information processing device of the display apparatus according to a second embodiment.

FIG. 15 is a diagram illustrating another example of a functional configuration of the information processing device 10. The information processing device 10b of FIG. 15 is substantially the same as the information processing device 10 of FIG. 4 described in the first embodiment, except for some differences.

The differences include replacement of the computing unit 13 with a computing unit 13b, and the storage unit 11 with a storage unit 11b. The storage unit 11b additionally stores reference data 902. The reference data 902 indicates a reference value based on the shape of the spiral screen 30.

Specific examples of the reference data 902 will be described later. In this embodiment, the computing unit 13b calculates the height in the Z-axis direction of each xy coordinates for each rotation angle of the spiral screen 30 based on the reference value indicated by the reference data 902 and the rotation angle of the spiral screen 30.

Further, as described in the first embodiment, the information processing device 10b may be provided separately from the display apparatus 2, for example, as a server communicable with the display apparatus 2.

When the information processing device 10b is implemented by a server, the rotation angle acquiring unit 12 acquires information, such as information indicating a rotation angle, from the display apparatus 1. The output unit 15 outputs the image data, generated by the image generator 14, to the display apparatus 1.

Figure 16:
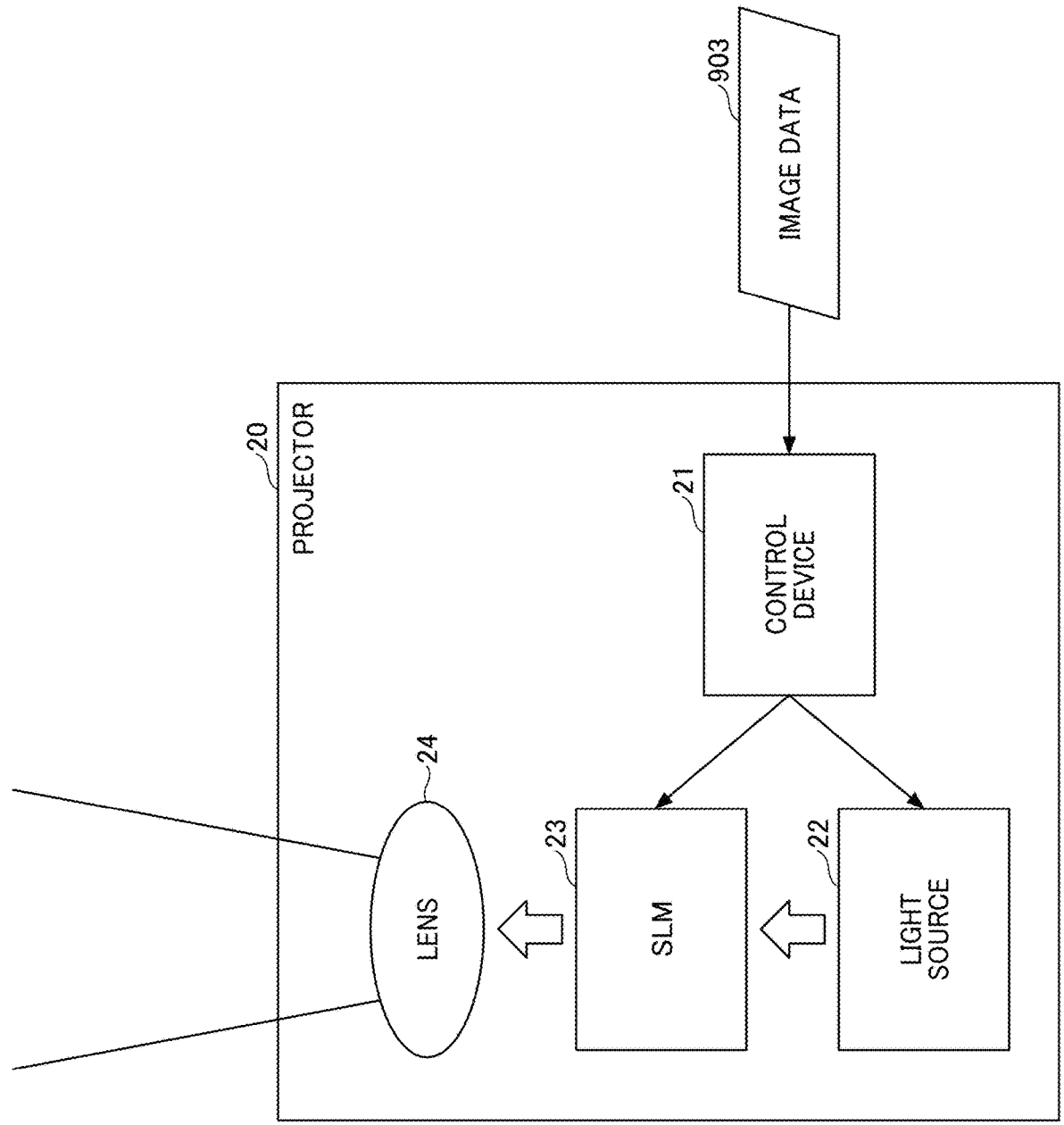
FIG. 16 is a diagram illustrating an example hardware configuration of the projector of the display apparatus, according to the embodiments.

FIG. 16 is a diagram illustrating an example hardware configuration of the projector 20.

The projector 20 includes a control device 21, a light source 22, a spatial light modulator (SLM) 23, and a lens 24.

The control device 21, which is implemented by a processor such as a CPU, receives the image data 903 and controls the light source 22 and the SLM 23. The light source 22 emits light. The SLM 23, which may be a digital mirror device (DMD) or the like, modulates light emitted from the light source 22, and outputs image light L based on the image data 903. The spiral screen 30 is irradiated with image light L that has passed through the lens 24.

Next, first to third examples of a shape of the spiral screen 30 will be described.

Figure 17:
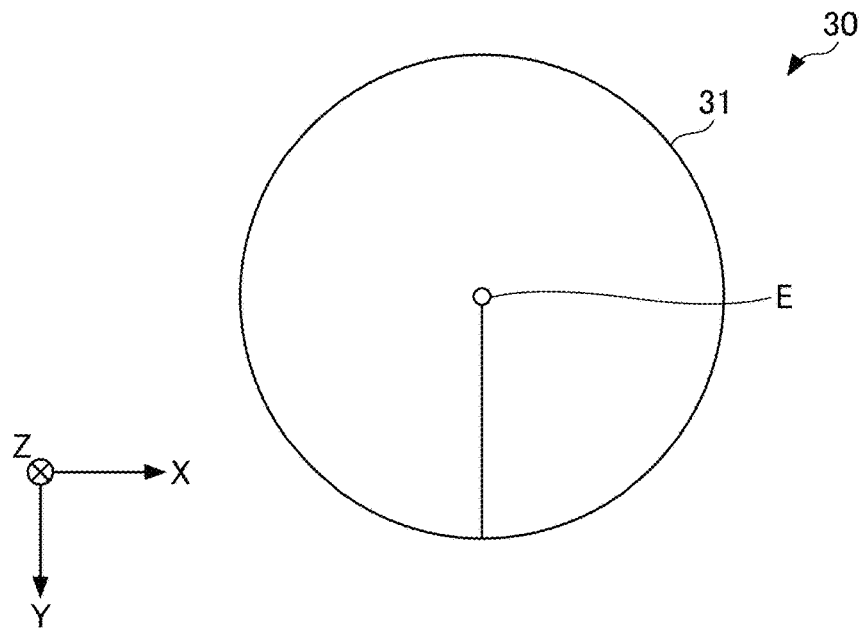
FIG. 17 is a diagram illustrating an example of a bottom view of a spiral screen according to a first example of the second embodiment.
Figure 18:
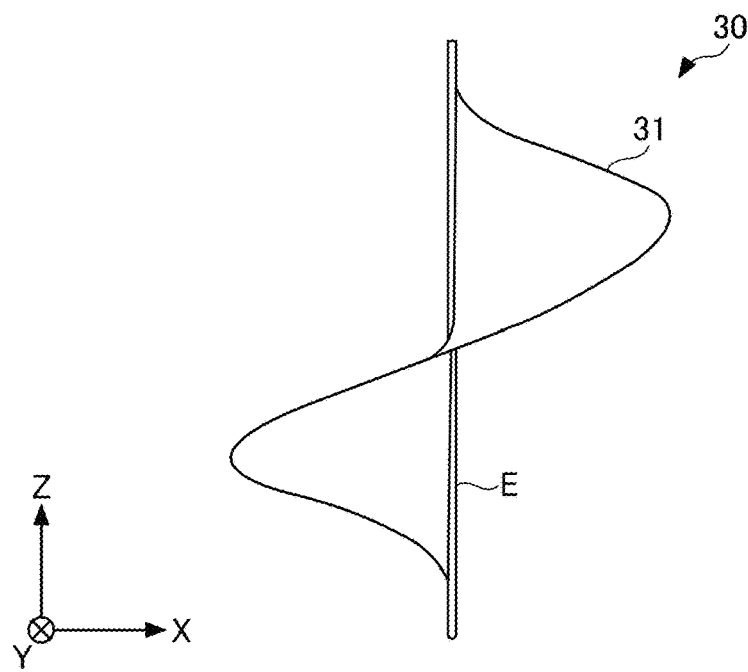
FIG. 18 is a diagram illustrating an example of a front view of the spiral screen according to the first example of the second embodiment.
Figure 19:
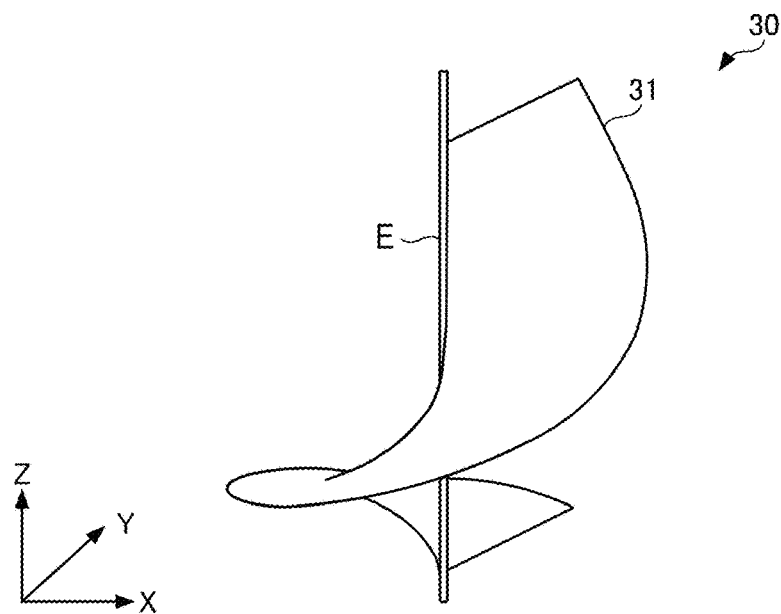
FIG. 19 is a diagram illustrating an example of a perspective view of the spiral screen according to the first example of the second embodiment.

FIG. 17 is a diagram illustrating an example of a bottom view of the spiral screen 30 according to the first example of the second embodiment. FIG. 18 is a diagram illustrating an example of a front view of the spiral screen 30 according to the first example of the second embodiment. FIG. 19 is a diagram illustrating an example of a perspective view of the spiral screen 30 according to the first example of the second embodiment.

The spiral screen 30 is a rotatable body having a spiral shape as illustrated in FIGS. 17, 18, and 19. Specifically, the spiral screen 30 includes a spiral member 31 and the rotation shaft E. The spiral member 31 has a shape in which a height z (x, y) at each xy coordinates is uniquely determined. That is, a position of the spiral member 31 where the image light L emitted in the positive direction of the Z-axis hits corresponds to the height z(x, y).

That is, the spiral member 31 has a height z(x, y), which changes at a substantially constant rate according to a rotation angle of rotation about the Z axis. The height z(x, y) when the spiral screen 30 is rotated by one rotation is the same as the original height.

Next, a structure of the spiral screen 30 will be described.

FIG. 19 is a diagram illustrating an example structure of the spiral screen 30.

Figure 20:
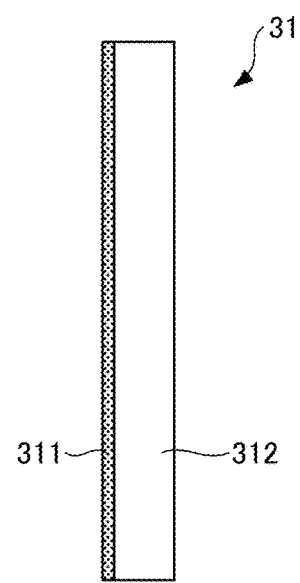
FIG. 20 is a diagram illustrating an example structure of the spiral screen, according to the first example of the second embodiment.

FIG. 20 is an enlarged view of a part of the spiral screen 30 having a spiral shape. The spiral screen 30 includes an opaque material 311 and a transparent base material 312.

The opaque material 311 is a material that reflects visible light included in the image light L emitted from the projector 20, and is disposed in the form of a thin film on the surface closer to the projector 20. The transparent base material 312 is a material that does not reflect visible light included in the image light L, and includes a portion of the spiral screen 30 other than the opaque material 311. Instead of the opaque material 311, a paint or the like may be applied to the portion of the surface of the transparent base material 312.

In a case where an area of the material that reflects visible light is thick, the image light L is diffusely reflected, and a visually recognized image is blurred. It is desirable to make the area of the material that reflects visible light thin. Thus, with the above-described configuration of the spiral screen 30, it is possible to stabilize the intensity of the spiral screen 30, while preventing irregular reflection of visible light included in the image light L.

Next, various information handled by the display apparatus 1 will be described.

FIG. 21 is a diagram illustrating an example of the reference data 902 according to the first example of the second embodiment.

The reference data 902 indicates a reference value based on the shape of the spiral screen 30. Specifically, the reference value is a value indicating the height z along the rotation axis of the spiral screen 30 at a reference rotation angle (for example, φ=0) for each xy coordinates.

Each reference value is defined in advance by calculation, measurement, or the like based on the shape of the spiral screen 30. The following describes example processing of calculating the height using the characteristics of the shape of the spiral screen 30.

Figure 22:
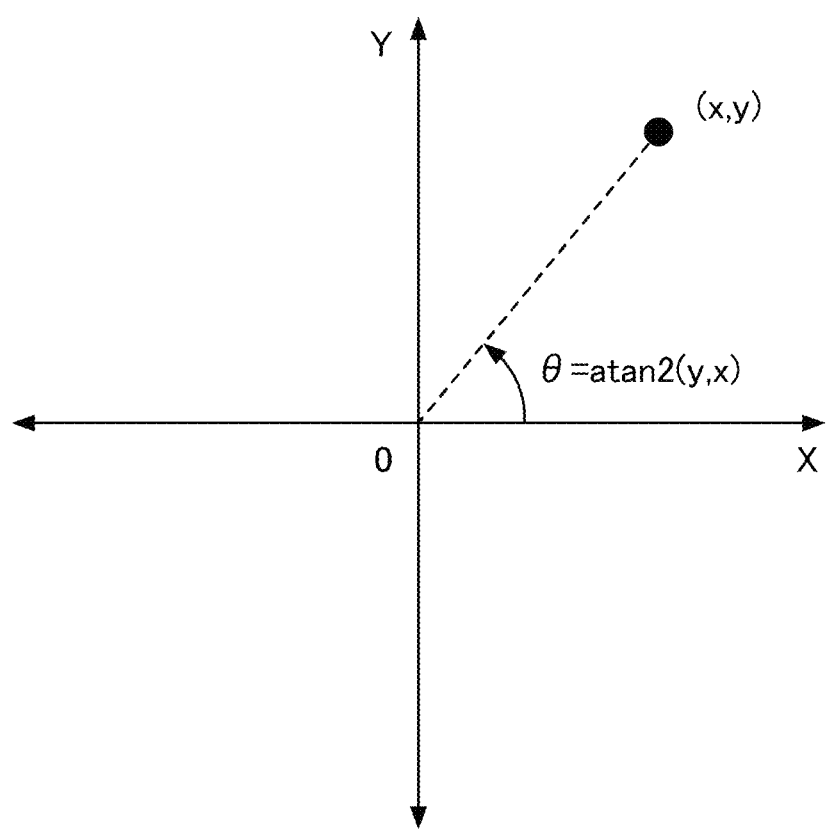
FIG. 22 is a diagram for explaining a method of calculating the height of the spiral screen, according to the first example of the second embodiment.

FIG. 22 is a diagram for explaining a method of calculating the height of the spiral screen.

For example, the height z of the spiral screen 30 is calculated by the following Equation 1.

$$z(x,y) = \mathrm{atan}\,2(y,x) \times \mathrm{zscale} \qquad \text{(Equation 1)}$$

Here, atan 2 (y, x) represents arctan (y/x) when x>0. Specifically, as illustrated in FIG. 22, atan 2 (y, x) is a value indicating the angle of deviation θ for each xy coordinates.

Further, zscale is a coefficient for converting the angle of deviation θ into the height z, and is expressed by the following Equation 2.

$$\mathrm{zscale} = \mathrm{ZMAX}/2\pi \qquad \text{(Equation 2)}$$

ZMAX is the maximum size in the Z-axis direction of the three-dimensional image included in the three-dimensional model data 901.

The above-described method of calculating the height of the spiral screen 30 is a calculation method using a characteristic that coordinates having the same angle of deviation θ have the same height z and a characteristic that the height z changes at a substantially constant rate according to the angle of deviation θ.

Next, an operation of the display apparatus 1 will be described.

The information processing device 10b receives the three-dimensional model data 901, and starts control processing in response to an operation by the user.

Figure 23:
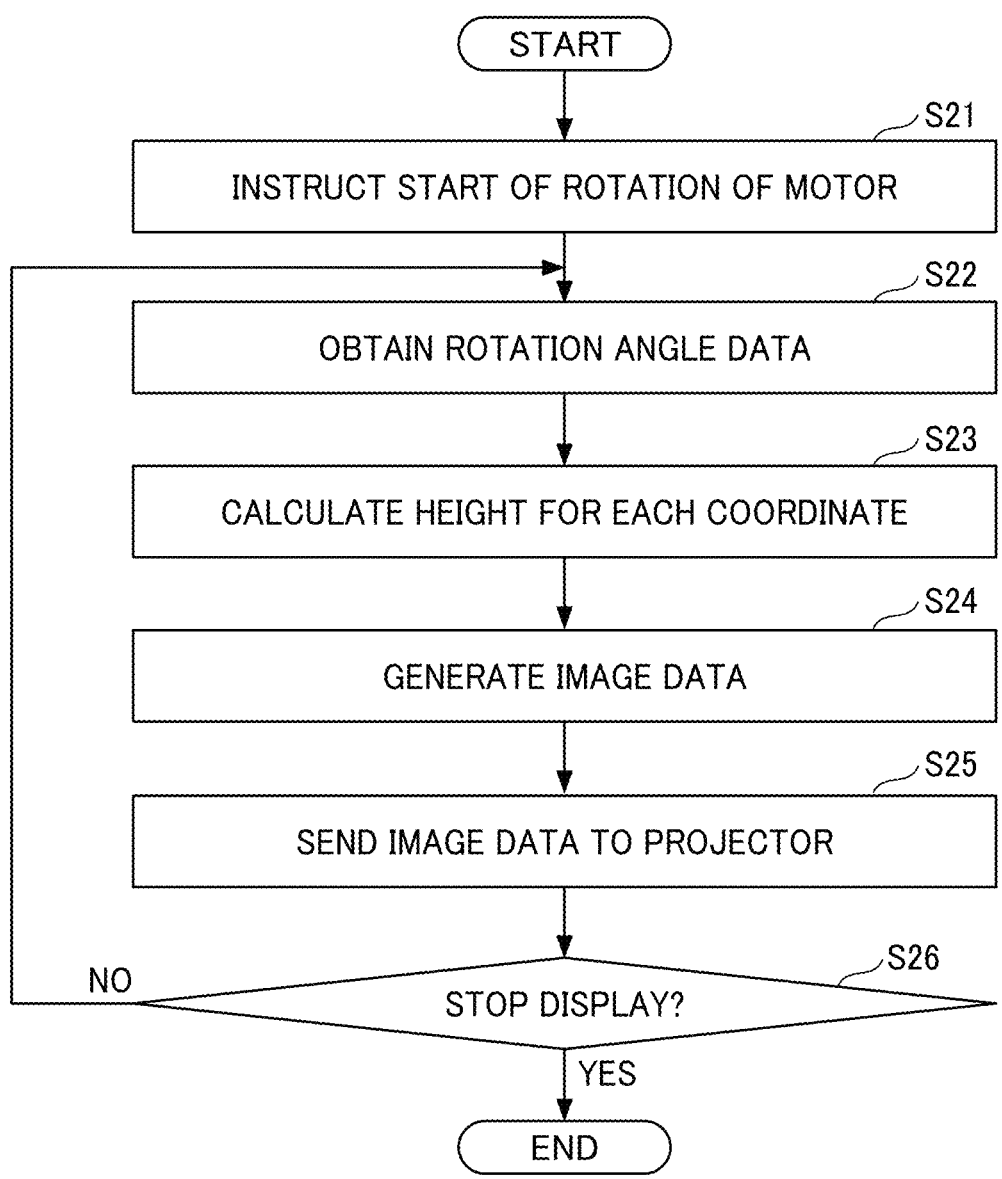
FIG. 23 is a flowchart illustrating example processing, performed by the information processing device of the display apparatus, according to the first example of the second embodiment.

FIG. 23 is a flowchart illustrating example processing performed by the information processing device 10b.

At step S21, the information processing device 10b instructs the motor controller 41 to start rotating the motor 40. The motor controller 41 controls the motor 40 so as to rotate the spiral screen 30 at a substantially constant speed that is previously set.

After that, the information processing device 10b repeatedly executes processing from step S22 to step S26 until displaying ends. In the case of displaying a video image, content of the two-dimensional image data that is displayed changes time by time. Accordingly, the two-dimensional image data to be displayed at each time t is generated and transmitted, through performing S22 to S26. The time t is a time at which the projector 20 emits image light L based on the generated image data.

At step S22, the rotation angle acquiring unit 12 acquires the rotation angle data 904 at time t. Specifically, the rotation angle acquiring unit 12 acquires information indicating the rotation angle of the spiral screen 30 from the motor controller 41. Alternatively, the rotation angle acquiring unit 12 may calculate the rotation angle based on a speed that is previously set to acquire information indicating the rotation angle. Further, when there is a difference between the measurement time and the time t, the rotation angle acquiring unit 12 estimates, by calculation, the rotation angle φt of the spiral screen 30 at the time t based on the difference between the measurement time and the time t.

Subsequently, at step S23, the computing unit 13b calculates a height z(x, y) at each xy coordinates. Specifically, the computing unit 13b refers to the reference data 902 to calculate the height z(x, y) based on the reference value and the rotation angle φt of the spiral screen 30.

The reference value is the height z(x, y, 0) of the spiral screen 30 at the time t=0. In a case where the rotation angle φt at the time t=0 and the rotation angle φ when the reference value is calculated are deviated from each other, the computing unit 13b may correct the time t as needed, so that the time corresponding to the reference value of the rotation angle of the spiral screen 30 becomes 0.

More specifically, the computing unit 13b calculates the height z(x, y, t) at each xy coordinates at the time t using the following equations.

$$\text{phase} = f\,\text{mod}(\varphi t \times \text{zcale}, Z\,\text{MAX}) \quad \text{(Equation 3)}$$

Here, fmod (a, b) represents a remainder obtained by dividing a by b. Since the spiral screen 30 returns to the original height after one rotation, the phase is a value obtained by converting the rotation angle within the range of one rotation into the height.

$$\text{If } z(x,y,0) < \text{phase: } z(x,y,t) = z(x,y,0) + Z\,\text{MAX} - \text{phase} \quad \text{(Equation 4)}$$

$$\text{If } z(x,y,0) \geq \text{phase: } z(x,y,t) = z(x,y,0) - \text{phase} \quad \text{(Equation 5)}$$

The above-described method of calculating the height of the spiral screen 30 is a calculation method using a characteristic in which the height z of the spiral screen 30 changes at a substantially constant rate according to the rotation angle φt at any coordinates. This characteristic is derived from the characteristic that the spiral screen 30 has a shape in which the height z changes at a substantially constant rate according to the angle of deviation θ.

Next, at step S24, the image generator 14 generates the image data 903. Specifically, the image generator 14 generates two-dimensional image data 903 having luminance corresponding to the calculated height z(x, y, t), as the image data to be displayed at the time t.

For example, when the three-dimensional model data 901 is a still image, the image generator 14 converts voxel (x, y, z) into pixel (x, y, t). The voxel (x, y, z) is a value indicating such as luminance, color, or transmittance of a particular voxel. The pixel (x, y, t) is a pixel value included in the image data 903, from which image light L emitted at the time t is generated.

When the three-dimensional model data 901 is a video image, the image generator 14 converts voxel (x, y, z, t), which is a value indicating luminance, color, or transmittance of a particular voxel including time t, into pixel (x, y, t).

Regardless of whether the three-dimensional model data 901 is a still image or a video image, the image generator 14 calculates a value of the pixel (x, y, t) at the time t based on the height z (x, y, t) of the spiral screen 30 at each xy coordinates at the time t.

In this example, Pixel (x, y, t) includes at least a value indicating the luminance of the image light L to be emitted. Pixel (x, y, t) may include a value indicating color, transmittance, or the like.

The image generator 14 stores the generated image data 903 in the storage unit 11. At step S25, the output unit 15 transmits the image data 903 generated by the image generator 14 to the projector 20.

At step S26, the information processing device 10b determines whether or not to end displaying the image. When the information processing device 10b receives a user operation indicating the end of display, or when transmission of image data 903 based on all video images is completed in a case where the three-dimensional model data 901 is a video image, the information processing device 10b determines to end displaying the image.

When it is determined not to end displaying at S26 (No at S26), the information processing device 10b returns the processing to step S22, and performs the processing from S22 to S26 in relation to the image data 903 to be displayed at the next time t. For example, the next time t may be a time after one second of the current time t.

When the information processing device 10b determines to end displaying (Yes at S26), the processing ends.

Figure 24:
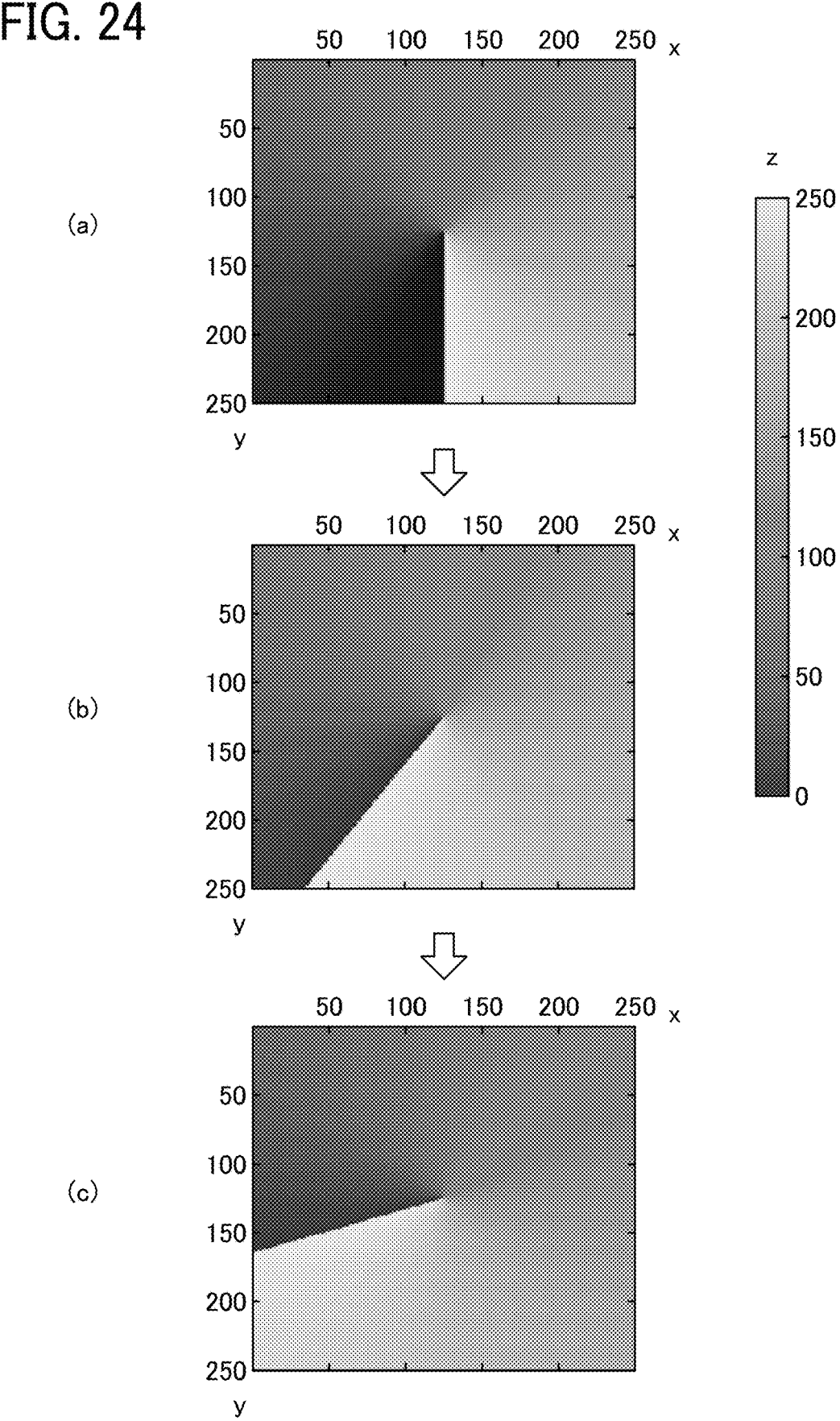
FIG. 24 is a diagram illustrating an example of a calculation result of the height of the spiral screen, according to the first example of the second embodiment.

FIG. 24 is a diagram illustrating an example of a calculation result of the height of the spiral screen 30 according to the first example of the second embodiment. FIG. 24(a) is a diagram illustrating an example of the height z(x, y) at time t=0. The reference value indicated by the reference data 902 illustrated in FIG. 21 is directly reflected on the height z(x, y) at time t=0.

FIG. 24(b) is a diagram illustrating an example of the height z(x, y) at time t when the rotation angle φt becomes about 30 degrees, for example. FIG. 24(c) is a diagram illustrating an example of the height z(x, y) at time t when the rotation angle pt becomes about 70 degrees, for example.

The heights z (x, y) in FIGS. 24(b) and 24(c) are each obtained by rotating the height z(x, y) at the time t=0 with respect to the coordinates (125, 125) of the rotation axis.

For comparison with the calculation method by the computing unit 13b described above, a method of calculating the height z (x, y, t) by coordinate transformation will be described below.

The following assumes that the x-y coordinates of the rotation axis is (x, y)=(0,0). Since the height z(x, y, t) at the time t is a height corresponding to a shape in which the height z(x, y, 0) at the time t=0 is rotated according to the rotation speed, the following coordinate transformation is performed.

$$xt = x \times \cos\varphi t - y \times \sin\varphi t \quad \text{(Equation 6)}$$

$$yt = x \times \sin\varphi t - y \times \cos\varphi t \quad \text{(Equation 7)}$$

$$z(x,y,t) = \text{atan}\,2(yt, xt) \quad \text{(Equation 8)}$$

In this comparative example, φt is the rotation angle of the spiral screen 30 at time t. If the spiral screen 30 has a substantially constant rotation speed, the following equation is satisfied.

$$\varphi t = a \times t \quad \text{(Equation 9)}$$

Here, a is a coefficient relating to the rotation speed of the spiral screen 30.

As described above, in the calculation method using coordinate transformation, calculation of trigonometric functions such as Equation 6, Equation 7, and Equation 8 are needed. Accordingly, calculation of a movement position of a rotatable body is complicated, resulting in high processing load. Since it takes time to generate the image data 903, it is difficult to display the image in realtime using the measurement result of the rotation angle of the spiral screen 30.

On the other hand, according to the display apparatus 1 of the present example, the remainder needs to be calculated using Equation 3 once for each process with respect to time t, and each xy coordinates is calculated by addition or subtraction as illustrated in Equation 4 and Equation 5. Therefore, calculation of the movement position of the rotatable body can be simplified, thus lowering the processing load of the computing unit 13b, compared to the example case of calculating using trigonometric functions. As a result, the processing load for generating image data is reduced, and the image data is displayed in realtime more easily.

With the reduced processing load for generating image data, a frame rate of the image data to be processed in realtime is improved. This also improves density of an image such as voxels to be displayed, such that a high-definition three-dimensional image is reproduced. Since the processing load is low, an inexpensive CPU or a small-sized device in which power consumption is limited, may be employed to perform the above-described processing. This will expand applications of a display apparatus that displays a three-dimensional image.

It is desirable that the three-dimensional model data 901 stored in the storage unit 11b has a data structure that is suitable to the calculation method as indicted by Equations 3, 4, and 5 described above. For example, in order for the computing unit 13b to repeatedly perform calculation in the x direction or the y direction, the storage unit 11b may store Voxels (x, y, z) included in the three-dimensional model data 901 in a memory such that memory addresses of the stored values are continuous along the X coordinate axis or the Y coordinate axis. In this way, variations in memory address to be accessed during processing by the computing unit 13b are reduced. This allows continuous address burst read function of the physical memory be effectively used, thus resulting in higher processing speed.

In the second embodiment, an example in which the three-dimensional model data 901 is voxel data has been described. However, point cloud data may be used, as described above in the first embodiment. In such case, the information processing device 10b converts the point cloud data into voxel data before starting the processing described above referring to FIG. 23. For example, the information processing device 10b may copy, for each point of the point cloud data, a luminance value of each coordinate to a voxel of each corresponding coordinate.

In the above-described embodiment, an example in which the spiral screen 30 has the rotation shaft E, which is rotated by the motor 40, has been described. Alternatively, as described below, the spiral screen 30 may not be provided with the physical rotation shaft E.

Figure 25:
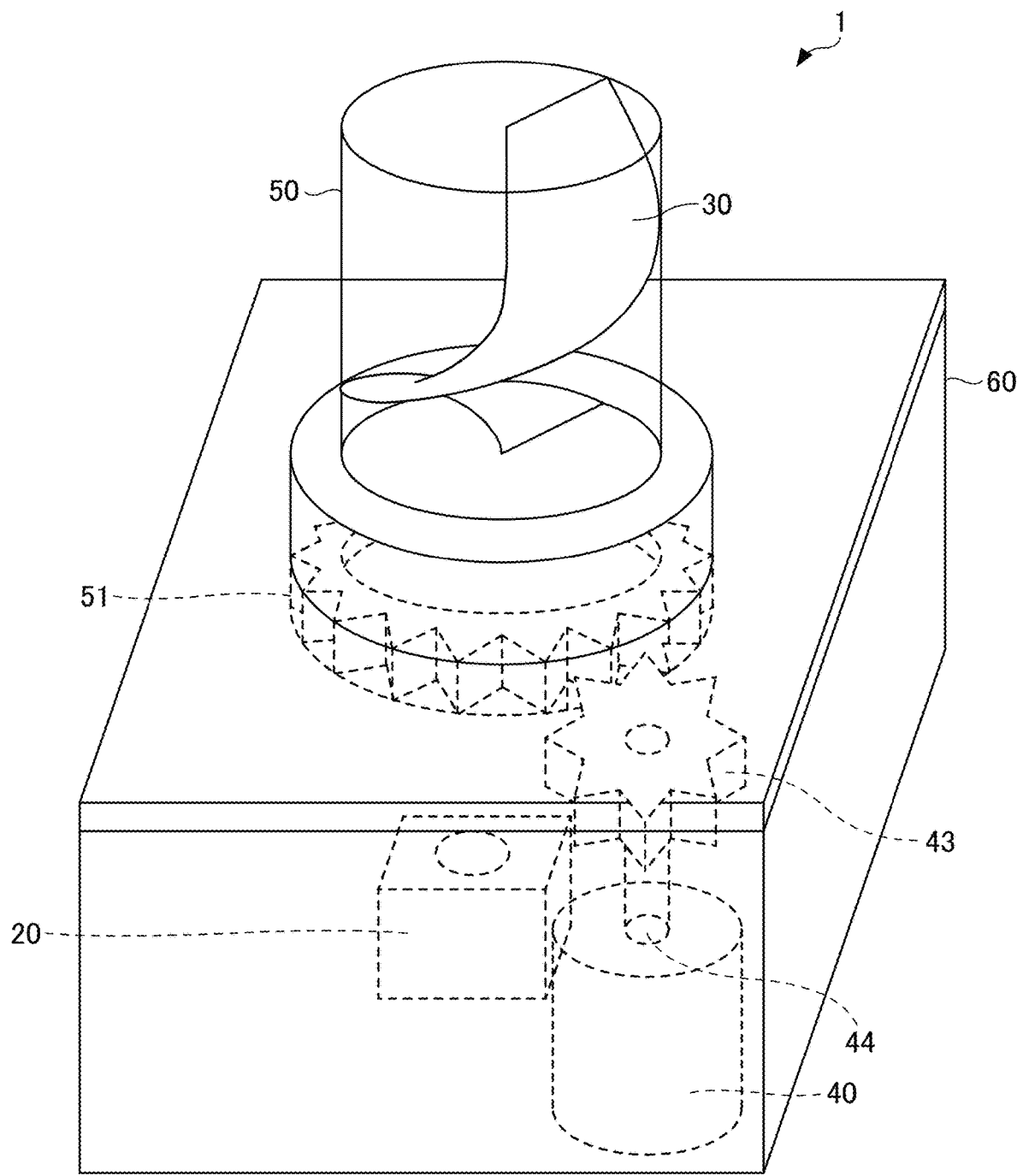
FIG. 25 is a diagram illustrating another example of the hardware configuration of the display apparatus 1 according to the second embodiment.

FIG. 25 is a diagram illustrating another example of the hardware configuration of the display apparatus 1 according to the second embodiment.

In the display apparatus 1 illustrated in FIG. 25, the screen case 50 is fitted into a hole formed in the housing 60 so that the screen case 50 rotates together with the spiral screen 30. The spiral screen 30 is a spiral-shaped member and does not include a rotation shaft or the like. Further, in order to prevent the screen case 50 from being easily detached from the housing 60, the screen case 50 has a protrusion to secure the screen case 50 onto the housing 60.

The motor 40 rotates a gear 43 via a motor rotating shaft 44. The gear 43 is engaged with a gear 51 attached to the screen case 50. Accordingly, the screen case 50 rotates together with the spiral screen 30 accommodated therein.

In FIG. 25, power is transmitted through the gear 43 provided in the motor 40, but it may be directly driven by a hollow motor provided in the screen case 50. Instead of the gear 43, a frictional member such as a tire may be used to provide power, or power may be transmitted through a belt, a chain, or the like. Further, a part or all of the inside of the housing 60 may be transparent, which makes it easier to view the entire image being displayed.

Hereinafter, a second example of the second embodiment will be described with reference to FIGS. 26 to 30. The second example differs from the first example in that the spiral screen 30 includes two spiral-shaped members. In the following description of the second example, differences from the first example will be mainly described. The same reference numerals as those used in the description of the first example are given to elements having the same functional configurations as those of the first example, and description thereof will be omitted.

Figure 26:
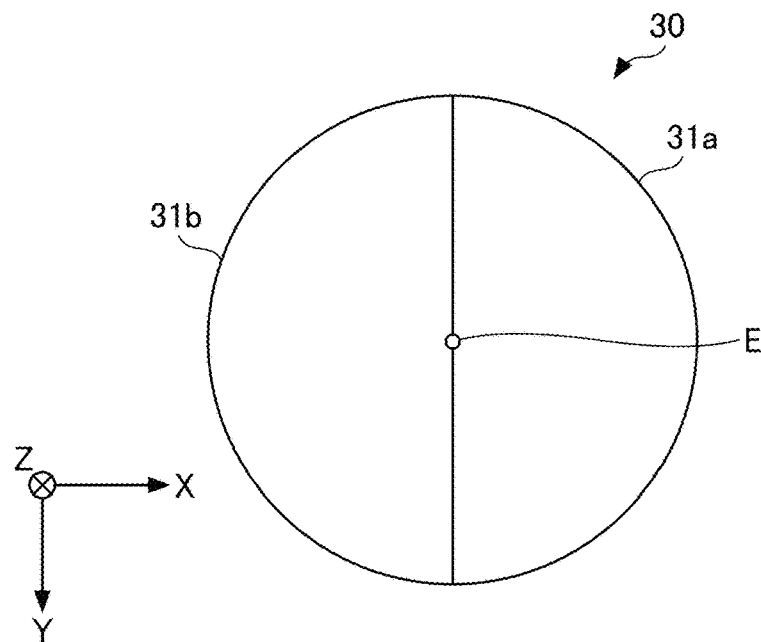
FIG. 26 is a diagram illustrating an example of a bottom view of the spiral screen according to a second example of the second embodiment.
Figure 27:
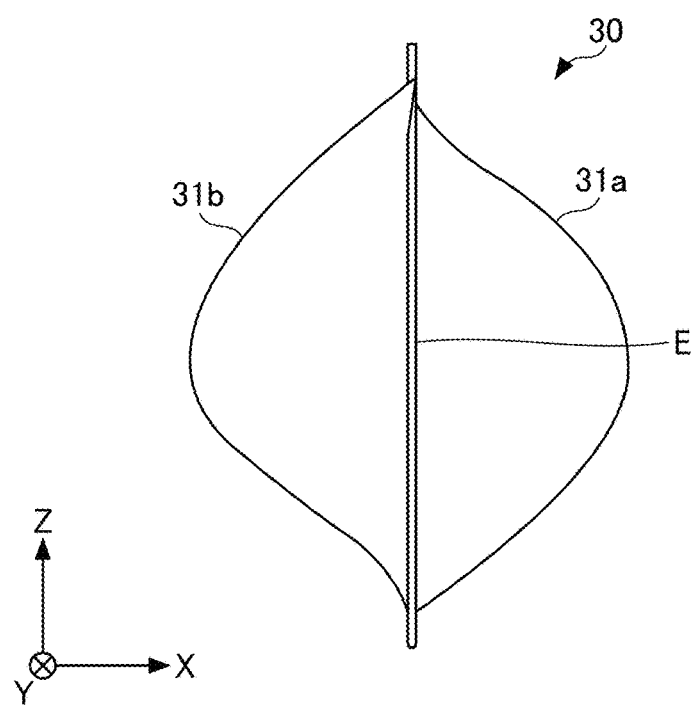
FIG. 27 is a diagram illustrating an example of a front view of the spiral screen according to the second example of the second embodiment.
Figure 28:
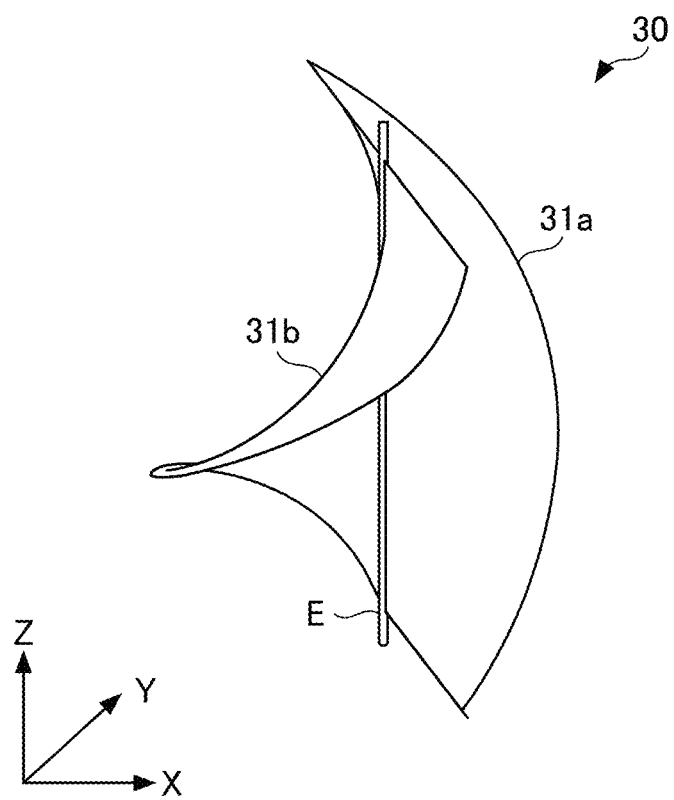
FIG. 28 is a diagram illustrating an example of a perspective view of the spiral screen according to the second example of the second embodiment.

FIG. 26 is a diagram illustrating an example of a bottom view of the spiral screen 30 according to the second example of the second embodiment. FIG. 27 is a diagram illustrating an example of a front view of the spiral screen 30 according to the second example of the second embodiment. FIG. 28 is a diagram illustrating an example of a perspective view of the spiral screen 30 according to the second example of the second embodiment.

As illustrated in FIGS. 26, 27, and 28, the spiral screen 30 according to the present example includes a first spiral member 31a, a second spiral member 31b, and the rotation shaft E. Similarly to the spiral member 31 according to the first example, the first spiral member 31a and the second spiral member 31b according to the present example each have a shape in which the height z(x, y) at each xy coordinates is uniquely determined. That is, a position of any one of the spiral member 31a and the spiral member 31b where the image light L emitted in the positive direction of the Z-axis hits corresponds to the height z(x, y).

Further, the first spiral member 31a and the second spiral member 31b of the spiral screen 30 according to the present example each have a spiral shape in which the height z(x, y) changes at a substantially constant rate according to the rotation angle of rotation about the rotation axis (rotation shaft E). The height z(x, y) of any one of the first spiral member 31a and the second spiral member 31b when the spiral screen 30 is rotated by a half circumference is the same as the original height. That is, each of the first spiral member 31a and the second first member 31b is a member whose height changes at a substantially constant rate in a range of each rotation angle. The rotation angle of each spiral member is obtained by substantially equally dividing one rotation of the spiral screen 30.

FIG. 29 is a diagram illustrating an example of the reference data 902 according to the second example of the second embodiment.

Similarly to the first example, each reference value of the reference data 902 according to the second example is defined in advance by calculation, measurement, or the like based on the shape of the spiral screen 30. To calculate the height, the calculation method according to the first example may be modified by using the shape characteristic of the spiral screen 30 according to the second example.

Specifically, z(x, y) calculated by Equation 1 is modified as z(x, y)>ZMAX/2. In such case, z(x, y) is corrected by the following Equation 10.

$$z(x,y)=z(x,y)-Z\,MAX/2 \qquad \text{(Equation 10)}$$

Then, z(x, y) is newly calculated by the following Equation 11.

$$z(x,y)=z(x,y)\times 2 \qquad \text{(Equation 11)}$$

The computing unit 13b calculates the height z(x, y, t) at the time t using the reference data 902 described above, in a similar manner to the calculation method according to the first example. Alternatively, the computing unit 13b according to the present example may calculate using the reference data 902 used in the first example. In such case, the computing unit 13b calculates the height z(x, y, t) of the spiral screen 30 of the present example by performing calculations using Equation 10 and Equation 11 described above as needed.

Figure 30:
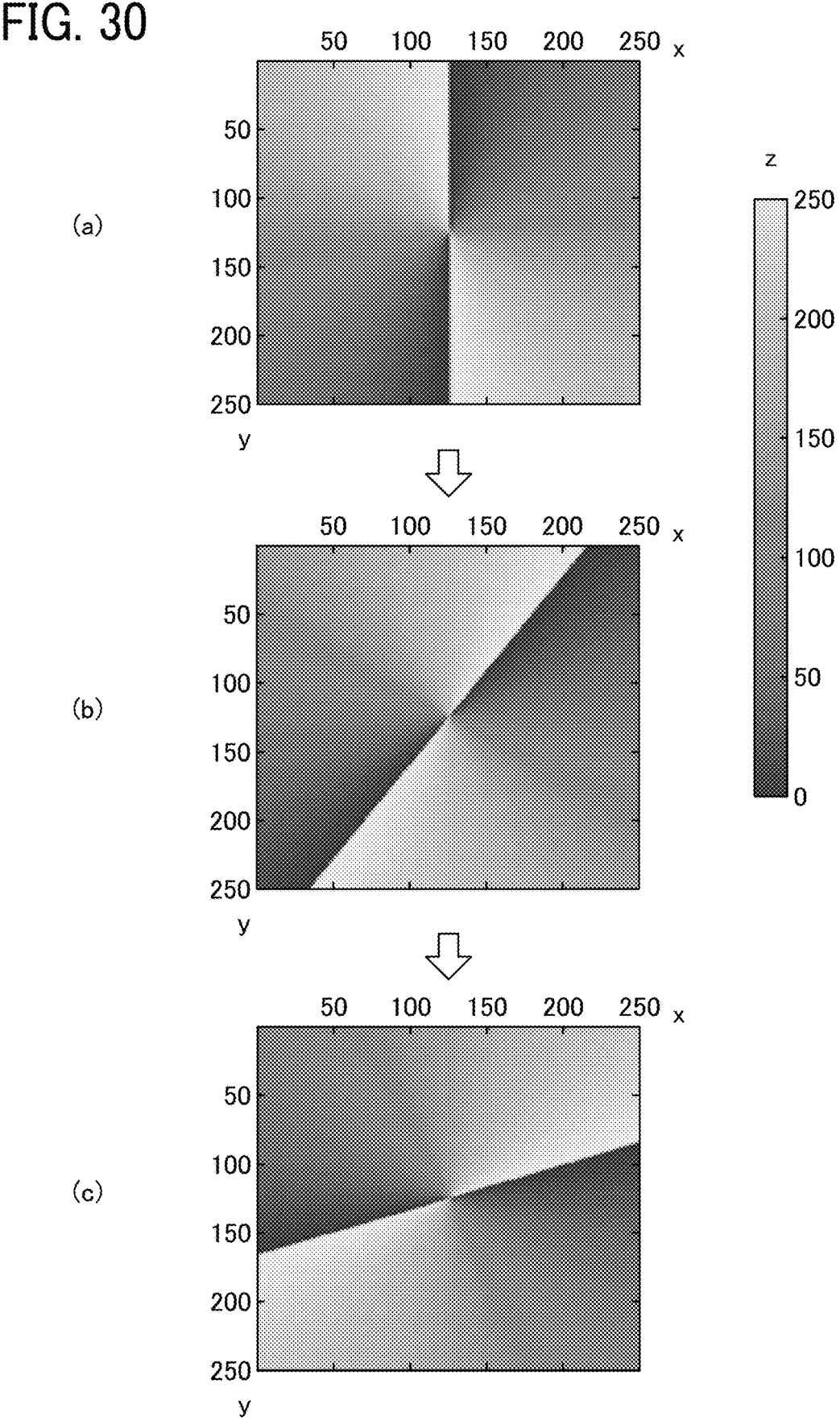
FIG. 30 is a diagram illustrating an example of a calculation result of the height of the spiral screen, according to the second example of the second embodiment.

FIG. 30 is a diagram illustrating an example of a calculation result of the height of the spiral screen 30 according to the second example of the second embodiment.

FIG. 30(a) is a diagram illustrating an example of the height z(x, y) at time t=0. The reference value indicated by the reference data 902 illustrated in FIG. 29 is directly reflected on the height z(x, y) at time t=0.

FIG. 30(b) is a diagram illustrating an example of the height z(x, y) at time t when the rotation angle φt becomes about 30 degrees, for example. FIG. 30(c) is a diagram illustrating an example of the height z(x, y) at time t when the rotation angle pt becomes about 70 degrees, for example.

The heights z(x, y) in FIGS. 30(b) and 30(c) are each obtained by rotating the height z(x, y) at the time t=0 with respect to the coordinates (125, 125) of the rotation axis of the spiral screen 30. Further, in this example, the height z(x, y) becomes the same height every 180 degrees.

Third Example

A third example of the second embodiment will be described below with reference to FIGS. 31 to 35. The third example is different from the first example in that the spiral screen includes three spiral-shaped members. In the following description of the third example, differences from the first example will be mainly described. The same reference numerals as those used in the description of the first example are given to elements having the same functional configurations as those of the first example, and description thereof will be omitted.

Figure 31:
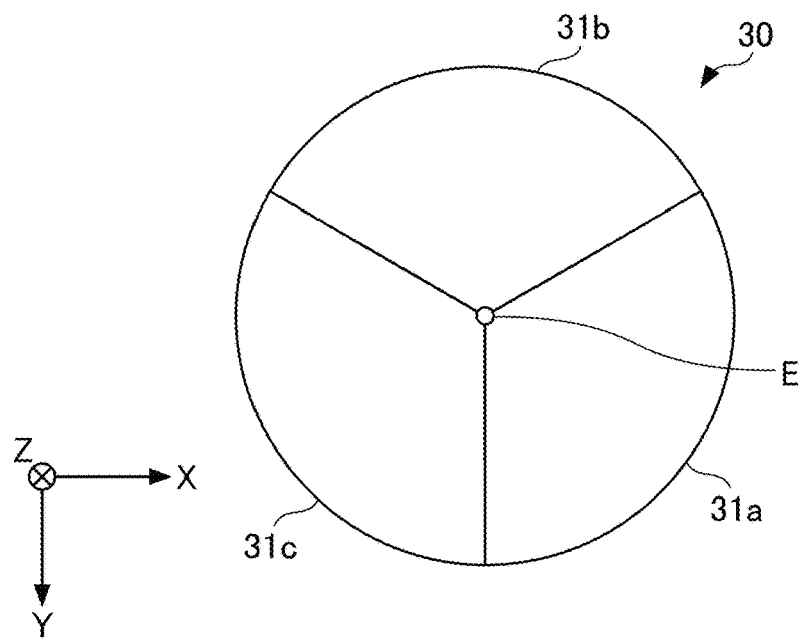
FIG. 31 is a diagram illustrating an example of a bottom view of the spiral screen according to a third example of the second embodiment.
Figure 32:
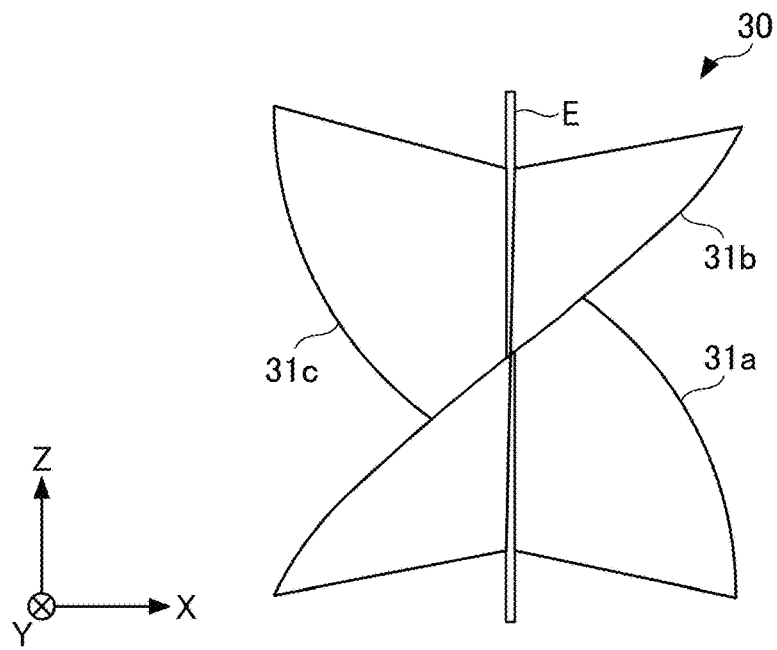
FIG. 32 is a diagram illustrating an example of a front view of the spiral screen according to the third example of the second embodiment.
Figure 33:
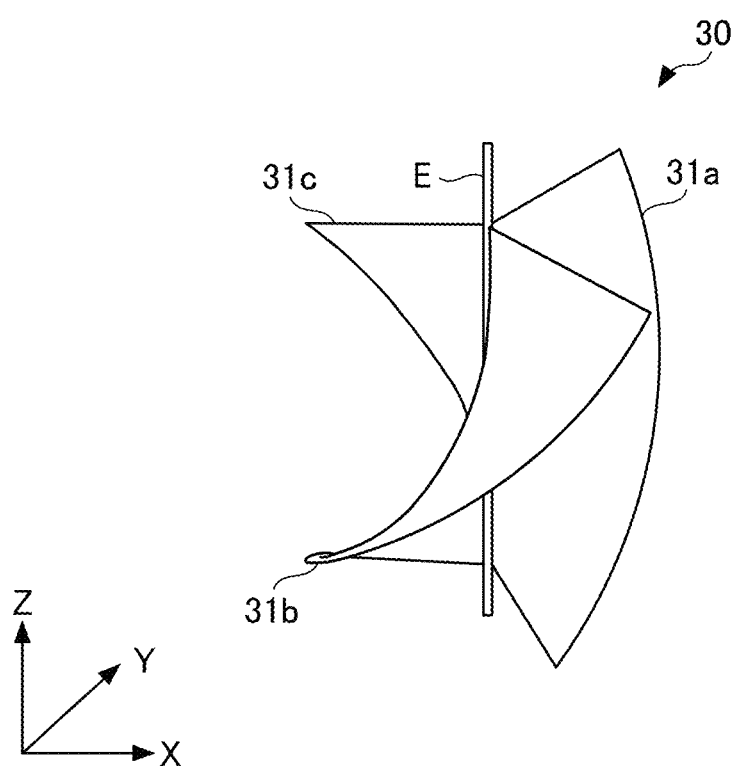
FIG. 33 is a diagram illustrating an example of a perspective view of the spiral screen according to the third example of the second embodiment.

FIG. 31 is a diagram illustrating an example of a bottom view of the spiral screen 30 according to the third example of the second embodiment. FIG. 32 is a diagram illustrating an example of a front view of the spiral screen 30 according to the third example of the second embodiment. FIG. 33 is a diagram illustrating an example of a perspective view of the spiral screen 30 according to the third example of the second embodiment.

As illustrated in FIGS. 31, 32, and 33, the spiral screen 30 according to the present example includes a first spiral member 31a, a second spiral member 31b, a third spiral member 31c, and the rotation shaft E. Similarly to the spiral member 31 according to the first example, the first spiral member 31a, the second spiral member 31b, and the third spiral member 31c according to the present example each have a shape in which the height z(x, y) at each xy coordinates is uniquely determined. That is, a position of any one of the spiral member 31a, the spiral member 31b, and the spiral member 31c where the image light L emitted in the positive direction of the Z-axis hits corresponds to the height z(x, y).

Further, the first spiral member 31a, the second spiral member 31b, and the third spiral member 31c of the spiral screen 30 according to the present example each have a spiral shape in which the height z(x, y) changes at a substantially constant rate according to the rotation angle of rotation about the Z axis. The height z(x, y) of each of the first spiral member 31a, the second spiral member 31b, and the third spiral member 31c when the spiral screen 30 is rotated by one third of one rotation is the same as the original height. That is, each of the first spiral member 31a, the second spiral member 31b, and the third spiral member 31c is a member whose height changes at a substantially constant rate in a range of each rotation angle. The range of the rotation angle of each spiral member is obtained by substantially equally dividing one rotation of the spiral screen 30.

FIG. 34 is a diagram illustrating an example of the reference data 902 according to the third example of the second embodiment.

Similarly to the first example, each reference value of the reference data 902 according to this example is defined in advance by calculation, measurement, or the like based on the shape of the spiral screen 30. To calculate the height, the calculation method according to the first example may be modified by using the shape characteristic of the spiral screen 30 according to this example.

Specifically, z(x, y) calculated by Equation 1 is modified as z(x, y) >ZMAX/3×2. In such case, z(x, y) is corrected by the following Equation 12.

$$z(x,y)=z(x,y)-Z\,MAX/3\times 2 \qquad \text{(Equation 12)}$$

If z(x, y)>ZMAX/3 and z(x, y)<=ZMAX/3×2, z(x, y) is modified using Equation 13.

$$z(x,y)=z(x,y)-Z\,MAX/3 \qquad \text{(Equation 13)}$$

Then, z(x, y) is newly calculated by the following Equation 14.

$$z(x,y)=z(x,y)\times 3 \qquad \text{(Equation 14)}$$

The computing unit 13b calculates the height z(x, y, t) at the time t using the reference data 902 described above, in a similar manner to the calculation method according to the first example. Alternatively, the computing unit 13b according to the present example may calculate using the reference data 902 used in the first example. In such case, the computing unit 13 calculates the height z (x, y, t) of the spiral screen 30 of the present example by performing calculations using Equation 12, Equation 13, and Equation 14 described above as needed.

Figure 35:
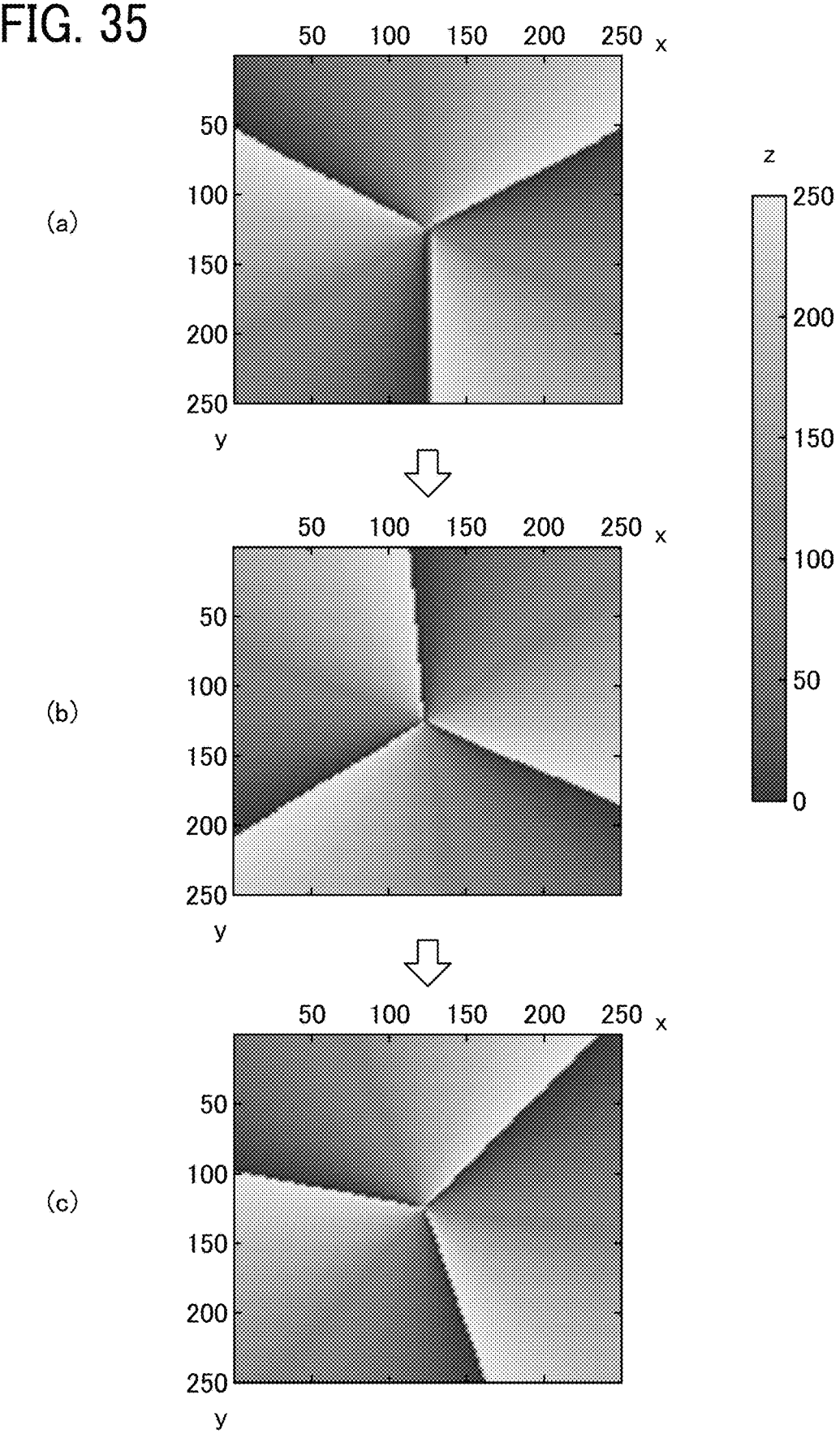
FIG. 35 is a diagram illustrating an example of a calculation result of the height of the spiral screen according to the third example of the second embodiment.

FIG. 35 is a diagram illustrating an example of a calculation result of the height of the spiral screen 30 according to the third example.

FIG. 35(a) is a diagram illustrating an example of the height z(x, y) at time t=0. The reference value indicated by the reference data 902 illustrated in FIG. 34 is directly reflected on the height z(x, y) at time t=0.

FIG. 35(b) is a diagram illustrating an example of the height z(x, y) at time t when the rotation angle φt becomes about 30 degrees, for example. FIG. 35(c) is a diagram illustrating an example of the height z(x, y) at time t when the rotation angle φt becomes about 70 degrees, for example.

The heights z(x, y) in FIGS. 35(b) and 35(c) are each obtained by rotating the height z(x, y) at the time t=0 with respect to the coordinates (125, 125) of the rotation axis. Further, in this example, the height z(x, y) becomes the same height every 120 degrees.

In the second example and the third example, the spiral screen 30 having a plurality of spiral-shaped members has been described. The same calculation may be applied to the case where four or more spiral-shaped members are present. For example, in the case of four spiral-shaped members, the reference value is calculated as follows.

Specifically, z(x, y) calculated by Equation 1 is modified as z(x, y)>ZMAX/4×3. In such case, z(x, y) is corrected by the following Equation 15.

$$z(x,y)=z(x,y)-Z\ MAX/4\times 3 \quad \text{(Equation 15)}$$

If z(x, y)>ZMAX/4×2 and z(x, y)<=ZMAX/4×3, z (x, y) is modified using Equation 16.

$$z(x,y)=z(x,y)-Z\ MAX/4\times 2 \quad \text{(Equation 16)}$$

If z(x, y)>ZMAX/4 and z(x, y)<=ZMAX/4×2, z(x, y) is modified using Equation 17.

$$z(x,y)=z(x,y)-Z\ MAX/4 \quad \text{(Equation 17)}$$

Then, z(x, y) is newly calculated by the following Equation 18.

$$z(x,y)=z(x,y)\times 4 \quad \text{(Equation 18)}$$

As described above, the reference data 902 corresponding to various types of spiral screen 30 may be previously prepared, thus lowering the processing load of the computing unit 13b.

In any one of the above-described examples, when a video image is displayed, the rotation speed of the spiral screen 30 may be, for example, 30 rps, and the frame rate of the image light L emitted by the projector 20 may be 6000 fps. In order for the positions of the voxels of the three-dimensional model data 901 corresponding to the pixels of the image data 903 to completely coincide with each other on the spiral screen 30, the frame rate Fr of the image light L and the rotation speed Rv of the spiral screen 30 are determined to satisfy the following relationship.

$$Rv\times BN\times n=Fr, n \text{ is an arbitrary integer} \quad \text{(Equation 19)}$$

Here, BN is the number of spiral-shaped members included in the spiral screen 30.

Therefore, for example, when BN=3, it is preferable to set Rv=30 rps and Fr=6300 fps, as n satisfies Equation 19. Accordingly, the positions of the voxels of the three-dimensional model data 901 match on the spiral screen 30.

Further, even if the reference data 902 is the same as that of the first example, the height z can be calculated in a manner simpler than the case where trigonometric functions are used. In such case, the number of spiral-shaped members included in the spiral screen 30 may be easily changed by a user operation such as operation to change settings.

Further, in this embodiment, the display apparatus 1 may have a part of or entire functions of the information processing device 10. In one example, the display apparatus 1 may include the rotation angle acquiring unit 12, which may be implemented by a computer that calculates the rotation angle.

Third Embodiment

Next, a third embodiment will be described with reference to FIGS. 36 to 47.

FIG. 36 is a perspective view illustrating an example of the display apparatus 1 according to the third embodiment. As illustrated in FIG. 36, the display apparatus 1 includes an information processing device 10, a projector 20, a motor 40, a motor controller 41, and a rotary table 70 inside a housing 60. The display apparatus 1 is further provided with a spiral screen 30 and a screen case 50 on a +Z direction side of the housing 60.

The housing 60 is a box-shaped member, configured by combining a plurality of panel plates, with the panel plate being such as a metal sheet. The housing 60 includes a through hole 62 on its upper face panel 61, which communicates with the inside of the housing 60.

The screen case 50 is a cylindrical member, which is an example of a support that supports the spiral screen 30. The spiral screen 30 is attached on the inner side of the cylindrical member by an adhesive or the like, such that the spiral screen 30 is supported by the screen case 50. The screen case 50 contains a material such as a transparent resin or glass. The spiral screen 30 supported inside the screen case 50 is made visible from the outside of the screen case 50.

The screen case 50 is not limited to a cylindrical member. In another example, the screen case 50 may be formed in a tubular member having an elliptical cross-section or a polygonal cross-section. In such case, the screen case 50, which is formed in tube, has a side on which image light L is incident in a direction along the central axis of the tube, and another side opposite of such side. An end portion of the opposite side may be open, or may be closed by such as a flat plate or a hollow hemispherical member.

A part of the screen case 50 is inserted into the housing 60 through the through-hole 62 of the housing 60. The screen case 50 has an end portion facing the −Z direction, which is made in contact with the +Z direction side of the rotary table 70 in the housing 60. The contacted face is applied with an adhesive.

The rotary table 70 is an example of a rotary mechanism that is formed in an annular shape having a central axis along the rotation axis A of the spiral screen 30 and rotates the screen case 50 around the rotation axis A of the spiral screen 30. The spiral axis of the spiral screen 30 and the rotation axis A substantially coincide with each other.

The rotary table 70 is housed inside the housing 60 and is rotatably attached on a bottom panel of the housing 60 via a support column. The material of the rotary table 70 is not particularly limited. For example, a resin material, a metal material, or the like can be used.

The rotary table 70 has a tooth profile gear G2 formed on or attached to an outer peripheral portion thereof, which is geared with a gear G1 attached to an axial core 40a of the motor 40. The gear G1 is an example of a transmission member that transmits the driving force of the motor 40 to the rotary table 70.

The driving force is transmitted to the rotary table 70 via the gear G1 and the tooth profile gear G2, causing the rotary table 70 to rotate about an axis along the Z-axis. The screen case 50 is rotated by the rotation of the rotary table 70. The spiral screen 30 is rotatable around the rotation axis A along the Z axis together with the screen case 50. The rotation axis A of the spiral screen 30 coincides with the central axis of the image light L emitted by the projector 20.

The projector 20 is provided on the opposite side of the spiral screen 30 across the rotary table 70. The projector 20 emits image light L in a direction along the rotation axis A so as to pass through an annular region 71 formed on the rotary table 70. The annular region 71 refers to an inner hollow portion of the rotary table 70 formed in an annular shape.

The image light L emitted by the projector 20 passes through the annular region 71 from the −Z direction of the rotary table 70, and is emitted to the spiral screen 30 provided on the +Z direction side of the rotary table 70.

The information processing device 10 specifies the position of the spiral screen 30 in a three-dimensional coordinate system including the Z axis along the irradiation direction of the image light L. Specifically, the information processing device 10 calculates the height z(x, y) of the spiral screen 30 in the positive direction of the Z-axis at each x and y coordinates (x, y).

The calculated height z(x, y) is a height along the rotation axis A of the spiral screen 30, and corresponds to a position of the surface of the spiral screen 30 that is irradiated with image light L. The information processing device 10 calculates, in real time, the height z(x, y) that changes according to rotation of the spiral screen 30, and generates image data 903 corresponding to the height z (x, y), for example, as described above referring to FIG. 4.

In the present embodiment, a configuration in which the information processing device 10, the projector 20, the motor 40, the motor controller 41, and the rotary table 70 are provided inside the housing 60 is described as an example. However, the configuration is not limited thereto, and some or all of them may be provided outside the housing 60.

The display apparatus 1 according to the present embodiment performs processing as described above referring to FIG. 5.

Configuration Example of Spiral Screen According to Comparative Example

Figure 45B:
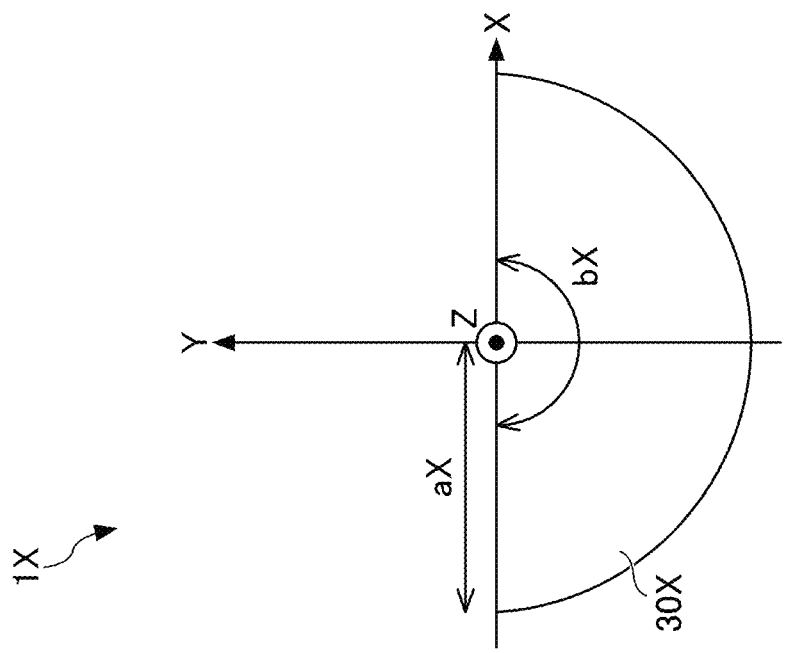
FIG. 45B is a diagram illustrating the spiral screen of the display apparatus viewed from a direction along the rotation axis according to the comparative example.
Figure 45A:
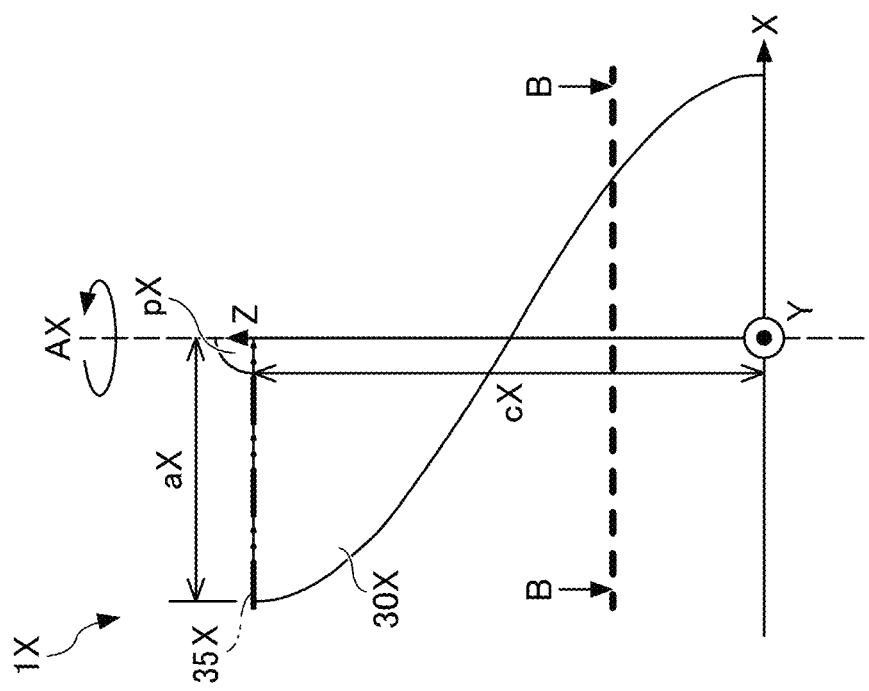
FIG. 45A is a diagram illustrating a spiral screen of a display apparatus viewed from a direction intersecting the rotation axis according to a comparative example.

Next, before describing a detailed configuration of the spiral screen 30 in this embodiment, a configuration of a spiral screen 30X included in a display apparatus 1X according to a comparative example will be described. FIG. 45A and FIG. 45B are diagrams illustrating a configuration of the spiral screen 30X according to the comparative example. FIG. 45A is a view of the spiral screen 30X viewed from a direction intersecting a rotation axis AX of the spiral screen 30X. FIG. 45B is a view of the spiral screen 30X viewed from a direction along the rotation axis AX.

As illustrated in FIGS. 45A and 45B, the spiral screen 30X has a shape formed by a trajectory through which a straight line 35X passes when the straight line 35X, which is non-orthogonal to the rotation axis AX, is moved along the rotation axis AX while being rotated counterclockwise around the rotation axis AX (for example, moved from the +Z direction to the −Z direction). In other words, the spiral screen 30X has a spiral shape in which a cross section cut by a plane orthogonal to the rotation axis AX is linear.

In this comparative example, the spiral screen 30X is a member having a certain thickness. The shape of the spiral screen 30X may be expressed using a round bar-shaped member having a diameter equal to the thickness of the spiral screen 30 and having a central axis coinciding with the straight line 35X. That is, the shape of the spiral screen 30X corresponds to a shape formed by a trajectory through which the round bar-shaped member passes, when the round bar-shaped member is moved along the rotation axis AX while being rotated counterclockwise around the rotation axis AX.

An angle ρX formed by the rotation axis AX and the straight line 35X is substantially 90 [deg].

Assuming that a position in the X direction is x, a position in the Y direction is y, and a position in the Z direction is z, the spiral screen 30X has a shape that satisfies the following Equations. $x = aX \times rX \times \cos(bX \times \theta X)$ $y = aX \times rX \times \sin(bX \times \theta X)$ $z = cX \times \theta X$ In the above equations, θX and rX each represent a variable equal to or greater than 0 but equal to or less than 1. The aX, bX, and cX each represent a constant. More specifically, aX represents the maximum length in the intersecting direction of the straight line 35X, in the direction intersecting the rotation axis AX, that is, X direction. bX represents the maximum rotation angle of the straight line 35X. cX represents the maximum length in the rotation axis direction of the spiral screen 30X in the direction along the rotation axis AX, that is, Z direction. In FIG. 45B, the maximum rotation angle bX is 180 [deg].

Figure 46:
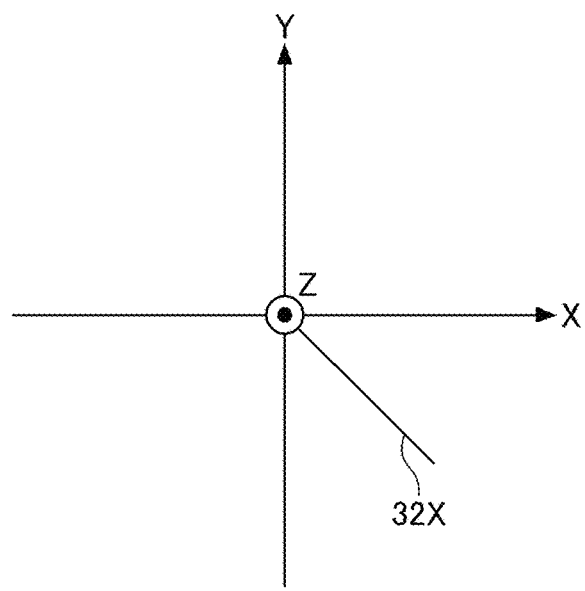
FIG. 46 is a cross-sectional view taken along a line B-B of FIG. 45A.

FIG. 46 is a cross-sectional view taken along the line B-B of the spiral screen 30X in FIG. 45A. In other words, FIG. 46 is a cross-sectional view of the spiral screen 30X taken along a plane orthogonal to the rotation axis AX (spiral axis), as viewed from the +Z direction side.

As illustrated in FIG. 46, the spiral screen 30X includes a cross-section 32X that is linear. The cross-section 32X has a shape corresponding to a shape of a surface of the spiral screen 30X having thickness, or a shape along the central axis of the spiral screen 30X in the direction of thickness.

The display apparatus 1X emits image light L along the rotation axis AX, for example, from the −Z direction while rotating the spiral screen 30X around the rotation axis AX. Accordingly, the display apparatus 1X displays a three-dimensional image with light reflected at the spiral screen 30X, from among rays of the image light L.

In the display apparatus 1X, the cross-section 32X of the spiral screen 30X is linear. When a user views an image from the +Y direction intersecting the rotation axis AX, a shape of the spiral screen 30X does not change with rotation in the vicinity of the rotation axis AX. That is, the light reflected from the spiral screen 30X is not made visible in the vicinity of the rotation axis AX, and the display apparatus 1X cannot display a portion of the three-dimensional image in the vicinity of the rotation axis AX.

More specifically, in the display apparatus 1X, since the cross-section 32X of the spiral screen 30X is linear, there is a portion where the straight line 35X becomes parallel to the viewpoint of the user on the rotation axis AX. Accordingly, the light reflected from the spiral screen 30X is not made visible in the vicinity of the rotation axis AX, and the display apparatus 1X cannot display a portion of the three-dimensional image in the vicinity of the rotation axis AX.

Figure 47:
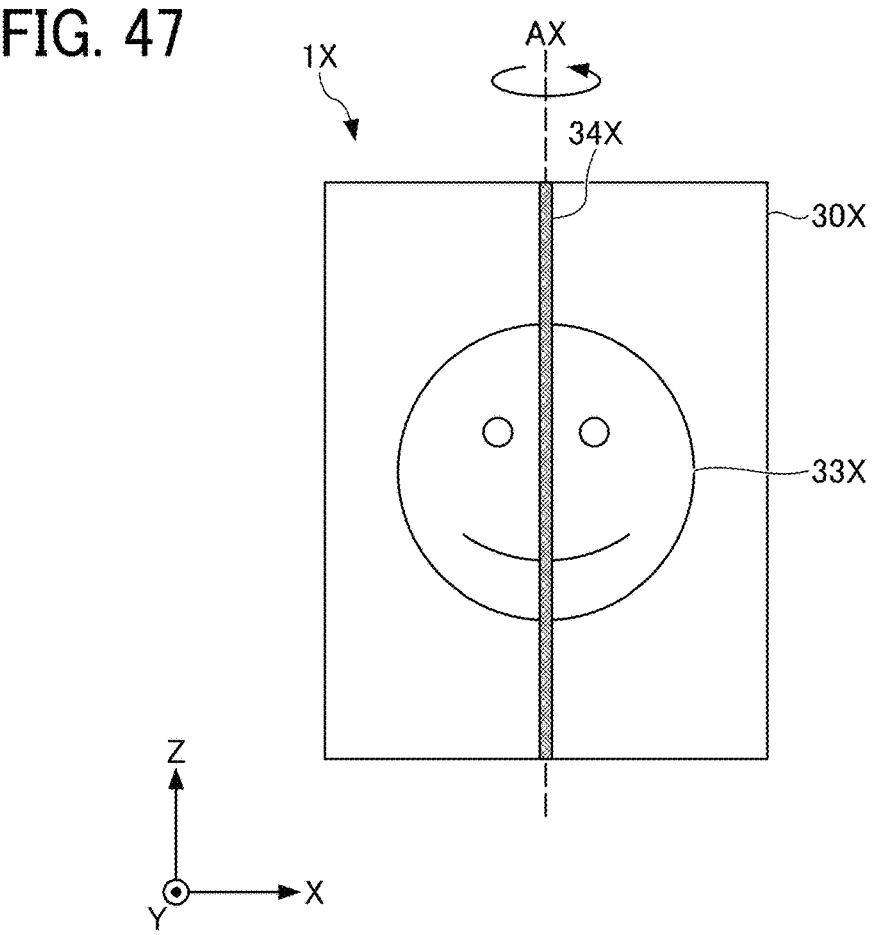
FIG. 47 is a diagram illustrating a three-dimensional image displayed by the display apparatus according to the comparative example.

FIG. 47 is a diagram illustrating a three-dimensional image 33X displayed by the display apparatus 1X. FIG. 47 illustrates the three-dimensional image 33X viewed from the +Y direction in a state where the spiral screen 30X is rotating around the rotation axis AX. As illustrated in FIG. 47, in the vicinity of the rotation axis AX, the light reflected from the spiral screen 30X is not visible, and a stripe-shaped portion 34X, where no image is visible, is generated in the three-dimensional image 33X.

Example Configuration of Spiral Screen of Third Embodiment

Next, FIGS. 37A and 37B are diagrams illustrating an example of a configuration of the spiral screen 30 included in the display apparatus 1 according to a first example of the third embodiment. FIG. 37A illustrates the spiral screen 30 viewed from a direction intersecting the rotation axis A. FIG. 37B illustrates the spiral screen 30 viewed from a direction along the rotation axis A.

As illustrated in FIGS. 37A and 37B, the spiral screen 30 has a shape formed by a trajectory through which a straight line 35 passes when the straight line 35, which is non-orthogonal to the rotation axis A, is moved along the rotation axis A while being rotated counterclockwise around the rotation axis A (for example, moved from the +Z direction to the −Z direction). In other words, the spiral screen 30 has a spiral shape whose cross-section taken along a plane orthogonal to the rotation axis A is curved.

In this example, the spiral screen 30 is a member having a certain thickness. The shape of the spiral screen 30 may be expressed using a round bar-shaped member having a diameter equal to the thickness of the spiral screen 30 and having a central axis coinciding with the straight line 35. That is, the shape of the spiral screen 30 corresponds to a shape formed by a trajectory through which the round bar-shaped member passes, when the round bar-shaped member is moved along the rotation axis A while being rotated counterclockwise around the rotation axis A.

An angle ρ formed by the rotation axis A and the straight line 35 is smaller than 90 [deg]. Alternatively, the angle ρ may be made larger than 90 [deg].

Assuming that a position in the X direction is x, a position in the Y direction is y, and a position in the Z direction is z, the spiral screen 30 includes a shape that satisfies the following Equations 20 to 24.

$$x = a \times r \times \cos(b \times \theta) \quad \text{(Equation 20)}$$

$$y = a \times r \times \sin(b \times \theta) \quad \text{(Equation 21)}$$

$$z = c \times \theta + d \times r \quad \text{(Equation 22)}$$

$$0 \leq \theta \leq 1 \quad \text{(Equation 23)}$$

$$0 \leq r \leq 1 \quad \text{(Equation 24)}$$

In Equations 21 to 24, θ and r each represent a variable greater than or equal to 0 and less than or equal to 1. a to d each represent a constant. Constants a to d define the maximum value, and variables θ and r fill in the middle from 0 to the maximum value. More specifically, a represents the maximum length in the intersecting direction of the straight line 35, in the direction intersecting the rotation axis A, that is, X direction. b represents the maximum rotation angle of the straight line 35. c represents the maximum length in the rotation axis direction of the spiral screen 30 in the direction along the rotation axis A, that is, Z direction. d represents a length component in the Z direction of the straight line 35. When the value of the length component d is a positive value, the shape is convex toward the −Z direction. When the value of the length component d is a negative value, the shape is convex toward the +Z direction. The term "convex" means that an area facing the rotation axis A of the spiral screen 30 is higher along the rotation axis A than an area facing the outer peripheral side of the spiral screen 30.

In FIGS. 37A and 37B, the maximum rotation angle b is set to 180 [deg], but the maximum rotation angle b may be larger than 180 [deg] or smaller than 180 [deg]. The maximum rotation angle b is desirably equal to or less than 360 [deg], so that the spiral screens 30 do not overlap each other when the spiral screen 30 is viewed from the direction along the rotation axis A.

Figure 38:
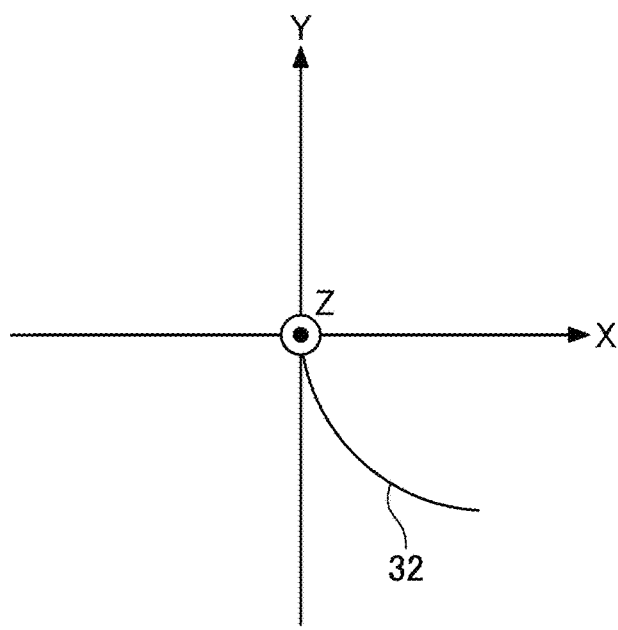
FIG. 38 is a cross-sectional view taken along a line C-C of FIG. 37A.

FIG. 38 is a cross-sectional view taken along the line C-C of the spiral screen 30 in FIG. 37A. That is, FIG. 38 is a diagram in which a cross section of the spiral screen 30 cut along a plane orthogonal to the rotation axis A (spiral axis) is viewed from the +Z direction.

As illustrated in FIG. 38, the spiral screen 30 includes a cross-section 32 that is curved. The cross-section 32 has a shape corresponding to a shape of a surface of the spiral screen 30 having thickness, or a shape along the central axis of the spiral screen 30 in the direction of thickness.

The display apparatus 1 emits image light L along the rotation axis A from, for example, the −Z direction while rotating the spiral screen 30 around the rotation axis A. Accordingly, the display apparatus 1 displays a three-dimensional image with light reflected at the spiral screen 30 and transmitted through the spiral screen 30, from among rays of the image light L.

In the display apparatus 1, the cross-section 32 of the spiral screen 30 is curved. When a user views an image from the +Y direction intersecting the rotation axis A, a shape of the spiral screen 30 changes with rotation on the rotation axis A. Accordingly, the light reflected from the spiral screen 30 is made visible even in the vicinity of the rotation axis A, and the display apparatus 1 displays the entire three-dimensional image.

More specifically, in the display apparatus 1, since the cross-section 32 of the spiral screen 30 is curved, there is no portion where the straight line 35 becomes parallel to the viewpoint of the user on the rotation axis A. Accordingly, the light reflected from the spiral screen 30 is made visible even in the vicinity of the rotation axis A, and the display apparatus 1 displays the entire three-dimensional image.

Figure 39:
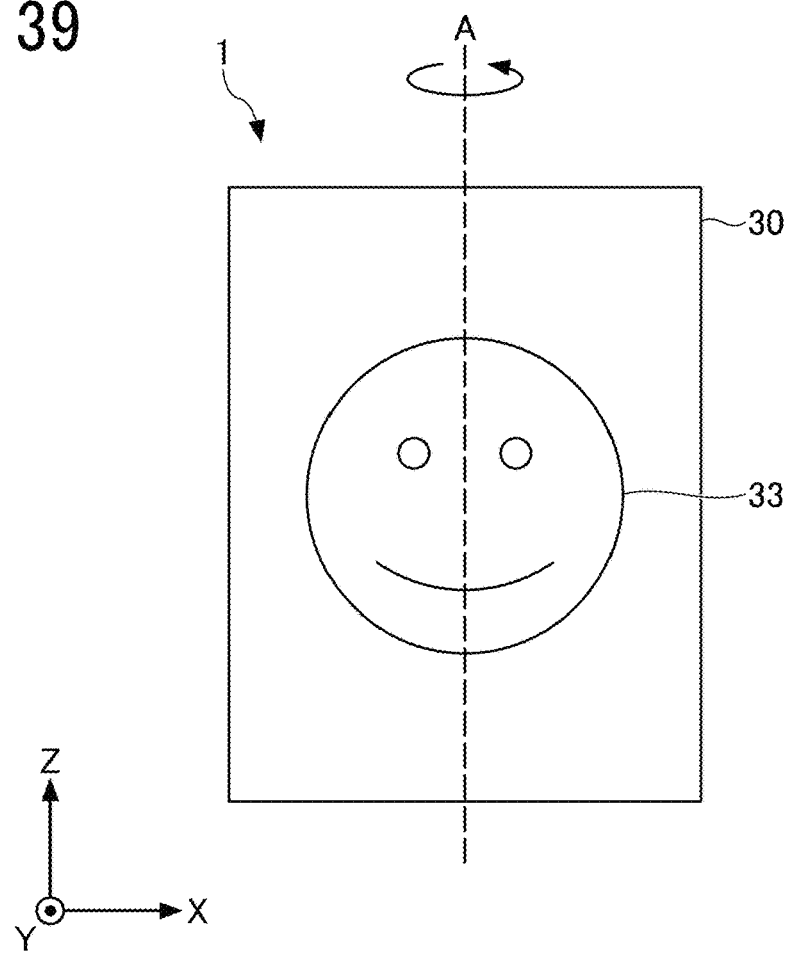
FIG. 39 is a diagram illustrating a three-dimensional image displayed by the display apparatus according to the first example of the third embodiment.

FIG. 39 is a diagram illustrating an example of a three-dimensional image 33 displayed by the display apparatus 1. FIG. 39 illustrates a state in which the spiral screen 30 is rotating around the rotation axis A, and the three-dimensional image 33 is visible from the +Y direction. As illustrated in FIG. 39, the portion 34X with no visible image in FIG. 47 disappears, and the entire three-dimensional image 33 is displayed.

As described above, the display apparatus 1 according to the first example of the third embodiment includes the spiral screen 30 with a spiral member having a cross-section 32, which is taken along a plane orthogonal to the rotation axis A (spiral axis), is curved, and the motor 40 (driver) that rotates the spiral screen 30 around the rotation axis A. The display apparatus 1 further includes the projector 20 (irradiation device) that irradiates the spiral screen 30 that is rotating with the image light L. The display apparatus 1 displays a three-dimensional image 33 with light, which is a part of image light that is reflected from the spiral screen 30.

With the spiral screen 30 having the cross-section 32, even when the spiral screen 30 is irradiated with the image light L from the direction along the rotation axis A, and the three-dimensional image 33, which is viewed from the direction intersecting the rotation axis A, is displayed, there is no portion parallel to the viewpoint in the three-dimensional image 33. Since there is no portion parallel to the viewpoint that may be invisible, the entire three-dimensional image 33 being displayed is made visible.

In the present example, a configuration in which the spiral screen 30 is irradiated with the image light L from the −Z direction is described as an example, but the present invention is not limited thereto. For example, the spiral screen 30 may be irradiated with the image light L from another direction such as the +Z direction.

Second Example of Third Embodiment

Next, a display apparatus 1a according to a second example of the third embodiment will be described. The same components as those described in the first example are denoted by the same reference numerals, and redundant description thereof is omitted as appropriate. This also applies to the examples described below.

Figure 40A:
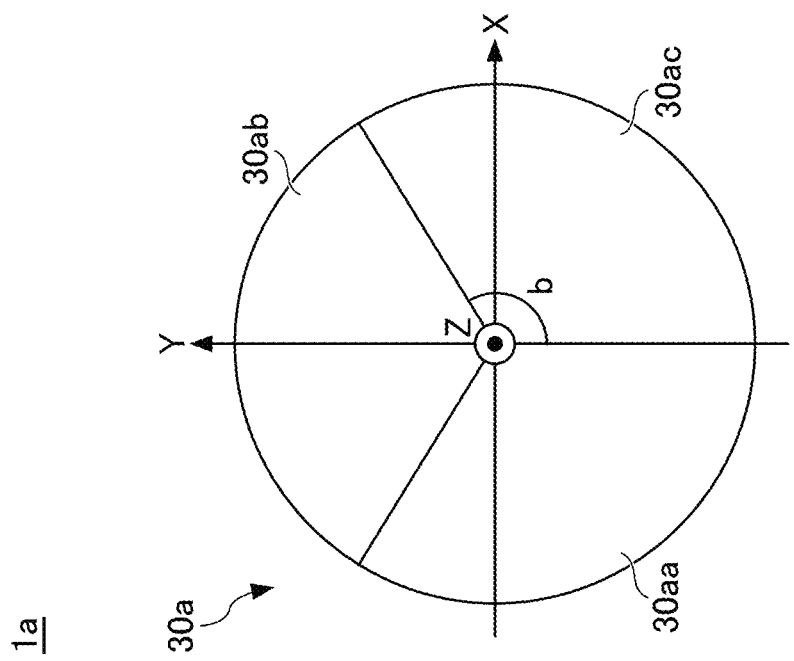
FIG. 40A is a diagram illustrating a spiral screen, viewed from a direction intersecting the rotation axis, according to a second example of the third embodiment.
Figure 40B:
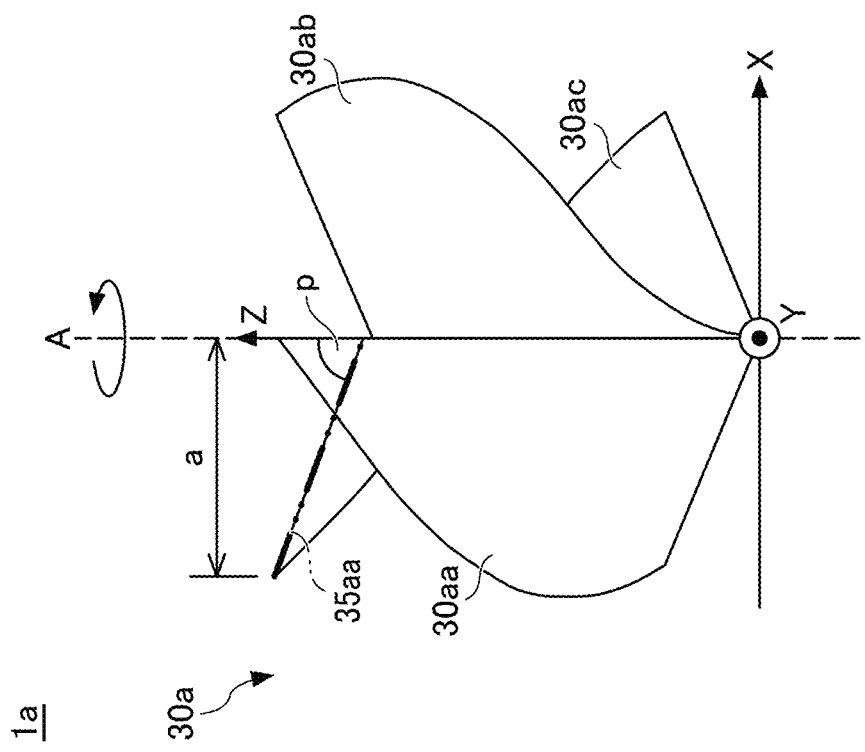
FIG. 40B is a diagram illustrating a spiral screen, viewed from a direction along the rotation axis, according to the second example of the third embodiment.

FIG. 40A and FIG. 40B are diagrams illustrating a configuration of a spiral screen 30a included in the display apparatus 1a. FIG. 40A illustrates the spiral screen 30a viewed from a direction intersecting the rotation axis A.

Figure 41C:
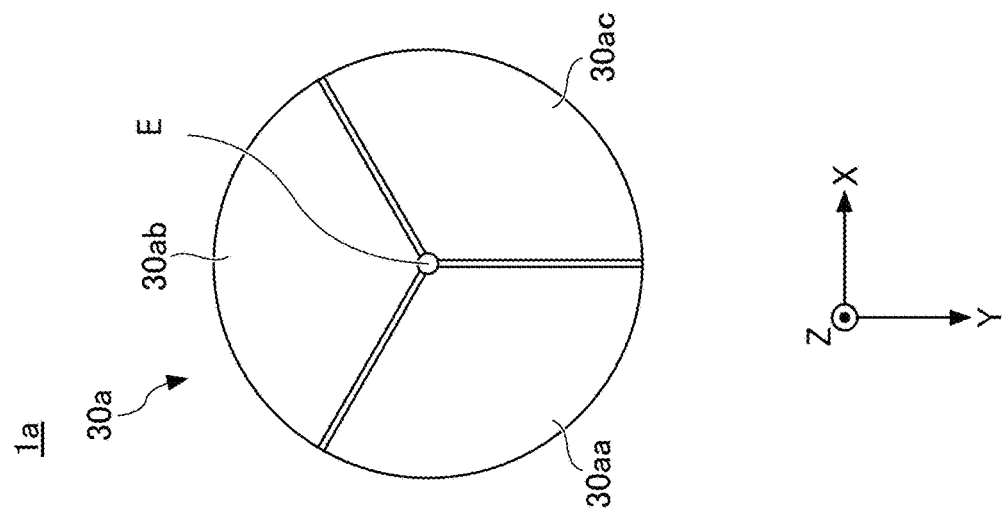
FIGS. 41A, 41B, and 41C are diagrams illustrating the spiral screen viewed from various directions, according to the second example of the third embodiment.
Figure 41B:
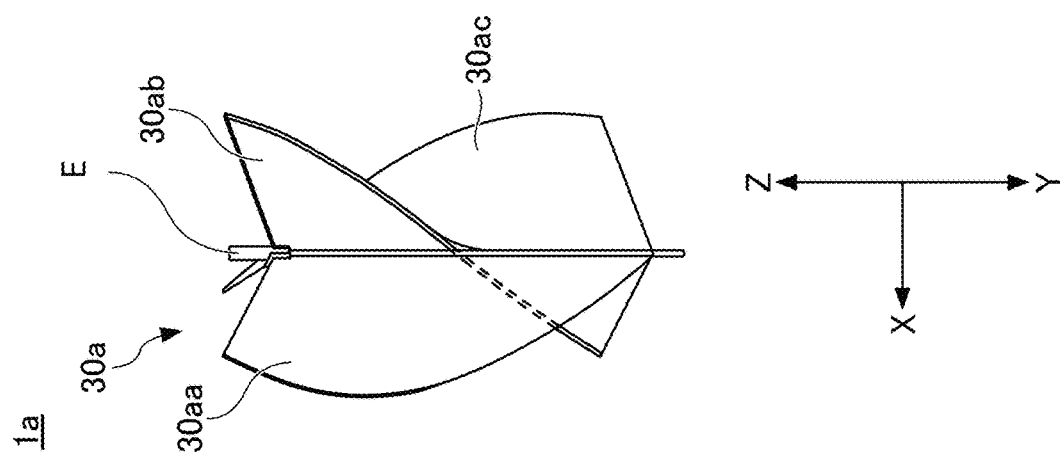
Figure 41A:
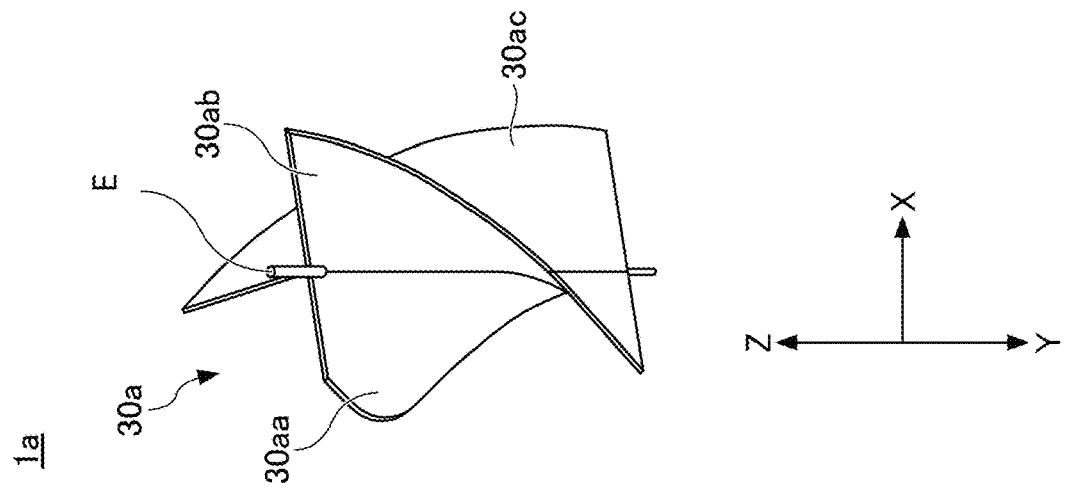

FIG. 40B illustrates the spiral screen 30a viewed from a direction along the rotation axis A. FIGS. 41A to 41C are views of the spiral screen 30a viewed from various directions.

As illustrated in FIGS. 40A, 40B, and 41A, 41B, and 41C, the spiral screen 30a has three blade members 30aa, 30ab, and 30ac. Each of the three blade members 30aa, 30ab, and 30ac has a spiral shape and is disposed at a position where the blade members do not overlap each other when the spiral screen 30a is viewed along the rotation axis A direction. For example, the maximum rotation angle b of each of the three blade members 30aa, 30ab, and 30ac is 120 [deg].

In the above-described case of the spiral screen 30 including one blade member according to the first example, the image light L is reflected and transmitted at a particular position on the spiral screen 30. The time when the image light L is reflected and transmitted at the same particular position is after one rotation of the spiral screen 30. Since the reflected light and the transmitted light of the image light L are not visually recognized at this position until the spiral screen 30 makes one rotation to return to the original state, flickering may occur when viewing the displayed three-dimensional image 33.

On the other hand, in the spiral screen 30a, the three blade members 30aa, 30ab, and 30ac respectively reflect and transmit the image light L at one particular position on the spiral screen 30 during one rotation of the spiral screen 30. This can shorten a period in which the reflected light and the transmitted light of the image light L are not visible at the same particular position. This reduces flickering of the displayed three-dimensional image 33.

Effects other than those described above are similar to those of the above-described examples in the third embodiment.

Further, in FIGS. 40A, 40B, and 41A, 41B, and 41C, a configuration in which the spiral screen 30a has three blade members 30aa, 30ab, and 30ac has been described, but the present invention is not limited thereto. The spiral screen 30a may include four or more blade members so as to be disposed at positions that do not overlap each other when the spiral screen 30a is viewed along the direction of the rotation axis A (spiral axis).

Third Example of Third Embodiment

Next, a display apparatus 1b according to a third example of the third embodiment will be described.

Figure 42C:
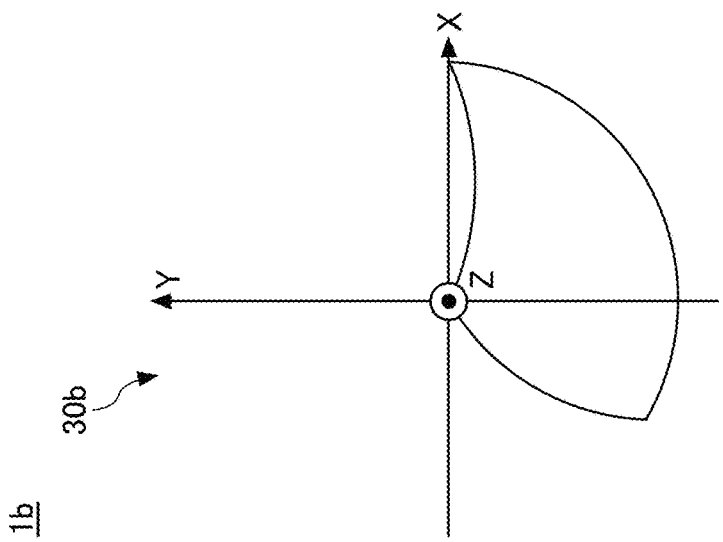
FIG. 42C is a diagram illustrating a spiral screen, viewed from a direction along the rotation axis, according to the third example of the third embodiment.
Figure 42B:
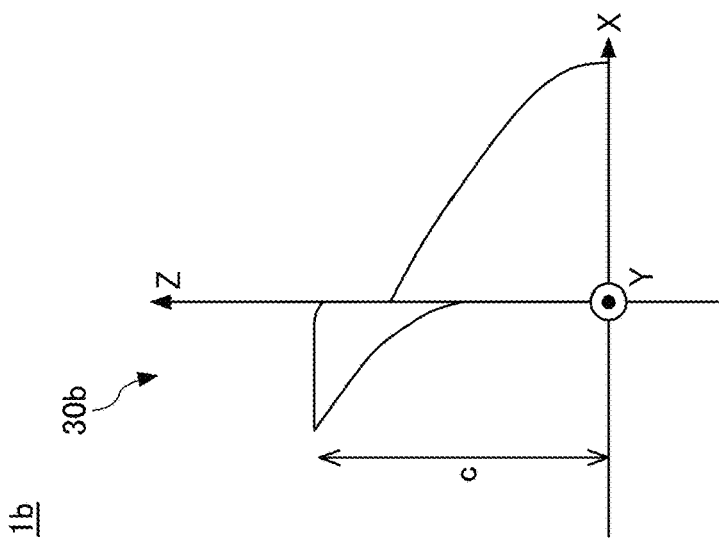
FIG. 42B is a diagram illustrating a spiral screen, viewed from a direction intersecting the rotation axis, according to the third example of the third embodiment.
Figure 42A:
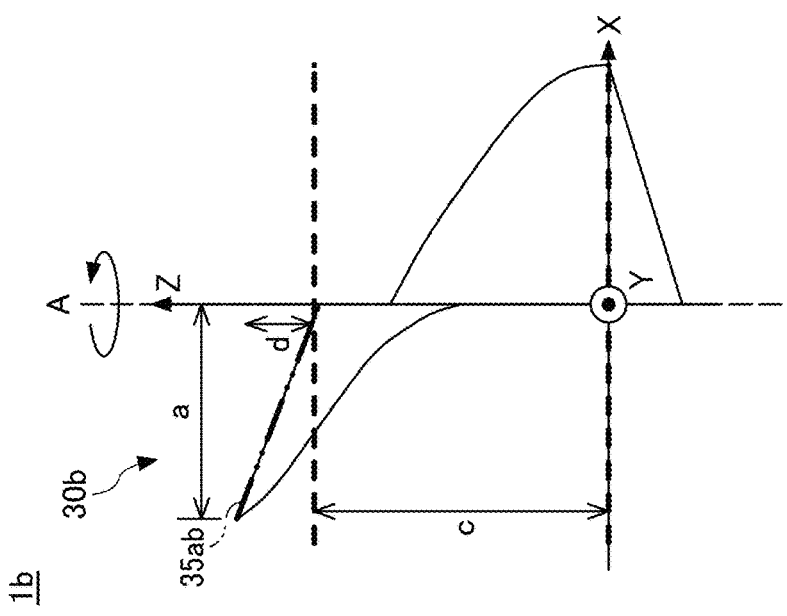
FIG. 42A is a diagram illustrating a spiral screen, viewed from a direction intersecting the rotation axis, according to a third example of the third embodiment.
Figure 43C:
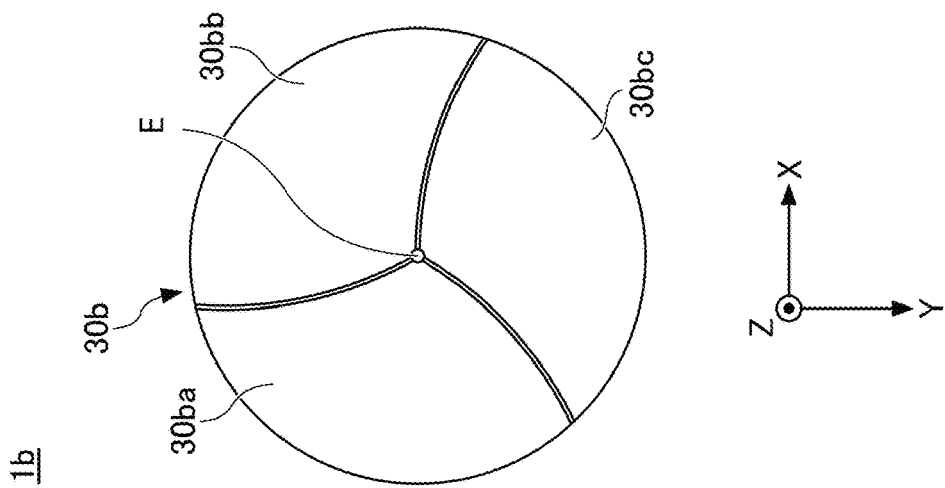
FIGS. 43A, 43B, and 43C are diagrams illustrating the spiral screen viewed from various directions, according to the third example of the third embodiment.
Figure 43B:
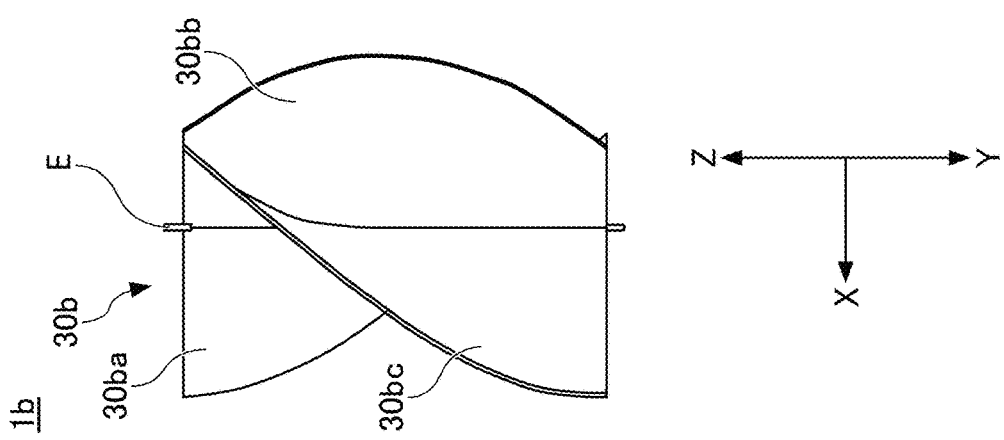
Figure 43A:
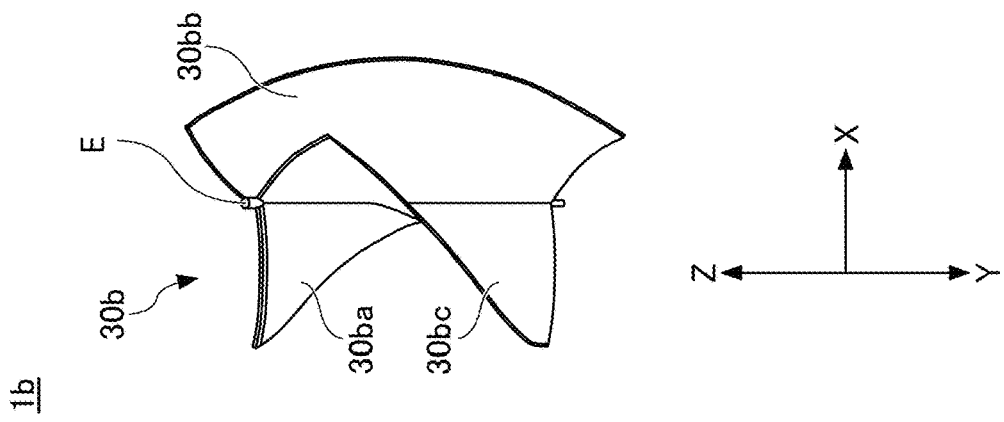

FIG. 42A and FIG. 42B are diagrams illustrating a configuration of a spiral screen 30b included in the display apparatus 1b. FIG. 42A illustrates the spiral screen 30b satisfying the condition of $-d/c \leq \theta \leq 1$ viewed from the direction intersecting the rotation axis A. FIG. 42B illustrates the spiral screen 30b having the value of z ranging from 0 to c (that is, $0 \leq z \leq c$), viewed from the direction intersecting the rotation axis A. FIG. 42C illustrates the spiral screen 30b viewed from the direction along the rotation axis A. FIGS. 43A to 43C are views of the spiral screen 30b viewed from various directions.

Assuming that a position in the X direction is x, a position in the Y direction is y, and a position in the Z direction is z, the spiral screen 30b includes a shape that satisfies the following Equations 25 to 29.

$$x = a \times r \times \cos(b \times \theta) \quad \text{(Equation 25)}$$

$$y = a \times r \times \sin(b \times \theta) \quad \text{(Equation 26)}$$

$$z = c \times \theta + d \times r \quad \text{(Equation 27)}$$

When $d \geq 0, -d/c \leq \theta \leq 1$, and $0 \leq Z \leq c$ (Equation 28)

When $d < 0, 0 \leq \theta \leq 1 - d/c$ and $0 \leq Z \leq c$ (Equation 29).

Note that a to d, θ, and r in Equations 25 to 29 are the same as a to d, θ, and r in Equations 20 to 24.

In the present example, the variable θ defines the rotation angle of the straight line 35ab and the height of the straight line 35ab in the Z direction. By changing the minimum or maximum value of the variable θ, the height of the straight line 35ab in the Z direction and the rotation angle of the straight line 35ab are changed.

In the present example, a range of the spiral screen 30b in the Z direction is determined, such that the spiral screen 30b has the maximum value of z based on the constants b and c while eliminating an oblique portion on the spiral screen 30b. As a result, when the spiral screen 30b is cut along the XY plane, depressions at the upper end and the lower end of the spiral screen 30b are eliminated. The depression means that an area of the spiral screen 30 facing the rotation axis A is lower along the rotation axis A than an area of the spiral screen 30 facing the outer peripheral side.

When the spiral screen 30b satisfies Equations 25 to 29, even when the spiral screen 30b is viewed from a direction intersecting the rotation axis A, vertical depressions in the Z direction are eliminated, thus increasing a display range of the three-dimensional image 33.

Effects other than those described above are similar to those of the above-described examples in the third embodiment.

Fourth Example of Third Embodiment

Next, a display apparatus 1c according to a fourth example of the third embodiment will be described.

Figure 44B:
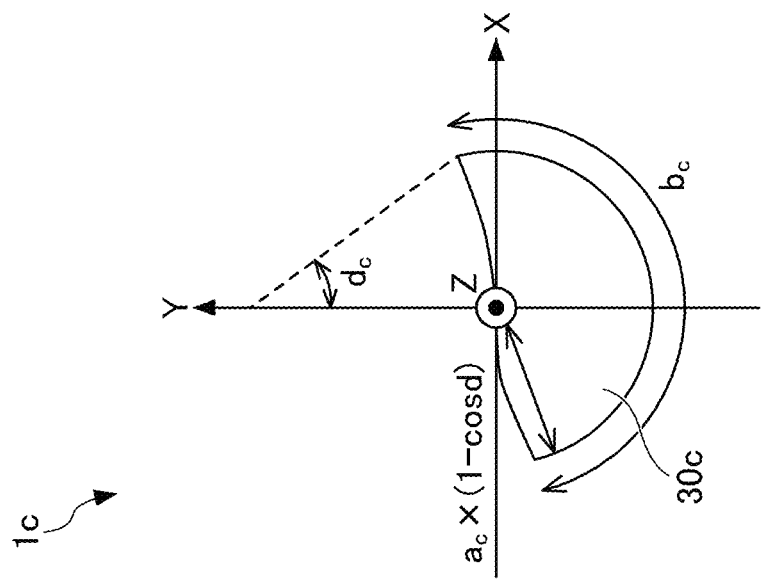
FIG. 44B is a diagram illustrating the spiral screen, viewed from a direction along the rotation axis, according to the fourth example of the third embodiment.
Figure 44A:
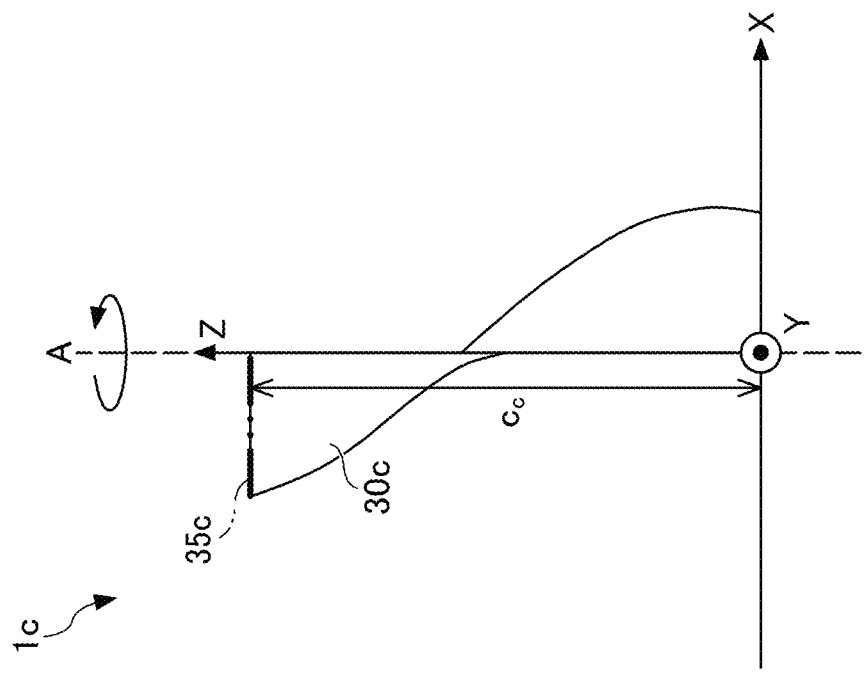
FIG. 44A is a diagram illustrating a spiral screen, viewed from a direction intersecting the rotation axis, according to a fourth example of the third embodiment.

FIG. 44A and FIG. 44B are diagrams illustrating a configuration of a spiral screen 30c included in the display apparatus 1c. FIG. 44A illustrates the spiral screen 30c viewed from a direction intersecting the rotation axis A. FIG. 44B illustrates the spiral screen 30c viewed from a direction along the rotation axis A.

As illustrated in FIGS. 44A and 44B, the spiral screen 30c has a shape formed by a trajectory through which a circular arc 35c passes when the circular arc 35c intersecting the rotation axis A is moved along the rotation axis A while being rotated counterclockwise around the rotation axis A (for example, moved from the +Z direction to the −Z direction).

The spiral screen 30c is a member having a certain thickness. The shape of the spiral screen 30c may be expressed using a round bar-shaped member having a diameter equal to the thickness of the spiral screen 30c and having a central axis coinciding with the circular arc 35c. That is, the shape of the spiral screen 30c corresponds to a shape formed by a trajectory through which the round bar-shaped member passes, when the round bar-shaped member is moved along the rotation axis A while being rotated counterclockwise around the rotation axis A.

Assuming that a position in the X direction is x, a position in the Y direction is y, and a position in the Z direction is z, the spiral screen 30c has a shape that satisfies the following Equations 30 to 34.

$$x = ac \times [\cos(bc \times \theta) \times \{1 - \cos(dc \times \varphi)\} - \sin(bc \times \theta) \times \sin(dc \times \varphi)] \quad \text{(Equation 30)}$$

$$y = ac \times [\sin(bc \times \theta) \times \{1 - \cos(dc \times \varphi)\} + \cos(bc \times \theta) \times \sin(dc \times \varphi)] \quad \text{(Equation 31)}$$

$$z = cc \times \theta \quad \text{(Equation 32)}$$

$$0 \leq \theta \leq 1 \quad \text{(Equation 33)}$$

$$0 \leq \varphi \leq 1 \quad \text{(Equation 34)}$$

In Equations 30 to 34, θ and φ each represent a variable greater than or equal to 0 and less than or equal to 1. ac to dc each represent a constant. The maximum value is defined by a constant dc, and variables θ and φ are variables for filling a range from 0 to dc. More specifically, ac×{1−cos (dc)} represents the maximum length in the direction intersecting the circular arc 35c, in the direction intersecting the rotation axis A, that is, X direction. bc represents the maximum rotation angle of the circular arc 35c. cc represents the maximum length in the rotation axis direction of the spiral screen 30c in the direction along the rotation axis A, that is, Z direction. dc represents an angle of a circular sector such as the circular arc 35c.

In this example, the spiral screen 30c satisfies Equations 30 to 34. The spiral screen 30c does not have a spiral shape formed by rotating a straight line around the spiral axis, but has a spiral shape formed by rotating an arc around the spiral axis. Accordingly, the same advantages as those of the above-described examples can be obtained.

In FIGS. 44A and 44B, the case where bc=180 [deg] and dc=30 [deg] is illustrated, but the present invention is not limited thereto. The spiral screen 30c may be formed by combining a plurality of blade members. The maximum rotation angle bc may be made larger or smaller than 180 [deg]. The angle dc may be made larger or smaller than 30 [deg]. It is desirable to arrange the plurality of blade members at positions where the plurality of blade members do not overlap, when the spiral screen 30c is viewed from the direction along the rotation axis A.

Effects other than those described above are similar to those of the above-described examples in the third embodiment.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

Numerals such as ordinal numbers and quantities used in the description of the embodiments are all exemplified for describing specific examples, such that the present invention is not limited to the exemplified numerals. Further, the above-described connections between the elements are an example for describing specific examples, and the connections between the elements for implementing specific functions of the present invention is not limited thereto.

Moreover, division of blocks in any one of the functional block diagram is described as an example. In any functional block diagram. a plurality of blocks may be configured as one block, one block may be divided into a plurality of blocks, or some functions performed by one block may be performed by another block. Further, one or more functions of a plurality of blocks having similar functions may be processed in parallel or in a time-division manner by single hardware or software.

In a first aspect, as described above in the second embodiment, an information processing device includes: circuitry that acquires image data generated based on a reference value corresponding to a rotation angle and a shape of a rotatable body, and outputs the image data to cause image light based on the image data be emitted to the rotatable body.

In a second aspect, for example, at the information processing device of the first aspect, the reference value indicates a height of the rotatable body along a rotation axis of the rotatable body at a reference rotation angle, for each coordinate on a plane intersecting the rotation axis of the rotatable body.

In a third aspect, for example, at the information processing device of the second aspect, the reference value indicates a value set based on an angle of deviation for each coordinate on the plane intersecting the rotation axis of the rotatable body.

In a fourth aspect, for example, at the information processing device of the second aspect, the circuitry further calculates a height of the rotatable body at each rotation angle, based on the reference value and the rotation angle of the rotatable body, generates the image data including luminance corresponding to the calculated height, and outputs the image data that is generated.

In a fifth aspect, for example, at the information processing device of the fourth aspect, in calculating the height of the rotatable body at each rotation angle, the circuitry adds or subtracts a value calculated based on the rotation angle to or from the reference value.

In a sixth aspect, for example, the information processing device of the fourth aspect further includes: a memory that stores a pixel value for each voxel of three-dimensional image that is made visible with image light emitted to the rotatable body, wherein the circuitry generates the image data based on the pixel value stored in the memory.

In a seventh aspect, for example, at the information processing device of the sixth aspect, the memory stores the pixel value for each voxel of the three-dimensional image, such that memory addresses of the pixel values are continuous along a coordinate axis on a plane intersecting the rotation axis.

In another embodiment, according to an eighth aspect, a display system includes the information processing device of any one of the first aspect to the seventh aspect, and a display apparatus including: the rotatable body; a driver that rotates the rotatable body; display apparatus circuitry that acquires information indicating a rotation angle of the rotatable body that is rotating; and an irradiation device that irradiates the rotatable body that is rotating with image light based on the image data output from the information processing device.

In a ninth aspect, for example, at the display system of the eighth aspect, the rotatable body has a spiral shape with a height that changes by a predetermined degree according to the rotation angle.

In a tenth aspect, for example, at the display system of the ninth aspect, the rotatable body includes a plurality of spiral members, each spiral member having a height that changes by a predetermined degree in a range of a rotation angle of each spiral member, the rotation angle of each spiral member being obtained by equally dividing a rotation angle of one rotation of the rotatable body by a number of the plurality of spiral members.

In an eleventh aspect, for example, at the display system of the tenth aspect, the circuitry of the information processing device further calculates the height of each spiral member at each rotation angle, based on the reference value and the rotation angle of the rotatable body, and generates the image data including luminance corresponding to the calculated height of each spiral member.

In another embodiment, an image output method is provided, which includes: acquiring image data generated based on a reference value corresponding to a rotation angle and a shape of a rotatable body; and outputting the image data to cause image light based on the image data be emitted to the rotatable body.

In another embodiment, a non-transitory recording medium is provided, which stores a plurality of instructions which, when executed by one or more processors, cause the processors to perform an image output method including: acquiring image data generated based on a reference value corresponding to a rotation angle and a shape of a rotatable body; and outputting the image data to cause image light based on the image data be emitted to the rotatable body.

In another embodiment, as described in the third embodiment, a display apparatus includes: an irradiated section to be irradiated, having a spiral shape with a curved cross-section cut along a plane orthogonal to a predetermined axis; a driver that rotates the irradiated section around the predetermined axis; an irradiation device that irradiates the irradiated section that is rotating with image light, so as to display an image with reflected light of the image light having been reflected on the irradiated section.

In one example, the image is a three-dimensional image.

In one example, the image light is based on two-dimensional image data.

In one example, the irradiated section irradiates the irradiated section with the image light from a direction along the predetermined axis, such that the image is visible from a direction intersecting the predetermined axis.

In one example, the irradiated section irradiates the image light generated based on a position of the irradiated section that is rotating.

In one example, when x is a position in a predetermined direction in a plane intersecting a spiral axis, y is a position in a direction orthogonal to the predetermined direction in the plane, and z is a position in a direction along the spiral axis. The irradiated section has a shape that satisfies the following Equations (1) to (5).

$$x = a \times r \times \cos(b \times \theta) \quad \text{(Equation 1)}$$

$$y = a \times r \times \sin(b \times \theta) \quad \text{(Equation 2)}$$

$$z = c \times \theta + d \times r \quad \text{(Equation 3)}$$

$$0 \leq \theta \leq 1 \quad \text{(Equation 4)}$$

$$0 \leq r \leq 1 \quad \text{(Equation 5),}$$

with a, b, c, and d each representing a constant, and r and θ each representing a variable.

In one example, when x is a position in a predetermined direction in a plane intersecting the predetermined axis, y is a position in a direction orthogonal to the predetermined direction in the plane, and z is a position in a direction along the predetermined axis, the irradiated section has a shape that satisfies the following Equations (6) to (10).

$$x = a \times r \times \cos(b \times \theta) \quad \text{(Equation 6)}$$

$$y = a \times r \times \sin(b \times \theta) \quad \text{(Equation 7)}$$

$$z = c \times \theta + d \times r \quad \text{(Equation 8)}$$

$$\text{if } d \geq 0, -d/c \leq \theta \leq 1 \text{ and } 0 \leq Z \leq c \quad \text{(Equation 9)}$$

$$\text{if } d < 0, 0 \leq \theta \leq 1 - d/c \text{ and } 0 \leq Z \leq c \quad \text{(Equation 10),}$$

with a, b, c and d each representing a constant, and r and θ each representing a variable.

In one example, when x is a position in a predetermined direction in a plane intersecting the predetermined axis, y is a position in a direction orthogonal to the predetermined direction in the plane, and z is a position in a direction along the predetermined axis, the irradiated section has a shape that satisfies the following Equations (11) to (15).

$$x = ac \times [\cos(bc \times \theta) \times \{1 - \cos(dc \times \varphi)\} - \sin(bc \times \theta) \times \sin(dc \times \varphi)] \quad \text{(Equation 11)}$$

$$y = a \times [\sin(bc \times \theta) \times \{1 - \cos(dc \times \varphi)\} + \cos(bc \times \theta) \times \sin(dc \times \varphi)] \quad \text{(Equation 12)}$$

$$z = cc \times \theta \quad \text{(Equation 13)}$$

$$0 \leq \theta \leq 1 \quad \text{(Equation 14)}$$

$$0 \leq \varphi \leq 1 \quad \text{(Equation 15),}$$

with ac, bc, cc, and dc each representing a constant, and θ and φ each representing a variable.

In one example, the irradiated section includes a plurality of blade members each blade member having a spiral shape, the plurality of blade members being disposed such that the respective blade members do not overlap with each other when viewed along a direction of the predetermined axis.

In one embodiment, a display control method, includes: rotating an irradiated section to be irradiated, around a predetermined axis, the irradiated section having a spiral shape with a curved cross-section cut along a plane orthogonal to the predetermined axis; and irradiating the irradiated section that is rotating with image light, so as to display an image with reflected light of the image light having been reflected on the irradiated section.

In one embodiment, a non-transitory recording medium is provided which, when executed by one or more processors, cause the processor to perform a display control method including: rotating an irradiated section to be irradiated, around a predetermined axis, the irradiated section having a spiral shape with a curved cross-section cut along a plane orthogonal to the predetermined axis; and irradiating the irradiated section that is rotating with image light, so as to display an image with reflected light of the image light having been reflected on the irradiated section.

The invention claimed is:

1. A display apparatus, comprising:
an irradiation screen irradiated with image light while being driven, the image light being reflected by the irradiation screen such that a three-dimensional image is visible to a user via an afterimage effect;
a motor to drive the irradiation screen;
circuitry configured to acquire two-dimensional image data generated according to at least one of an angle or a position of the irradiation screen driven by the motor;
an irradiation device configured to irradiate the irradiation screen with the image light based on the two-dimensional image data acquired by the circuitry; and a sensor configured to receive a partial image light that is a part of the image light irradiated from the irradiation device, and output a light reception signal based on an intensity of the partial image light, wherein the circuitry is further configured to select the two-dimensional image data to be acquired based on the light reception signal and driving cycle information which indicates a driving cycle of the motor.

2. The display apparatus of claim 1, wherein the circuitry changes an order of the two-dimensional image data to be acquired.

3. The display apparatus of claim 1, wherein the sensor is disposed at a location in which the sensor receives the partial image light which is separate from another part of the image light irradiated to the irradiation screen.

4. The display apparatus of claim 1, wherein the two-dimensional image data includes a predetermined graphical image at a predetermined area in an image of the two-dimensional image data, and the sensor outputs the light reception signal in response to reception of the partial image light, based on the predetermined graphical image.

5. The display apparatus of claim 1, wherein the light reception signal indicates a switching cycle for indicating a time when the three-dimensional image being displayed is switched, and the circuitry changes an order of the two-dimensional image data to be acquired, based on an irradiation cycle of the image light by the irradiation device, and a time difference between the switching cycle and the driving cycle.

6. The display apparatus of claim 5, further comprising:

a memory that stores irradiation time deviation data indicating a deviation in time when the image light is irradiated to the irradiation screen, attributable to a positional relationship between the motor and the irradiation screen, and the circuitry changes the order of the two-dimensional image data to be acquired, based on the irradiation cycle, the time difference, and the irradiation time deviation data.

7. The display apparatus of claim 5, wherein the irradiation device changes at least one of luminance or color of the partial image light according to the switching cycle.

8. The display apparatus of claim 7, wherein the irradiation device changes the at least one of the luminance or the color of the partial image light only in a predetermined time period within the switching cycle.

9. The display apparatus of claim 7, wherein the irradiation device alternately changes the at least one of the luminance or the color of the partial image light for each switching cycle.

10. The display apparatus of claim 1, wherein the irradiation screen has a spiral shape, and the motor rotates the irradiation screen around a predetermined axis.

11. The display apparatus of claim 1, wherein the irradiation screen includes a planar member having a flat surface, and the motor drives the irradiation screen in a reciprocal manner.

12. The display apparatus of claim 1, further comprising:

a memory that stores a two-dimensional image data set including a plurality of items of two-dimensional image data generated according to at least one of the angle or the position of the irradiation screen being driven, wherein the circuitry acquires particular two-dimensional image data from the two-dimensional image data stored in the memory, based on the driving cycle information and the light reception signal.

13. The display apparatus of claim 1, wherein the circuitry acquires the two-dimensional image data generated based on a reference value corresponding to the angle of the irradiation screen and a shape of the irradiation screen.

14. The display apparatus of claim 1, wherein the irradiation screen has a spiral shape with a curved-cross section cut along a plane orthogonal to a predetermined axis.

15. A display system, comprising:

the display apparatus of claim 1; and an information processing device communicably connected with the display apparatus, the information processing device comprising a memory that stores a two-dimensional image data set including a plurality of items of two-dimensional image data generated according to the at least one of the angle or the position of the irradiation screen being driven, wherein the circuitry of the display apparatus acquires particular two-dimensional image data from the two-dimensional image data stored in the memory, based on the driving cycle information and the light reception signal.

16. The display apparatus of claim 1, wherein the circuitry is further configured to control display of the two-dimensional image data.

17. The display apparatus of claim 1, wherein the irradiation device is a projector, and the circuitry is further configured to control the projector to display the two-dimensional image data.

18. The display apparatus of claim 1, wherein a voltage of the light reception signal, output by the sensor, corresponds to the intensity of the partial image light received by the sensor.

19. A method of controlling display, the method comprising:

driving an irradiation screen irradiated with image light, the image light being reflected by the irradiation screen such that a three-dimensional image is visible to a user via an afterimage effect;

acquiring two-dimensional image data generated according to at least one of an angle or a position of the irradiation screen;

irradiating, from an irradiation device, the irradiation screen with the image light based on the two-dimensional image data;

receiving a partial image light that is a part of the image light irradiated from the irradiation device;

outputting a light reception signal based on an intensity of the partial image light; and selecting the two-dimensional image data to be acquired based on the light reception signal and driving cycle information indicating a driving cycle for driving the irradiation screen.

20. A non-transitory recording medium storing a plurality of instructions which, when executed by one or more processors, cause the processors to perform a method comprising:

driving an irradiation screen irradiated with image light, the image light being reflected by the irradiation screen such that a three-dimensional image is visible to a user via an afterimage effect;

acquiring two-dimensional image data generated according to at least one of an angle or a position of the irradiation screen;

irradiating, from an irradiation device, the irradiation screen with the image light based on the two-dimensional image data;

receiving a partial image light that is a part of the image light irradiated from the irradiation device;

outputting a light reception signal based on an intensity of the partial image light; and selecting the two-dimensional image data to be acquired based on the light reception signal and driving cycle information indicating a driving cycle for driving the irradiation screen.

\* \* \* \* \*